United States Patent
Min et al.

(10) Patent No.: US 9,794,397 B2
(45) Date of Patent: Oct. 17, 2017

(54) WATCH TYPE MOBILE TERMINAL AND METHOD FOR CONTROLLING THE SAME

(71) Applicant: LG ELECTRONICS INC., Seoul (KR)

(72) Inventors: Jihye Min, Seoul (KR); Yongdeok Lee, Seoul (KR); Kwonhan Bae, Seoul (KR); Myoungeun Kim, Seoul (KR); Sunjung Lee, Seoul (KR); Eunsoo Jung, Seoul (KR); Eunkyung Choi, Seoul (KR); Miran Han, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 107 days.

(21) Appl. No.: 14/515,370

(22) Filed: Oct. 15, 2014

(65) Prior Publication Data

US 2015/0105125 A1 Apr. 16, 2015

(30) Foreign Application Priority Data

Oct. 16, 2013 (KR) .................. 10-2013-0123519
Nov. 29, 2013 (KR) .................. 10-2013-0147745

(51) Int. Cl.
*H04M 1/725* (2006.01)
*H04M 1/21* (2006.01)
(Continued)

(52) U.S. Cl.
CPC ........ *H04M 1/72583* (2013.01); *G04C 3/002* (2013.01); *G04G 21/04* (2013.01);
(Continued)

(58) Field of Classification Search
None
See application file for complete search history.

(56) References Cited

U.S. PATENT DOCUMENTS

| 6,525,997 B1 * | 2/2003 | Narayanaswami .. G04G 9/0082 368/223 |
| 7,907,476 B2 * | 3/2011 | Lee .......................... G04G 5/04 345/173 |

(Continued)

FOREIGN PATENT DOCUMENTS

| EP | 2284647 | 2/2011 |
| WO | 2007/069116 | 6/2007 |

OTHER PUBLICATIONS

European Patent Office Application Serial No. 14003530.4, Search Report dated Dec. 11, 2015, 6 pages.

*Primary Examiner* — Edward Martello
(74) *Attorney, Agent, or Firm* — Lee, Hong, Degerman, Kang & Waimey

(57) ABSTRACT

A watch type mobile terminal configured to be wearable on a wrist and a control method thereof are provided. The watch type mobile terminal includes a display unit configured to display screen information, a terminal body configured to allow the display unit to be installed therein and disposed on the wrist, a sensing unit configured to sense a position in which the mobile terminal is worn, and a controller configured to allocate a particular region of the display unit, as a control region for receiving a control command based on the sensing result, and process a user's touch input applied to the control region, as a control command for controlling an operation of the mobile terminal.

12 Claims, 45 Drawing Sheets

(51) Int. Cl.
*G06F 3/041* (2006.01)
*H04M 1/02* (2006.01)
*G04G 21/04* (2013.01)
*G04C 3/00* (2006.01)
G04G 21/08 (2010.01)

(52) U.S. Cl.
CPC ........ *G06F 3/0412* (2013.01); *H04M 1/0281* (2013.01); *H04M 1/21* (2013.01); *G04G 21/08* (2013.01); *H04M 2201/38* (2013.01); *H04M 2201/42* (2013.01)

(56) References Cited

U.S. PATENT DOCUMENTS

| | | | |
|---|---|---|---|
| 2009/0164923 A1* | 6/2009 | Ovi | G06F 3/0482 715/764 |
| 2010/0066763 A1 | 3/2010 | MacDougall et al. | |
| 2010/0124152 A1* | 5/2010 | Lee | G04C 17/005 368/232 |
| 2011/0157046 A1 | 6/2011 | Lee et al. | |
| 2011/0163969 A1* | 7/2011 | Anzures | G06F 3/04883 345/173 |
| 2013/0222271 A1* | 8/2013 | Alberth | G06F 1/163 345/173 |

* cited by examiner (a)

(b)

(a)

(b)

(a)

(b)

(a)

(b)

(a)  (b)

(a)

WATCH TYPE MOBILE TERMINAL AND METHOD FOR CONTROLLING THE SAME

CROSS-REFERENCE TO RELATED APPLICATION

Pursuant to 35 U.S.C. §119(a), this application claims the benefit of earlier filing date and right of priority to Korean Application Nos. 10-2013-0123519, filed on Oct. 16, 2013, and 10-2013-0147745, filed on Nov. 29, 2013, the contents of which are all hereby incorporated by reference herein in their entirety.

BACKGROUND OF THE INVENTION

1. Field of the Invention

The present disclosure relates to a mobile terminal and, more particularly, to a watch type mobile terminal that can be worn on a user's wrist, and a control method thereof.

2. Background of the Invention

Terminals may be generally classified as mobile/portable terminals or stationary terminals according to their mobility. Mobile terminals may also be classified as handheld terminals or vehicle mounted terminals according to whether or not a user can directly carry the terminal.

Mobile terminals have become increasingly more functional. Examples of such functions include data and voice communications, capturing images and video via a camera, recording audio, playing music files via a speaker system, and displaying images and video on a display. Some mobile terminals include additional functionality which supports game playing, while other terminals are configured as multimedia players. More recently, mobile terminals have been configured to receive broadcast and multicast signals which permit viewing of content such as videos and television programs.

Efforts are ongoing to support and increase the functionality of mobile terminals. Such efforts include software and hardware improvements, as well as changes and improvements in the structural components.

Prompted by the improvement, terminals have evolved toward various designs, and thus, wearable terminals that may be worn on parts of users' bodies have come to prominence, for which necessity for a user interface according to characteristics of wearable terminals has emerged.

SUMMARY OF THE INVENTION

Therefore, an aspect of the detailed description is to provide a watch type mobile terminal, which can be worn on a user's wrist, capable of enhancing user convenience in displaying information thereon, and a control method thereof.

To achieve these and other advantages and in accordance with the purpose of this specification, as embodied and broadly described herein, a watch type mobile terminal configured to be wearable on a wrist may include: a display unit configured to display screen information; a terminal body configured to allow the display unit to be installed therein and disposed on the wrist; a sensing unit configured to sense a position in which the mobile terminal is worn; and a controller configured to allocate a particular region of the display unit, as a control region for receiving a control command based on the sensing result, and process a user's touch input applied to the control region, as a control command for controlling an operation of the mobile terminal.

In an exemplary embodiment of the present disclosure, the controller may allocate a region for the user to relatively easily access, as a control region, according to a position in which the mobile terminal is worn, by using the sensing result, and the position of the control region may vary depending on which of the user's wrists the mobile terminal is worn.

In an exemplary embodiment of the present disclosure, in a first state in which the mobile terminal is worn on the user's left wrist, the controller may allocate the control region to one side of the display unit, and in a second state in which the mobile terminal is worn on the user's right wrist, the controller may allocate the control region to the other side of the display unit.

In an exemplary embodiment of the present disclosure, in the first state, the control region may be positioned in a lower right portion of the display unit based on a virtual central axis of the terminal body, and in the second state, the control region may be positioned in lower left portion of the display unit based on the virtual central axis of the terminal body.

In an exemplary embodiment of the present disclosure, when a function icon for receiving a control command related to an operation of the mobile terminal needs to be output, the controller may output the function icon to the allocated control region.

In an exemplary embodiment of the present disclosure, in a state in which the function icon is not output to the allocated control region, the particular region may have the same attribute as that of other region.

In an exemplary embodiment of the present disclosure, in a state in which the function icon is not output to the allocated control region, when a pre-set type touch is applied to the allocated control region, at least one among a function icon related to the current operation of the mobile terminal and a basic operation function icon of the mobile terminal may be output to the allocated control region.

In an exemplary embodiment of the present disclosure, the sensing unit may sense a movement of the wrist on which the mobile terminal is worn, and when the sensed movement of the wrist exceeds a reference range, the controller may re-allocate a region, at least a portion thereof being different from the particular region, as a control region such that the position of the control region is changed in response to the movement of the wrist.

In an exemplary embodiment of the present disclosure, in a state in which certain screen information is displayed on the display unit, when an event occurs in the mobile terminal, information related to the generated event may be displayed in at least one region of the display unit, excluding the control region, and at least one function icon for receiving a control command related to the generated event may be displayed in the control region.

In an exemplary embodiment of the present disclosure, the sensing unit may be configured to sense at least one among a movement of the mobile terminal and a direction of the user's eyes with respect to the display unit, and the controller may determine a position in which the information related to the event is to be displayed in consideration of at least one of the movement of the mobile terminal and the direction of the user's eyes.

In an exemplary embodiment of the present disclosure, the sensing unit may sense that the terminal body is rotated based on a virtual plane parallel to the display unit, and the controller may control the display unit such that screen information displayed on the display unit is maintained to be output in the direction of the user's eyes even though the terminal body is rotated.

In an exemplary embodiment of the present disclosure, the screen information displayed on the display unit may be shifted in an opposite direction of the rotational direction of the terminal body.

To achieve these and other advantages and in accordance with the purpose of this specification, as embodied and broadly described herein, a watch type mobile terminal configured to be wearable on a wrist may include: a terminal body disposed on the wrist; a display unit installed in the terminal body and configured to output clock information and allow for a touch input; a situational information unit configured to collect situational information in environment surrounding the terminal body; and a controller configured to reflect the collected situational information in the clock information output on the display unit.

In an exemplary embodiment of the present disclosure, when a pre-set touch input is applied to the clock information, the controller may control the display unit to output at least a portion of the collected situational information.

In an exemplary embodiment of the present disclosure, the clock information may include an hour hand image, a minute hand image, and a background image representing the current time, and a form of at least one among the hour hand image, the minute hand image, and the background image may be determined based on the collected situational information.

In an exemplary embodiment of the present disclosure, the watch type mobile terminal may further include: a memory configured to store mode information regarding a plurality of situation modes classified based on the collected situational information, wherein the controller may control the display unit such that the clock information corresponds to a situation mode related to the current situational information in environment surrounding the terminal body, among the plurality of situation modes.

In an exemplary embodiment of the present disclosure, when the collected situational information is updated, if a situation mode related to the updated situational information is different from a situation mode related to the current situational information in environment surrounding the terminal body, the controller may change the clock information to correspond to the situation mode related to the updated situational information, and if the situation mode related to the updated situational information is the same as the situation mode related to the current situational information in environment surrounding the terminal body, the controller may maintain the clock information.

In an exemplary embodiment of the present disclosure, when a pre-set touch input is applied to the clock information, the controller may output at least one among a virtual hour hand image and a virtual minute hand image for setting time information related to a particular function to the display unit.

In an exemplary embodiment of the present disclosure, at least one of the virtual hour hand image and the virtual minute hand image may be movable by a drag touch, and by using time information indicated by at least one among the virtual hour hand image and the virtual minute hand image moved by the drag touch, when the current time corresponds to a pre-set time related to the time information, the controller may execute the particular function.

In an exemplary embodiment of the present disclosure, when setting of the time information using at least one of the virtual hour hand image and the virtual minute hand image is completed, the controller may output a plurality of icons corresponding to a plurality of selectable functions to the display unit, and when any one of the plurality of icons is selected, the controller may designate the selected function as the particular function and execute the particular function.

In an exemplary embodiment of the present disclosure, when the current time is close to a set time related to the time information, the controller may change the clock information in order to inform the fact that the set time nears.

In an exemplary embodiment of the present disclosure, the collected situation information may include position information of the terminal body, and when setting of the time information is completed and the user who wears the terminal body has moved by a time corresponding to the set time information from the current position of the terminal body based on the position information, the controller may output place information related to a place within a range in which the user can arrive.

In an exemplary embodiment of the present disclosure, the situational information unit may collect information regarding a movement of the terminal body, and when the movement of the terminal body exceeds a reference range, the controller may determine that the user who wears the terminal body on his or her wrist is doing exercise, and output clock information related to the exercise based on the determination result.

In an exemplary embodiment of the present disclosure, when the movement of the terminal body is repeated in a particular pattern, the controller may reflect the number of times of the repeated movements correspond to the pattern in the clock information.

In an exemplary embodiment of the present disclosure, the situational information collected through the situational information unit may include position information of the terminal body and position information of an object spaced apart from the terminal body, and the controller may control the display unit to reflect the relative position information of the object with respect to the terminal body in the clock information.

In an exemplary embodiment of the present disclosure, the situational information unit may collect information regarding weather of an area in which the terminal body is positioned and information regarding a movement of the terminal body, and when the movement of the terminal body corresponds to a pre-set gesture maintained for a particular period of time, the controller may reflect the collected situational information related to weather in the clock information.

Further scope of applicability of the present application will become more apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from the detailed description.

BRIEF DESCRIPTION OF THE DRAWINGS

The accompanying drawings, which are included to provide a further understanding of the invention and are incorporated in and constitute a part of this specification, illustrate exemplary embodiments and together with the description serve to explain the principles of the invention.

In the drawings.

DETAILED DESCRIPTION OF THE INVENTION

The embodiments of the present invention will now be described with reference to the accompanying drawings, in which like numbers refer to like elements throughout although the embodiments are different, and a description of the like elements a first embodiment will be used for those of the different embodiment. In the following description, usage of suffixes such as 'module', 'part' or 'unit' used for referring to elements is given merely to facilitate explanation of the present invention, without having any significant meaning by itself. In describing the present invention, if a detailed explanation for a related known function or construction is considered to unnecessarily divert the gist of the present invention, such explanation has been omitted but would be understood by those skilled in the art. The accompanying drawings of the present invention aim to facilitate understanding of the present invention and should not be construed as limited to the accompanying drawings.

Mobile terminals described in the present disclosure may include mobile phones, smart phones, notebook computers, tablet computers, digital broadcast receivers, PDAs (Personal Digital Assistants), PMPs (Portable Multimedia Player), navigation devices, slate PCs, tablet PCs, ultrabooks, and the like. However, it would be understood by a person skilled in the art that the configuration according to embodiments of the present invention can be also applicable to the fixed types of terminals such as digital TVs, desk top computers, and the like, except for any elements especially configured for a mobile purpose.

Figure 1:
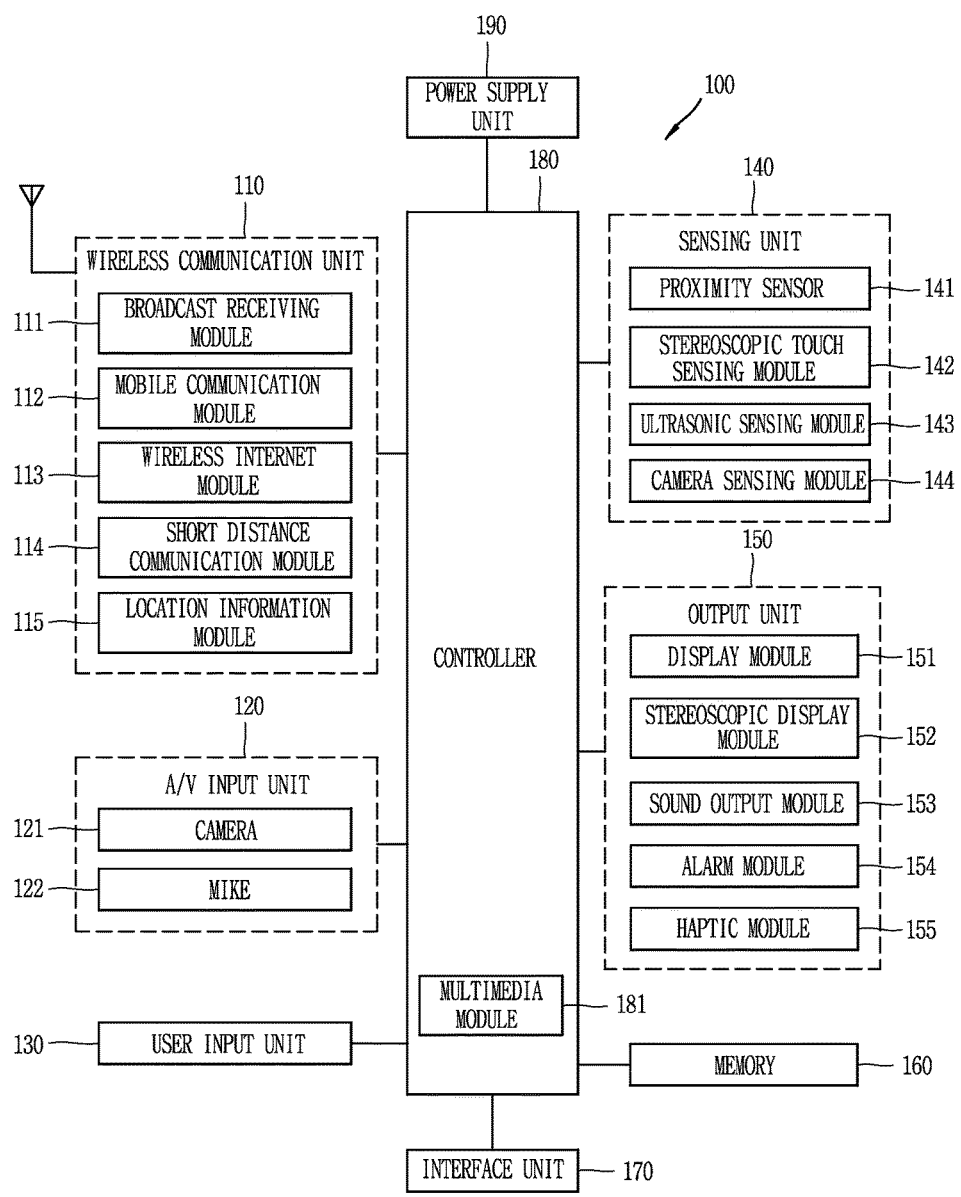
FIG. 1 is a block diagram of a mobile terminal according to an exemplary embodiment disclosed in the present disclosure.

FIG. 1 is a block diagram of a mobile terminal according to an embodiment of the present invention.

The mobile terminal 100 may include a wireless communication unit 110, an A/V (Audio/Video) input unit 120, a user input unit 130, a sensing unit 140, an output unit 150, a memory 160, an interface unit 170, a controller 180, and a power supply unit 190, etc. FIG. 1 shows the mobile terminal as having various components, but it should be understood that implementing all of the illustrated components is not a requirement. Greater or fewer components may alternatively be implemented.

The elements of the mobile terminal will be described in detail as follows.

The wireless communication unit 110 typically includes one or more modules allowing radio communication between the mobile terminal 100 and a wireless communication system or a network in which the mobile terminal is located. For example, the wireless communication unit may include at least one of a broadcast receiving module 111, a mobile communication module 112, a wireless Internet module 113, a short-range communication module 114, and a location information module 115.

The broadcast receiving module 111 receives broadcast signals and/or broadcast associated information from an external broadcast management server (or other network entity) via a broadcast channel.

The broadcast channel may include a satellite channel and/or a terrestrial channel. The broadcast management server may be a server that generates and transmits a broadcast signal and/or broadcast associated information or a server that receives a previously generated broadcast signal and/or broadcast associated information and transmits the same to a terminal. The broadcast signal may include a TV broadcast signal, a radio broadcast signal, a data broadcast signal, and the like. Also, the broadcast signal may further include a broadcast signal combined with a TV or radio broadcast signal.

The broadcast associated information may refer to information associated with a broadcast channel, a broadcast program or a broadcast service provider. The broadcast associated information may also be provided via a mobile communication network and, in this case, the broadcast associated information may be received by the mobile communication module 112.

The broadcast associated information may exist in various forms. For example, it may exist in the form of an electronic program guide (EPG) of digital multimedia broadcasting (DMB), electronic service guide (ESG) of digital video broadcast-handheld (DVB-H), and the like.

The broadcast receiving module 111 may be configured to receive signals broadcast by using various types of broadcast systems. In particular, the broadcast receiving module 111 may receive a digital broadcast by using a digital broadcast system such as multimedia broadcasting-terrestrial (DMB-T), digital multimedia broadcasting-satellite (DMB-S), digital video broadcast-handheld (DVB-H), the data broadcasting system known as media forward link only (MediaFLO®), integrated services digital broadcast-terrestrial (ISDB-T), etc. The broadcast receiving module 111 may be configured to be suitable for every broadcast system that provides a broadcast signal as well as the above-mentioned digital broadcast systems.

Broadcast signals and/or broadcast-associated information received via the broadcast receiving module 111 may be stored in the memory 160.

The mobile communication module 112 transmits and/or receives radio signals to and/or from at least one of a base station, an external terminal and a server. Such radio signals may include a voice call signal, a video call signal or various types of data according to text and/or multimedia message transmission and/or reception.

The wireless Internet module 113 supports wireless Internet access for the mobile terminal. This module may be internally or externally coupled to the terminal. The wireless Internet access technique implemented may include a WLAN (Wireless LAN) (Wi-Fi), Wibro (Wireless broadband), Wimax (World Interoperability for Microwave Access), HSDPA (High Speed Downlink Packet Access), or the like.

The short-range communication module 114 is a module for supporting short range communications. Some examples of short-range communication technology include Bluetooth™, Radio Frequency IDentification (RFID), Infrared Data Association (IrDA), Ultra-WideBand (UWB), ZigBee™, and the like.

The location information module 115 is a module for checking or acquiring a location (or position) of the mobile terminal. A typical example of the location information module is a GPS (Global Positioning System) or a WiFi (Wireless Fidelity) module.

With reference to FIG. 1, the NV input unit 120 is configured to receive an audio or video signal. The NV input unit 120 may include a camera 121 and a microphone 122. The camera 121 processes image data of still pictures or video obtained by an image capture device in a video capturing mode or an image capturing mode. The processed image frames may be displayed on a display unit 151.

The image frames processed by the camera 121 may be stored in the memory 160 (or other storage medium) or transmitted via the wireless communication unit 110. Two or more cameras 121 may be provided according to the configuration of the mobile terminal.

The microphone 122 may receive sounds (audible data) via a microphone in a phone call mode, a recording mode, a voice recognition mode, and the like, and can process such sounds into audio data. The processed audio (voice) data may be converted for output into a format transmittable to a mobile communication base station via the mobile communication module 112 in case of the phone call mode. The microphone 122 may implement various types of noise canceling (or suppression) algorithms to cancel (or suppress) noise or interference generated in the course of receiving and transmitting audio signals.

The user input unit 130 may generate input data from commands entered by a user to control various operations of the mobile terminal. The user input unit 130 may include a keypad, a dome switch, a touch pad, a jog wheel, a jog switch, and the like.

The sensing unit 140 detects a current status (or state) of the mobile terminal 100 such as an opened or closed state of the mobile terminal 100, a location of the mobile terminal 100, the presence or absence of user contact with the mobile terminal 100 (i.e., touch inputs), the orientation of the mobile terminal 100, an acceleration or deceleration movement and direction of the mobile terminal 100, etc., and generates commands or signals for controlling the operation of the mobile terminal 100. For example, when the mobile terminal 100 is implemented as a slide type mobile phone, the sensing unit 140 may sense whether the slide phone is opened or closed. In addition, the sensing unit 140 can detect whether or not the power supply unit 190 supplies power or whether or not the interface unit 170 is coupled with an external device.

The output unit 150 is configured to provide outputs in a visual, audible, and/or tactile manner (e.g., audio signal, video signal, alarm signal, vibration signal, etc.). The output unit 150 may include the display unit 151, an audio output module 153, an alarm unit 154, a haptic module 155, and the like.

The display unit 151 may display (output) information processed in the mobile terminal 100. For example, when the mobile terminal 100 is in a phone call mode, the display unit 151 may display a User Interface (UI) or a Graphic User Interface (GUI) associated with a call or other communication (such as text messaging, multimedia file downloading, etc.). When the mobile terminal 100 is in a video call mode or image capturing mode, the display unit 151 may display a captured image and/or received image, a UI or GUI that shows videos or images and functions related thereto, and the like.

The display unit 151 may include at least one of a Liquid Crystal Display (LCD), a Thin Film Transistor-LCD (TFT-LCD), an Organic Light Emitting Diode (OLED) display, a flexible display, a three-dimensional (3D) display, and an e-ink display.

Some of them may be configured to be transparent or light-transmissive to allow viewing of the exterior, which may be called transparent displays. A typical transparent display may be, for example, a TOLED (Transparent Organic Light Emitting Diode) display, or the like. Through such configuration, the user can view an object positioned at the rear side of the terminal body through the region occupied by the display unit 151 of the terminal body.

The mobile terminal 100 may include two or more display units according to its particular desired embodiment. For example, a plurality of display units may be separately or integrally disposed on one surface of the mobile terminal, or may be separately disposed on mutually different surfaces.

Also, the display unit 151 may be configured as a stereoscopic display unit 152 displaying a stereoscopic image.

Here, the stereoscopic image may be a three-dimensional (3D) stereoscopic image, and the 3D stereoscopic image is an image refers to an image making a viewer feel that a gradual depth and reality of an object on a monitor or a screen is the same as a reality space. A 3D stereoscopic image is implemented by using binocular disparity. Binocular disparity refers to disparity made by the positions of two eyes. When two eyes view different 2D images, the images are transferred to the brain through the retina and combined in the brain to provide the perception of depth and reality sense.

The stereoscopic display unit 152 may employ a stereoscopic display scheme such as stereoscopic scheme (a glass scheme), an auto-stereoscopic scheme (glassless scheme), a projection scheme (holographic scheme), or the like. Stereoscopic schemes commonly used for home television receivers, or the like, include Wheatstone stereoscopic scheme, or the like.

The auto-stereoscopic scheme includes, for example, a parallax barrier scheme, a lenticular scheme, an integral imaging scheme, or the like. The projection scheme includes a reflective holographic scheme, a transmissive holographic scheme, or the like.

In general, a 3D stereoscopic image is comprised of a left image (a left eye image) and a right image (a right eye image). According to how left and right images are combined into a 3D stereoscopic image, the 3D stereoscopic imaging method is divided into a top-down method in which left and right images are disposed up and down in a frame, an L-to-R (left-to-right, side by side) method in which left and right images are disposed left and right in a frame, a checker board method in which fragments of left and right images are disposed in a tile form, an interlaced method in which left and right images are alternately disposed by columns and rows, and a time sequential (or frame by frame) method in which left and right images are alternately displayed by time.

Also, as for a 3D thumbnail image, a left image thumbnail and a right image thumbnail are generated from a left image and a right image of the original image frame, respectively, and then combined to generate a single 3D thumbnail image. In general, thumbnail refers to a reduced image or a reduced still image. The thusly generated left image thumbnail and the right image thumbnail are displayed with a horizontal distance difference therebetween by a depth corresponding to the disparity between the left image and the right image on the screen, providing a stereoscopic space sense.

A left image and a right image required for implementing a 3D stereoscopic image is displayed on the stereoscopic display unit 152 by a stereoscopic processing unit 152a. The stereoscopic processing unit may receive the 3D image and extract the left image and the right image, or may receive the 2D image and change it into a left image and a right image.

Meanwhile, when the display unit 151 and a sensor (referred to as a 'touch sensor', hereinafter) for detecting a touch operation are overlaid in a layered manner to form a touch screen, the display unit 151 may function as both an input device and an output device. The touch sensor may have a form of a touch film, a touch sheet, a touch pad, and the like.

The touch sensor may be configured to convert pressure applied to a particular portion of the display unit 151 or a change in the capacitance or the like generated at a particular portion of the display unit 151 into an electrical input signal. The touch sensor may be configured to detect the pressure when a touch is applied, as well as the touched position and area.

When there is a touch input with respect to the touch sensor, a corresponding signal (signals) are transmitted to a touch controller. The touch controller processes the signals and transmits corresponding data to the controller 180. Accordingly, the controller 180 may recognize which portion of the display unit 151 has been touched.

With reference to FIG. 1, a proximity sensor 141 may be disposed within or near the touch screen. The proximity sensor 141 is a sensor for detecting the presence or absence of an object relative to a certain detection surface or an object that exists nearby by using the force of electromagnetism or infrared rays without a physical contact. Thus, the proximity sensor 141 has a considerably longer life span compared with a contact type sensor, and it can be utilized for various purposes.

Examples of the proximity sensor 141 may include a transmission type photoelectric sensor, a direct reflection type photoelectric sensor, a mirror-reflection type photoelectric sensor, an RF oscillation type proximity sensor, a capacitance type proximity sensor, a magnetic proximity sensor, an infrared proximity sensor, and the like. In case where the touch screen is the capacitance type, proximity of the pointer is detected by a change in electric field according to the proximity of the pointer. In this case, the touch screen (touch sensor) may be classified as a proximity sensor.

In the following description, for the sake of brevity, recognition of the pointer positioned to be close to the touch screen will be called a 'proximity touch', while recognition of actual contacting of the pointer on the touch screen will be called a 'contact touch'. In this case, when the pointer is in the state of the proximity touch, it means that the pointer is positioned to correspond vertically to the touch screen.

By employing the proximity sensor 141, a proximity touch and a proximity touch pattern (e.g., a proximity touch distance, a proximity touch speed, a proximity touch time, a proximity touch position, a proximity touch movement state, or the like) can be detected, and information corresponding to the detected proximity touch operation and the proximity touch pattern can be outputted to the touch screen.

When a touch sensor is overlaid on the stereoscopic display unit 152 in a layered manner, or when the stereoscopic display unit and a 3D sensor sensing a touch operation are combined, the stereoscopic display unit 152 may also be used as a 3D input device.

As examples of the 3D sensor, the sensing unit 140 may include a proximity sensor 141, a stereoscopic touch sensing unit 142, an ultrasonic sensing unit 143, and a camera sensing unit 144.

The proximity sensor 141 detects the distance between a sensing object (e.g., the user's finger or a stylus) applying a touch by using the force of electromagnetism or infrared rays without a mechanical contact and a detect surface. By using the distance, the terminal recognizes which portion of a stereoscopic image has been touched. In particular, when the touch screen is an electrostatic touch screen, the degree of proximity of the sensing object is detected based on a change of an electric field according to proximity of the sensing object, and a touch to the 3D image is recognized by using the degree of proximity.

The stereoscopic touch sensing unit 142 is configured to detect the strength or duration of a touch applied to the touch screen. For example, the stereoscopic touch sensing unit 142 senses pressure applying a touch, and the applied pressure is strong, the stereoscopic touch sensing unit 142 recognizes the touch as a touch with respect to an object positioned to be farther from the touch screen toward the interior of the terminal.

The ultrasonic sensing unit 143 is configured to recognize position information of the sensing object by using ultrasonic waves.

The ultrasonic sensing unit 143 may include, for example, an optical sensor and a plurality of ultrasonic sensors. The optical sensor is configured to sense light, and the ultrasonic sensors may be configured to sense ultrasonic waves. Since light is very faster than ultrasonic waves, light reaches the optical sensor very earlier than ultrasonic waves reach the ultrasonic sensors. Thus, based on light as a reference signal, a position of a wave generation source may be calculated by using a time difference between a time at which light reaches the optical sensor and a time at which ultrasonic waves reach the ultrasonic sensors.

The camera sensing unit 144 includes at least one of a camera, a photo sensor, and a laser sensor.

For example, the camera and the laser sensor may be combined to detect a touch of the sensing object with respect to a 3D stereoscopic image. When distance information detected by a laser sensor is added to a 2D image captured by the camera, 3D information can be obtained.

In another example, a photo sensor may be laminated on the display device. The photo sensor is configured to scan a movement of the sensing object in proximity to the touch screen. In detail, the photo sensor includes photo diodes and transistors at rows and columns to scan content mounted on the photo sensor by using an electrical signal changing according to the quantity of applied light. Namely, the photo sensor calculates the coordinates of the sensing object according to variation of light to thus obtain position information of the sensing object.

The audio output module 153 may convert and output as sound audio data received from the wireless communication unit 110 or stored in the memory 160 in a call signal reception mode, a call mode, a record mode, a voice recognition mode, a broadcast reception mode, and the like. Also, the audio output module 153 may provide audible outputs related to a particular function performed by the mobile terminal 100 (e.g., a call signal reception sound, a message reception sound, etc.). The audio output module 153 may include a speaker, a buzzer, or other sound generating device.

The alarm unit 154 outputs a signal for informing about an occurrence of an event of the mobile terminal 100. Events generated in the mobile terminal may include call signal reception, message reception, key signal inputs, a touch input etc. In addition to video or audio signals, the alarm unit 154 may output signals in a different manner, for example, to inform about an occurrence of an event. The video or audio signals may be also outputted via the audio output module 153, so the display unit 151 and the audio output module 153 may be classified as parts of the alarm unit 154.

A haptic module 155 generates various tactile effects the user may feel. A typical example of the tactile effects generated by the haptic module 155 is vibration. The strength and pattern of the haptic module 155 can be controlled. For example, different vibrations may be combined to be outputted or sequentially outputted.

Besides vibration, the haptic module 155 may generate various other tactile effects such as an effect by stimulation such as a pin arrangement vertically moving with respect to a contact skin, a spray force or suction force of air through a jet orifice or a suction opening, a contact on the skin, a contact of an electrode, electrostatic force, etc., an effect by reproducing the sense of cold and warmth using an element that can absorb or generate heat.

The haptic module 155 may be implemented to allow the user to feel a tactile effect through a muscle sensation such as fingers or arm of the user, as well as transferring the tactile effect through a direct contact. Two or more haptic modules 155 may be provided according to the configuration of the mobile terminal 100.

The memory 160 may store software programs used for the processing and controlling operations performed by the controller 180, or may temporarily store data (e.g., a phonebook, messages, still images, video, etc.) that are inputted or outputted. In addition, the memory 160 may store data regarding various patterns of vibrations and audio signals outputted when a touch is inputted to the touch screen.

The memory 160 may include at least one type of storage medium including a Flash memory, a hard disk, a multimedia card micro type, a card-type memory (e.g., SD or DX memory, etc), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, and an optical disk. Also, the mobile terminal 100 may be operated in relation to a web storage device that performs the storage function of the memory 160 over the Internet.

The interface unit 170 serves as an interface with every external device connected with the mobile terminal 100. For example, the external devices may transmit data to an external device, receives and transmits power to each element of the mobile terminal 100, or transmits internal data of the mobile terminal 100 to an external device. For example, the interface unit 170 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating the authority of using the mobile terminal 100 and may include a user identity module (UIM), a subscriber identity module (SIM) a universal subscriber identity module (USIM), and the like. In addition, the device having the identification module (referred to as 'identifying device', hereinafter) may take the form of a smart card. Accordingly, the identifying device may be connected with the terminal 100 via a port.

When the mobile terminal 100 is connected with an external cradle, the interface unit 170 may serve as a passage to allow power from the cradle to be supplied therethrough to the mobile terminal 100 or may serve as a passage to allow various command signals inputted by the user from the cradle to be transferred to the mobile terminal therethrough. Various command signals or power inputted from the cradle may operate as signals for recognizing that the mobile terminal is properly mounted on the cradle.

The controller 180 typically controls the general operations of the mobile terminal. For example, the controller 180 performs controlling and processing associated with voice calls, data communications, video calls, and the like. The controller 180 may include a multimedia module 181 for reproducing multimedia data. The multimedia module 181 may be configured within the controller 180 or may be configured to be separated from the controller 180.

The controller 180 may perform a pattern recognition processing to recognize a handwriting input or a picture drawing input performed on the touch screen as characters or images, respectively.

Also, when a state of the mobile terminal satisfies pre-set conditions, the controller 180 may execute a locked state for limiting an input of a control command of the user. Also, in the locked state, the controller 180 may control a locked screen displayed in the locked state on the basis of a touch input sensed through the display unit 151.

The power supply unit 190 receives external power or internal power and supplies appropriate power required for operating respective elements and components under the control of the controller 180.

Various embodiments described herein may be implemented in a computer-readable or its similar medium using, for example, software, hardware, or any combination thereof.

For hardware implementation, the embodiments described herein may be implemented by using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic units designed to perform the functions described herein. In some cases, such embodiments may be implemented by the controller 180 itself.

For software implementation, the embodiments such as procedures or functions described herein may be implemented by separate software modules. Each software module may perform one or more functions or operations described herein.

Software codes can be implemented by a software application written in any suitable programming language. The software codes may be stored in the memory 160 and executed by the controller 180.

Hereinafter, a communication system implementable through the mobile terminal 100 according to an embodiment of the present invention will be described.

Figure 2A:
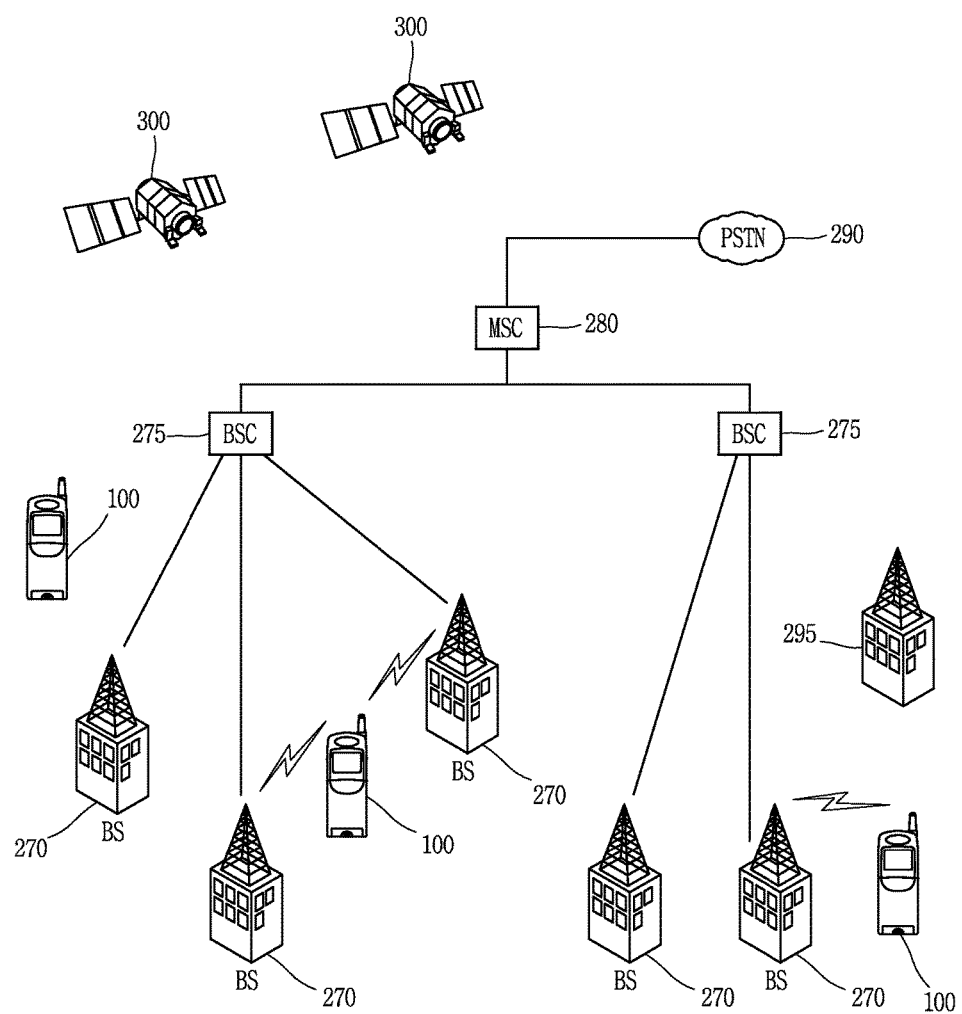
FIGS. 2A and 2B are conceptual views of a communication system in which the mobile terminal according to an exemplary embodiment of the present disclosure is operable.
Figure 2B:
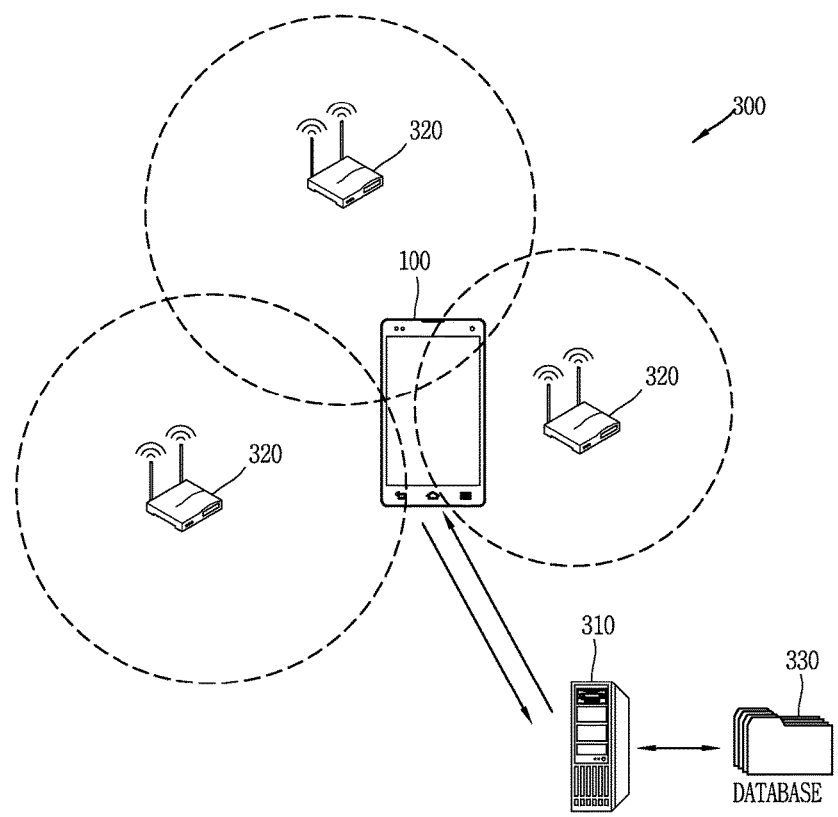

FIGS. 2A and 2B are conceptual views of communication systems in which the mobile terminal 100 according to an embodiment of the present invention is operable.

First, referring to FIG. 2A, a communication system may use different air interfaces and/or physical layers. For example, air interfaces utilized by the communication systems include example, frequency division multiple access (FDMA), time division multiple access (TDMA), code division multiple access (CDMA), and universal mobile telecommunications system (UMTS) (in particular, long term evolution (LTE)), global system for mobile communications (GSM), and the like. As a non-limiting example, the description hereafter relates to a CDMA communication system, but such teachings apply equally to other types of systems.

Hereinafter, for the description purpose, CDMA will be described, but, obviously, the present invention is applicable to any communication system including a CDMA wireless communication system.

Referring to FIG. 2, a CDMA wireless communication system may include a plurality of mobile terminals 100, a plurality of base stations (BSs) 270, base station controllers (BSCs) 275, and a mobile switching center (MSC) 280. The MSC 280 is configured to interface with a public switch telephone network (PSTN) 290. The MSC 280 is also configured to interface with the BSCs 275, which may be coupled to the base stations 270 via backhaul lines. The backhaul lines may be configured in accordance with any of several known interfaces including, for example, E1/T1, ATM, IP, PPP, Frame Relay, HDSL, ADSL, or xDSL. It is to be understood that the system as shown in FIG. 2 may include a plurality of BSCs 275.

Each BS 270 may serve one or more sectors (or regions), each sector covered by an omni-directional antenna or an antenna pointed in a particular direction radially away from the BS 270. Alternatively, each sector may be covered by two or more antennas for diversity reception. Each BS 270 may be configured to support a plurality of frequency assignments, and each frequency assignment has a particular spectrum (e.g., 1.25 MHz, 5 MHz, etc).

The intersection of a sector and frequency assignment may be referred to as a CDMA channel. The BS 270 may also be referred to as base station transceiver subsystems (BTSs) or other equivalent terms. In such case, the term "base station" may be used to collectively refer to a single BSC 275 and at least one BS 270. The base station may also be referred to as a "cell site". Alternatively, individual sectors of a particular BS 270 may be referred to as a plurality of cell sites.

As shown in FIG. 2A, a broadcasting transmitter (BT) 295 transmits a broadcast signal to the mobile terminals 100 operating within the system. The broadcast receiving module 111 as shown in FIG. 1 is provided at the terminal 100 to receive broadcast signals transmitted by the BT 295.

Also, in FIG. 2A, several global positioning systems (GPS) satellites 300 are shown. The satellites 300 help locate at least one of a plurality of terminals 100. In FIG. 2, several satellites 300 are depicted, but it is understood that useful positioning information may be obtained with any number of satellites. The GPS module 115 as shown in FIG. 1 is typically configured to cooperate with the satellites 300 to obtain desired positioning information. Instead of or in addition to GPS tracking techniques, other technologies that may track the location of the mobile terminals may be used.

In addition, at least one of the GPS satellites 300 may selectively or additionally handle satellite DMB transmissions.

As one typical operation of the wireless communication system, the BSs 270 receive reverse-link signals from various mobile terminals 100. The mobile terminals 100 typically engaging in calls, messaging, and other types of communications. Each reverse-link signal received by a particular base station 270 is processed within the particular BS 270. The resulting data is forwarded to an associated BSC 275. The BSC provides call resource allocation and mobility management functionality including the coordination of soft handoff procedures between BSs 270. The BSCs 275 also route the received data to the MSC 280, which provides additional routing services for interfacing with the PSTN 290. Similarly, the PSTN 290 interfaces with the MSC 280, the MSC interfaces with the BSCs 275, and the BSCs 275 in turn control the BSs 270 to transmit forward-link signals to the mobile terminals 100.

Next, a method of acquiring the location information of a mobile terminal using a WiFi (Wireless Fidelity) positioning system (WPS) will be described with reference to FIG. 2B.

The WiFi positioning system (WPS) 300 refers to a location determination technology based on a wireless local area network (WLAN) using WiFi as a technology for tracking the location of the mobile terminal 100 using a WiFi module provided in the mobile terminal 100 and a wireless access point 320 for transmitting and receiving to and from the WiFi module.

The WiFi positioning system 300 may include a WiFi location determination server 310, a mobile terminal 100, a wireless access point (AP) 320 connected to the mobile terminal 100, and a database 330 stored with any wireless AP information.

The WiFi location determination server 310 extracts the information of the wireless AP 320 connected to the mobile terminal 100 based on a location information request message (or signal) of the mobile terminal 100. The information of the wireless AP 320 may be transmitted to the WiFi location determination server 310 through the mobile terminal 100 or transmitted to the WiFi location determination server 310 from the wireless AP 320.

The information of the wireless AP extracted based on the location information request message of the mobile terminal 100 may be at least one of MAC address, SSID, RSSI, channel information, privacy, network type, signal strength and noise strength.

The WiFi location determination server 310 receives the information of the wireless AP 320 connected to the mobile terminal 100 as described above, and compares the received wireless AP 320 information with information contained in the pre-established database 330 to extract (or analyze) the location information of the mobile terminal 100.

On the other hand, referring to FIG. 2B, as an example, the wireless AP connected to the mobile terminal 100 is illustrated as a first, a second, and a third wireless AP 320. However, the number of wireless APs connected to the mobile terminal 100 may be changed in various ways according to a wireless communication environment in which the mobile terminal 100 is located. When the mobile terminal 100 is connected to at least one of wireless APs, the WiFi positioning system 300 can track the location of the mobile terminal 100.

Next, considering the database 330 stored with any wireless AP information in more detail, various information of any wireless APs disposed at different locations may be stored in the database 330.

The information of any wireless APs stored in the database 330 may be information such as MAC address, SSID, RSSI, channel information, privacy, network type, latitude and longitude coordinate, building at which the wireless AP is located, floor number, detailed indoor location information (GPS coordinate available), AP owner's address, phone number, and the like.

In this manner, any wireless AP information and location information corresponding to the any wireless AP are stored together in the database 330, and thus the WiFi location determination server 310 may retrieve wireless AP information corresponding to the information of the wireless AP 320 connected to the mobile terminal 100 from the database 330 to extract the location information matched to the searched wireless AP, thereby extracting the location information of the mobile terminal 100.

Furthermore, the extracted location information of the mobile terminal 100 may be transmitted to the mobile terminal 100 through the WiFi location determination server 310, thereby acquiring the location information of the mobile terminal 100.

Meanwhile, in an embodiment of the present invention, information processed in the mobile terminal 100 may be displayed by using the flexible display. Hereinafter, a flexible display unit will be described in detail with reference to the accompanying drawings.

Figure 3A:
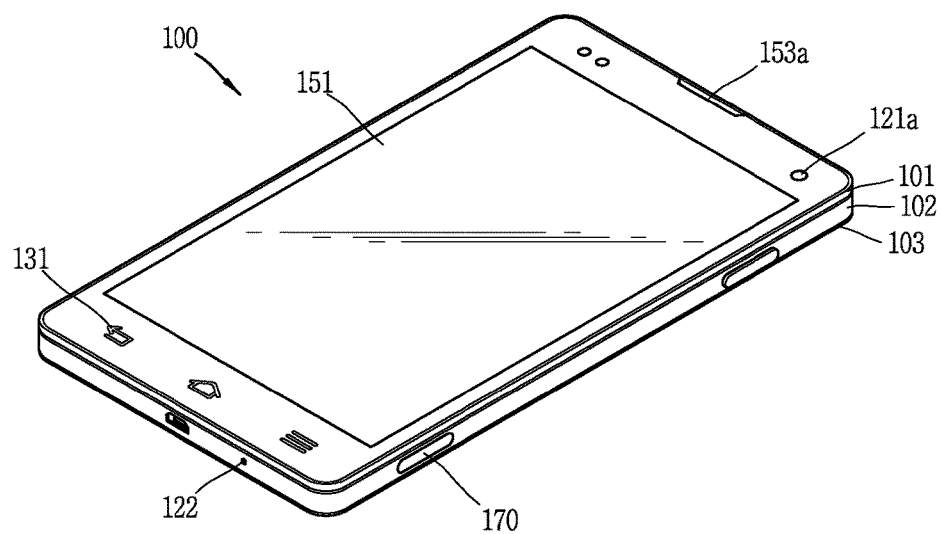
FIGS. 3A and 3B are conceptual vies illustrating a flexible display unit when a display unit of the mobile terminal according to an exemplary embodiment of the present disclosure is formed as a flexible display unit.
Figure 3B:
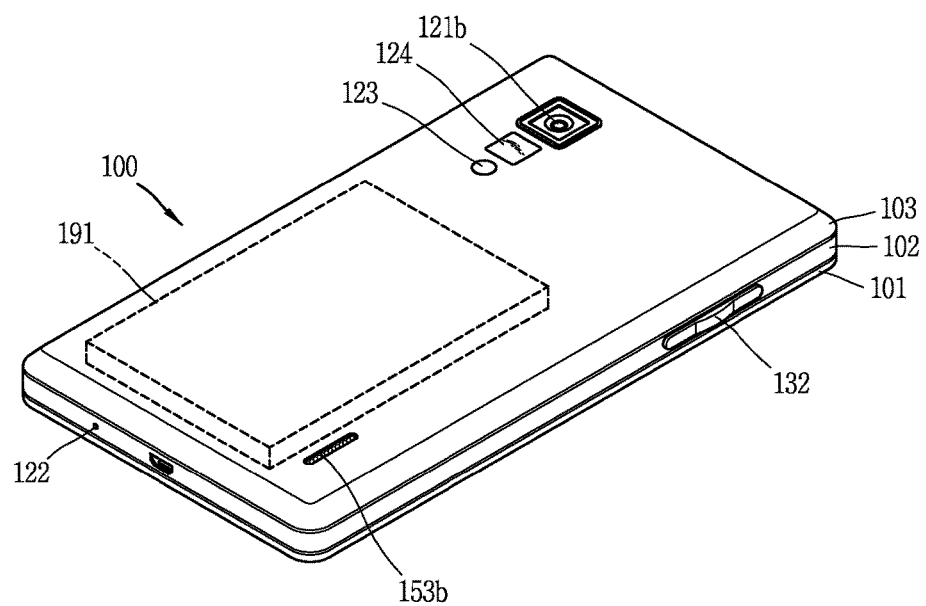

FIGS. 3A and 3B are conceptual views illustrating a flexible display unit 151 included in the mobile terminal according to an embodiment of the present invention.

As illustrated in (a) and (b) of FIG. 3A, the flexible display unit 151 may include a display which is bendable, foldable, and rollable by physical force applied from the outside. Here, the flexible display unit 151 may include a general flexible display and an electronic paper (or e-paper).

Here, a general flexible display refers to a display which is fabricated on a thin, flexible substrate which is bendable, foldable, and rollable, like paper, while maintaining display characteristics of an existing flat panel display, and thus, which is light in weight and not brittle.

Also, e-paper, a display technology employing the general features of ink, is different from a general flat panel display, in that it uses reflective light. In case of e-paper, pictures or characters may be changed by using twist balls or by using electrophoresis using capsules.

Meanwhile, the sensing unit 140 (please see FIG. 1) is included in the flexible display unit 151. The sensing unit 140 may sense information regarding bending of the flexible display unit 151. In the present disclosure, the word 'bending' may include all the meanings of 'bent', 'rolled', and 'folded'.

The sensing unit 140 may be disposed on the flexible display unit 151 on the whole or may be disposed on a portion thereof, and may sense information regarding bending of the flexible display unit 151. Here, the information regarding bending of the flexible display unit 151 may include information regarding a direction in which the flexible display unit 151 is bent, information regarding a degree to which the flexible display unit 151 is bent, information regarding a position at which the flexible display unit 151 is bent, information regarding a time duration in which the flexible display unit 151 is maintained in a bent state, and information regarding acceleration at which a bent flexible display unit 151 returns to its original state, and the like. Besides, information regarding bending of the flexible display unit 151 may include various other information that may be sensed due to bending of the flexible display unit 151.

Also, on the basis of information regarding bending of the flexible display unit 151 sensed by the sensing unit 140, the controller 180 may change information displayed on the flexible display unit 151 or may generate a control signal for controlling a function of the mobile terminal 100.

For example, as illustrated in (a) and (b) of FIG. 3A, when the flexible display unit 151 is bent in response to external physical force applied thereto, the controller 180 may realign, separate, or synthesize screen images already displayed on the flexible display unit 151, or may change a piece of music, on the basis of a direction in which the flexible display unit 151 is bent, an angle at which the flexible display unit 151 is bent, and return acceleration at which the flexible display unit 151 is returned to its original state.

In an embodiment, as illustrated in (a) and (b) of FIG. 3A, when the flexible display unit 151 is bent inwardly by external physical force, the controller 180 may display screen images such that they are close to each other on the flexible display unit 151. Also, in another embodiment, when the flexible display unit 151 is outwardly bent by external physical force, the controller 180 may display screen images such that they are separated from each other on the flexible display unit 151.

Besides, the controller 180 may variously control methods for displaying information on the flexible display unit 151 such that the user may accurately recognize information displayed on the flexible display unit 151 according to bending of the flexible display unit 151.

Meanwhile, as illustrated in FIG. 3B, the mobile terminal 100 may include a case surrounding the flexible display unit 151. Also, in consideration of the characteristics of the flexible display unit 151, the case may be configured to be bendable together with the flexible display unit 151 by external physical force.

Meanwhile, as mentioned above, in response to information regarding bending of the flexible display unit 151, the controller 180 may generate a control signal related to a function of the mobile terminal 100 according to an embodiment of the present invention.

As described above, the mobile terminals are evolving toward having various designs, and due to due to the characteristics that they are lightweight and not brittle, flexible displays have come to prominence. Flexible displays may create new user interface areas which are limited or impossible with existing glass substrate-based displays. Thus, as flexible displays have come to prominence, demands for user interfaces using the characteristics of flexible displays have emerged.

Hereinafter, the mobile terminal 100 capable of enhancing user convenience in displaying screen information on the display unit 151 of the mobile terminal that wraps around a user's wrist, and a control method thereof will be described with reference to the accompanying drawings.

Figure 4:
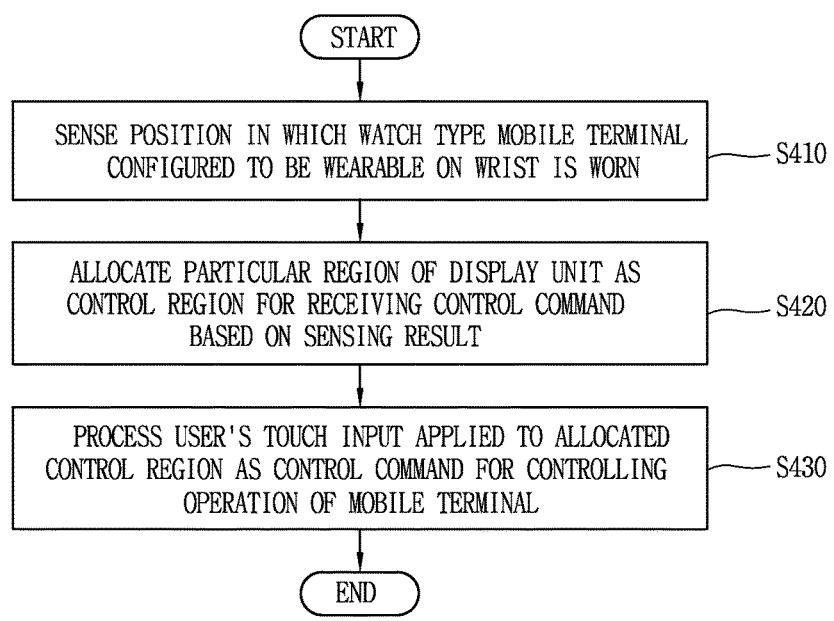
FIG. 4 is a flow chart illustrating a method for displaying information in a watch type mobile terminal according to an exemplary embodiment of the present disclosure.
Figure 5A:
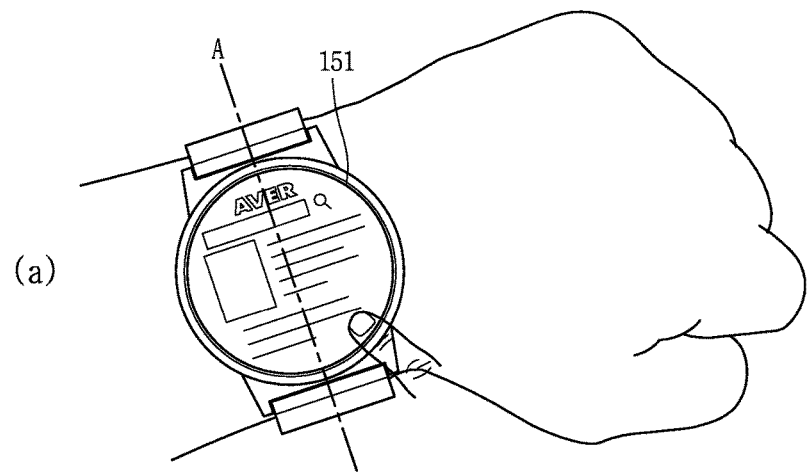
FIGS. 5A, 5B, 5C, and 5D are conceptual views illustrating a control method according to the flow chart illustrated in FIG. 4.
Figure 5A:
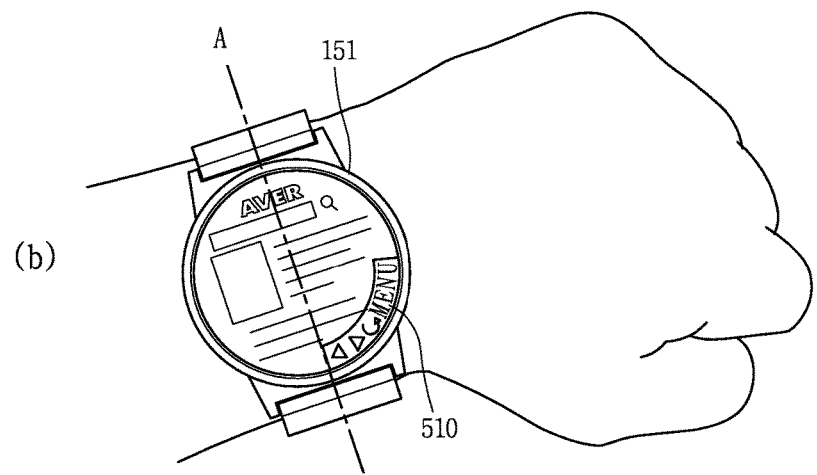
Figure 5B:
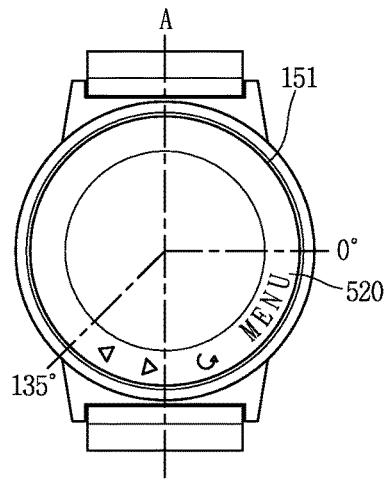
Figure 5C:
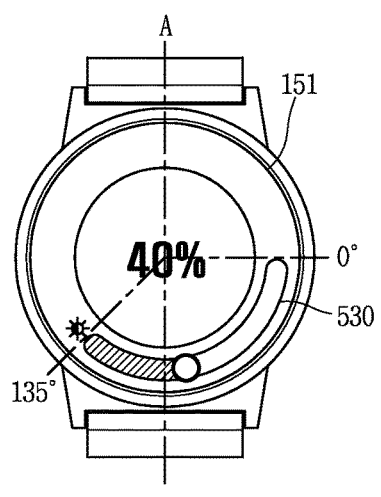
Figure 5C:
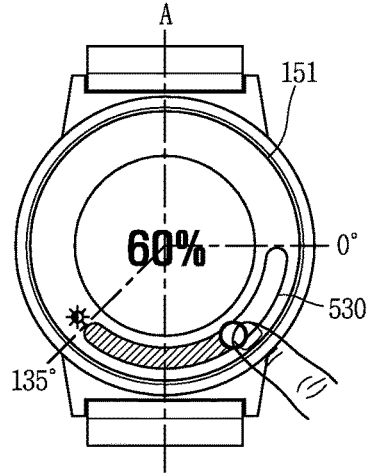
Figure 5D:
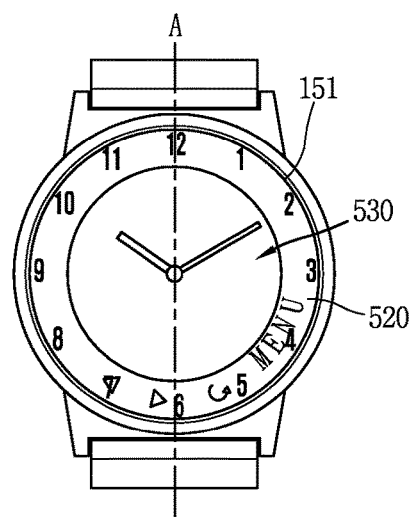
Figure 6:
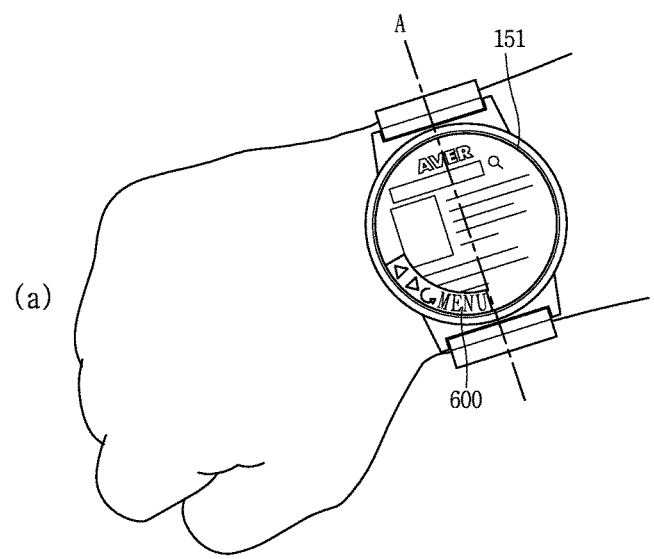
FIG. 6 is a conceptual view illustrating a method for allocating a control region in a mobile terminal according to an exemplary embodiment of the present disclosure.
Figure 6:
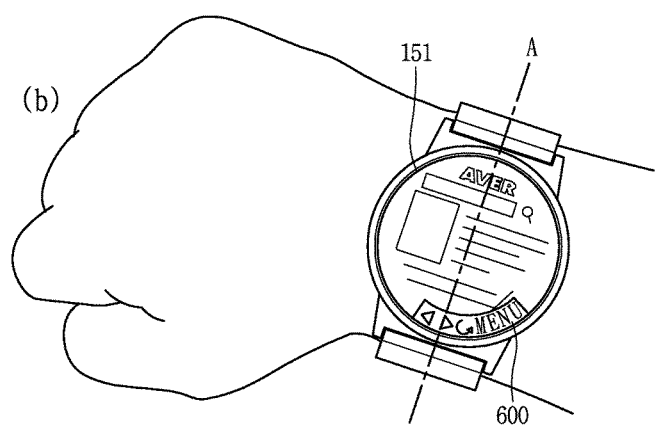

FIG. 4 is a flow chart illustrating a method for displaying information in a watch type mobile terminal according to an exemplary embodiment of the present disclosure, FIGS. 5A, 5B, 5C, and 5D are conceptual views illustrating a control method according to the flow chart illustrated in FIG. 4, and FIG. 6 is a conceptual view illustrating a method for allocating a control region in a mobile terminal according to an exemplary embodiment of the present disclosure.

FIG. 4 is a flow chart illustrating an embodiment of a terminal 100 (please refer to FIG. 1, or a watch type mobile terminal) according to the present disclosure. The mobile terminal 100 includes a terminal body, a display unit 151 (please refer to FIG. 1), a sensing unit 140 (please refer to FIG. 1), and a controller 180 (please refer to FIG. 1). Here, the display unit 151 may be configured as a flexible display unit, or any other display unit. Hereinafter, terms of a mobile terminal and a watch type mobile terminal may be used together, and although a watch type mobile terminal is expressed as a mobile terminal, the expressed mobile terminal may be understood as a watch type mobile terminal.

Meanwhile, referring to FIG. 4, a position in which the watch type mobile terminal, configured to be worn on a wrist, is worn is sensed in step S410.

In the step of sensing a position in which the mobile terminal is worn, various types information related to a movement or a position of the mobile terminal such as a degree of tilting of the mobile terminal, a degree of movement of the mobile terminal, as well as a position in which the mobile terminal is worn, and the like, may be sensed.

Here, the information related to a position in which the mobile terminal is worn may be whether a wrist on which the mobile terminal is worn is a left wrist or a right wrist, or a direction in which a wrist on which the mobile terminal is worn faces, or the like.

The sensing unit may include a sensor formed to measure at least one of a direction in which a wrist on which the mobile terminal is worn faces, a position of the wrist, and a movement of the wrist, in real time or at pre-set time intervals. Hereinafter, information related to at least one among the direction in which the wrist on which the mobile terminal is worn faces, a position of the wrist, and a movement of the wrist will be referred to as position information of the mobile terminal". Namely, when controlling is performed by the controller 180 of the mobile terminal based on "position information of the mobile terminal", it may mean that the controller 180 controls the mobile terminal based on at least one among a direction in which a wrist on which the mobile terminal is worn faces, a position of the wrist, and a movement of the wrist.

Meanwhile, in an embodiment for sensing position information of the mobile terminal, the sensing unit 140 may include an operation recognition sensor (not shown). The operation recognition sensor may include at least one among a terrestrial magnetism sensor, a gyro sensor, and an acceleration sensor.

The terrestrial magnetism sensor is a sensor for detecting a direction and a magnitude of a terrestrial magnetism, and generating an electrical signal by using the detected direction and magnitude of terrestrial magnetism. The gyro sensor is a sensor for detecting a rotational speed of the terminal body and generating an electrical signal by using the detected rotational speed of the terminal body. The acceleration sensor is a sensor for measuring a direction of gravitational acceleration, detecting a change in acceleration in any one direction, and generating an electrical signal by using the measured direction of the gravitational acceleration and the detected changed in acceleration in any one direction.

Accordingly, the sensing unit 140 may sense whether a wrist rotates. Namely, the sensing unit 140 may detect a displacement according to a rotation of the wrist, namely, a rotational direction and a rotational angle, and generate an electrical signal by using the detected displacement. Upon detecting a rotational direction and a rotational angle of the wrist, the sensing unit 140 may sense a direction in which the terminal body wraps around the wrist, namely, a position of the mobile terminal.

In another embodiment for obtaining position information of the mobile terminal, the sensing unit 140 may include an eye searching unit (not shown). The eye searching unit may search for the user's eye by using at least one among a camera sensor 121 (please refer to FIG. 1) and an infrared sensor (not shown). Here, a plurality of camera sensors may be provided.

In detail, an infrared ray emitted from the infrared sensor may be reflected from the retina of the user's eye within a predetermined viewing range with respect to the display unit 151. The reflected infrared ray may be input to the eye searching unit. Thereafter, the eye searching unit may search for a user's vision by using a user image obtained by the infrared or camera sensor 121. Accordingly, the sensing unit 140 may sense which portion of the display unit 151 the user is watching In another embodiment for obtaining position information of the mobile terminal, the sensing unit 140 may include an illumination sensor (not shown). The illumination sensor may sense ambient light and detect a portion of the display unit 151 facing the ground ad a portion of the display unit 151 facing the floor.

In this manner, when position information of the mobile terminal is obtained through the sensing unit 140, a particular region of the display unit 151 is allocated as a control region for receiving a control command in step S420.

Namely, based on the position information of the mobile terminal obtained through the sensing unit 140, the controller 180 may determine how the mobile terminal is currently placed with respect to the user. Based on the determination result, the controller 180 may allocate a particular region optimized for the user to apply a control command, as a control region.

Namely, the controller 180 may select one of a display region of the display unit 151, as a control region.

As discussed above in step S420, when the control region is allocated, a user's touch input applied to the allocated control region is processed as a control command for controlling an operation of the mobile terminal in step S430.

Here, the control region is a region for receiving a control command for controlling driving of the mobile terminal, an operation of the mobile terminal, or the currently output screen information, from the user, and the controller 180 may recognize the touch applied to the control region, as a control command.

For example, at least one icon, function icon, function key, visual key, and the like, may be displayed in the control region, and when a touch applied to at least one of the keys displayed in the control region is sensed, the controller 180 may perform a function or an operation associated with the touch-sensed key.

Meanwhile, when the control region is allocated, the controller 180 preferentially disposed information items related to controlling in the allocated control region. Here, if a space of the control region is insufficient, the information items related to controlling may be disposed outside the control region.

Meanwhile, the controller 10 may select a region to be allocated as a control region in consideration of position information of the mobile terminal sensed through the sensing unit 140, and may change a position, a size, or the like, of the region allocated as a control region depending on position information of the mobile terminal.

Also, with the control region allocated, when the position information of the mobile terminal is changed, the controller 180 may change the previously allocated control region based on the changed position information of the mobile terminal. Namely, in the mobile terminal according to the present exemplary embodiment, a control region may be allocated such that the user may most easily apply a control command to the watch type mobile terminal, in consideration of relative positions between the user and the mobile terminal.

In detail, as illustrated in (a) of FIG. 5A, in a case in which the mobile terminal is worn on the user's left wrist, it may be more convenient for the user to touch the display unit 151 with his right hand. Namely, it is easier for the user to apply touch to a right region based on a length (A) direction of the mobile terminal, and thus, as illustrated in (a) the controller 180 may allocate a right region 510 as a control region based on the length direction (A) of the mobile terminal in consideration of the user convenience.

Also, in a case in which an upper portion of the mobile terminal is allocated as a control region, the user's finger may cover the display unit 151 to touch the control region, and thus, the controller 180 may preferentially allocate a lower portion as a control region, over the upper portion. Also, besides this reason, it may be easier for the user to touch a lower portion of the display unit 151 relatively close to the user's body or finger, the controller 180 may preferentially allocate the lower portion of the display unit 151 as a control region. Thus, as illustrated in (b) of FIG. 5A, the controller 180 may allocate the lower right portion of the mobile terminal as the control region 510.

Meanwhile, information items displayed in the control region may vary depending on a function currently executed in the mobile terminal, an operational state of the mobile terminal, and a user request, without being limited to a particular example.

Also, it will be obvious to a person skilled in the art that, even though the control region 510 is allocated, it does not mean that a control command cannot be received by a region other than the control region 510.

In this manner, the controller 180 may allocate a region relatively easily accessed by the user depending on a position where the mobile terminal is worn, as a control region by using the sensing results from the sensing unit 150. The position of the control region may vary depending on which of the user's wrist the mobile terminal is worn, and here, in a first state in which the mobile terminal is worn on the user's left wrist, the controller 180 may allocate a control region to one side of the display unit 151, and in a second state in which the mobile terminal is worn on the user's right wrist, the controller 180 may allocate a control region to the other side of the display unit 151.

In this case, in the first state, the control region may be positioned in the lower right portion of the display unit 151 based on a virtual central axis (the length direction (A)) of the terminal body of the mobile terminal, and in the second state, the control region may be positioned in the lower left portion of the display unit 151 based on the virtual central axis of the terminal body.

Also, when a function icon for receiving a control command related to an operation of the mobile terminal needs to be output, the controller 180 may output the function icon to the allocated control region. Namely, in the control region, information items related to controlling of the mobile terminal may be displayed as needed.

Meanwhile, in a state in which the function icon is not output to the control region, the particular region may have the same attribute as that of other region. Namely, in a case in which a Web page is output on other region, information items continued from the Web page displayed in other region may be displayed in the control region. In a case in which the function icon is to be output to the control region, the controller 180 may output the function icon to the information output on the display unit 151 in an overlapping manner.

Meanwhile, in a state in which the function icon is not output on the allocated control region, when a pre-set type of touch is applied to the allocated control region, the controller 180 may output at least one of a function icon related to the current operation of the mobile terminal and a basic operation function icon of the mobile terminal to the allocated control region. Namely, when a pre-set type touch input (for example, a long touch input, a double touch input, etc.) is applied to the allocated control region or a peripheral region thereof, the controller 180 may output function keys to the allocated control region.

Meanwhile, as illustrated in FIG. 5B, a control region may be allocated to have a predetermined size. Namely, the controller 180 may allocate a control region having a predetermined size to a display region based on position information of the mobile terminal. For example, as illustrated in FIG. 5B, when the body of the mobile terminal has a circular shape, the controller 180 may allocate a region corresponding to a predetermined angle in the circular terminal body, as a control region, and in addition, the controller 180 may allocate a particular portion (for example, a circumferential portion 520 of the mobile terminal) of the region corresponding to the predetermined angle, as a control region.

Thus, as illustrated in FIG. 5C, the controller 180 may allocate a particular portion 530 as a control region, and receive a touch applied to the allocated control region, as a control command.

Meanwhile, as illustrated in FIG. 5D, in the mobile terminal according to an exemplary embodiment of the present disclosure, clock information (530) may be basically displayed on the display unit 151. Namely, in the present disclosure, making the most of the characteristics of the watch type mobile terminal, clock information may be displayed for the user all the time. Also, whether to continuously display clock information may be determined based on a user selection. Namely, in a case in which the display unit 151 is turned on and a screen corresponding to a particular application or screen information based on a user request is not displayed on the display unit 151, clock information may be displayed on the display unit. In this case, even when the screen corresponding to a particular application or the screen information based on a user request is displayed on the display unit 151, the clock information may be continuously output to overlap with such information on the display unit 151.

Meanwhile, as discussed in the former example, when the mobile terminal is worn on the user's right wrist, the controller 180 may allocate the lower left portion based on the length direction (A), as a control region 600.

Also, when position information of the mobile terminal is changed as the user's wrist moves or a direction of the user's eyes is changed, the controller 180 may change the position of the allocated control region based on the changed position information of the mobile terminal.

For example, in a case in which the wrist in the position of (a) of FIG. 6 slopes more downwardly, the control region may be allocated to a portion lower than the control region illustrated in (a) of FIG. 6 based on the reference axis corresponding to the length direction (A) as illustrated in (b) of FIG. 6.

Meanwhile, the controller 180 may determine whether to re-allocate the control region depending on a degree to which the wrist moves or a direction of the user's eyes is changed. Namely, only when the range in which the wrist moves or the range in which the direction of the eyes is changed exceeds a reference range, the controller 180 may re-allocate a region at least a portion of which is different from the previously allocated control region, as a control region to thus change the position of the control region.

As discussed above, in the mobile terminal and the control method thereof according to an exemplary embodiment of the present disclosure, by allocating a display region in which user convenience is enhanced, as a control region, the user may apply a control command to the mobile terminal more conveniently.

Hereinafter, a method for displaying information related to controlling in an allocated control region will be described with reference to the accompanying drawings. FIGS. 7A, 7B, 8A, 8B, 9A, and 9B are conceptual views illustrating a method for displaying a control region in a mobile terminal according to an exemplary embodiment of the present disclosure.

Figure 7A:
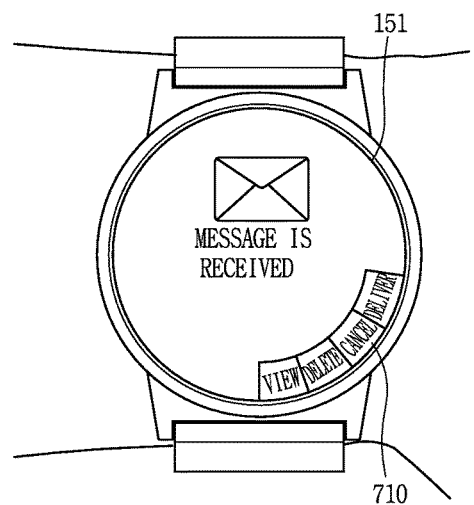
FIGS. 7A, 7B, 8A, 8B, 8C, 9A, and 9B are conceptual views illustrating a method for displaying a control region in a mobile terminal according to an exemplary embodiment of the present disclosure.

In the following description, it is assumed that a watch type mobile terminal is worn on the user's left wrist. Examples of information displayed in an allocated control region in the watch type mobile terminal will be described. First, as illustrated in FIG. 7A, when an event occurs in the mobile terminal, control information items related to the generated event may be displayed in a control region. These control information items may be preferentially displayed in the control region cooperatively according to the occurrence of the event.

Here, the event may include an event that occurs in an application installed in the mobile terminal. For example, in a case in which information is received from an external server or an external terminal, in relation to a particular application, it may be expressed that an "event has occurred". Also, an event may occur in an application installed in the mobile terminal. For example, when an alarm time arrives in an alarm function application, alarm information may be output.

In a specific example, when the mobile terminal with a message function application installed therein receives a message from an external server or an external terminal as illustrated in FIG. 7A, at least one function key for processing an operation related to the received message may be output to a control region 710. Meanwhile, a size of the control region 710 may be varied according to the number of function keys to be displayed.

Figure 7B:
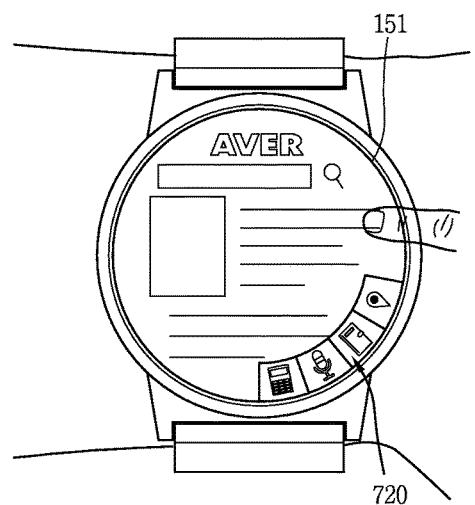

Also, as illustrated in FIG. 7B, when a pre-set type of touch (for example, a long touch) is applied to the display unit 151, the controller 180 may output icons of applications being executed to an allocated control region 720 in order to provide information regarding the applications being currently executed in the mobile terminal. Also, when a pre-set type of touch (for example, a long touch) is applied to the display unit 151, the controller 180 may output an icon of the most recently used application to the allocated control region 720 in order to provide information regarding the recently used application in the mobile terminal.

In this manner, various types of control information may be output to the control region depending on the current situation of the mobile terminal.

Figure 8A:
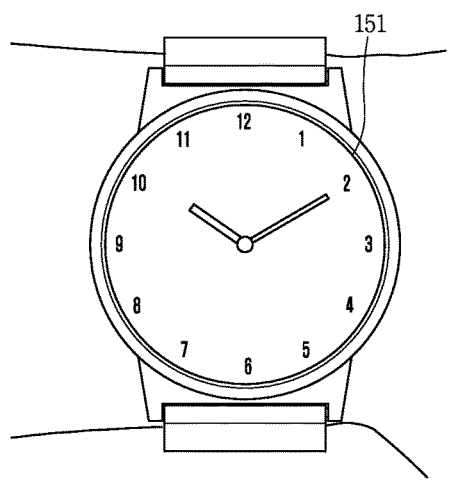
Figure 8B:
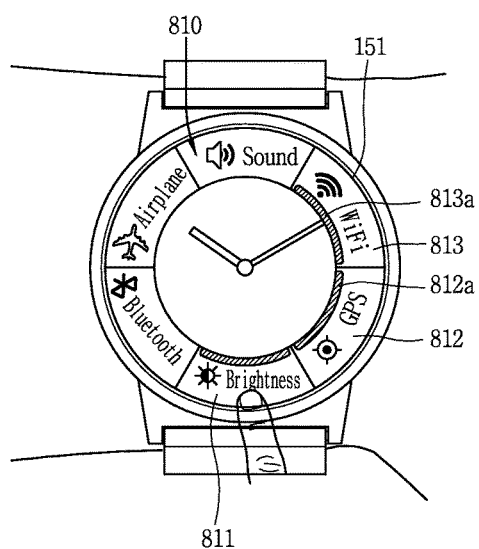

Meanwhile, in the mobile terminal according to an exemplary embodiment of the present disclosure, the size of the control region may be varied depending on an amount of information to be displayed in the control region. The controller 180 may preferentially allocate a circumferential region of the mobile terminal, as a control region. For example, as illustrated in FIG. 8A, in a state in which certain information is displayed, when control information related to an operation of the mobile terminal is requested to be displayed, the controller 180 may display the control information in the control region as in the examples described above. In a case in which an amount of the control information to be displayed is large, the controller 180 may display the control information in a circumferential region 810 of the body of the mobile terminal as illustrated in FIG. 8B.

Figure 8C:
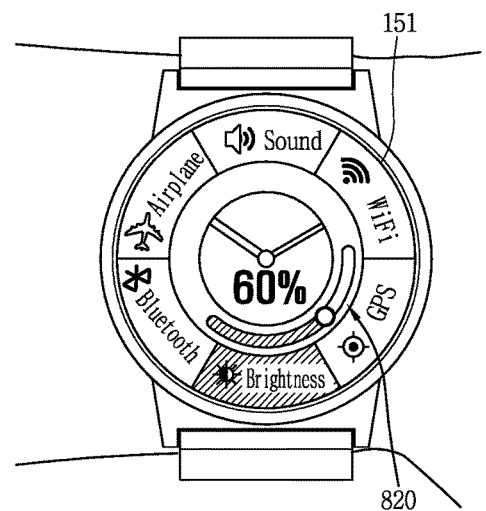

When any one of the information items displayed in the circumferential region 810 is selected and there is control information to be additionally displayed in relation to the selected information, as illustrated in FIG. 8C, the controller 180 may allocate a region convenient for the user to apply a touch in consideration of a position of the mobile terminal, as a control region and display the additional control information in an additional control region 820.

Meanwhile, in a case in which any one of the information items displayed in the circumferential region 810 is selected, the controller 180 may provide a visual effect to the selected item 811 to inform the user that the item 811 has been selected. For example, as illustrated, the controller 180 may display a graphic object in one edge of the selected item 811 to inform the user that the item 811 has been selected.

Also, the controller 180 may provide information regarding whether a function corresponding to the item is turned on or off through a graphic object in the vicinity of the item corresponding to the function which is turned on or off. For example, in a case in which a GPS or a Wi-Fi function is turned on (or activated), the controller 180 may display graphic objects 812a and 813a in the vanity of the corresponding items 812 and 813 to inform the user that the functions corresponding to the items 812 and 813 are in an ON state.

Meanwhile, when displaying such control information, the controller 180 may sequentially display the control information in regions based on pre-set priority or receive a control command in the regions based on the pre-set priority, without considering position information of the mobile terminal.

Figure 9A:
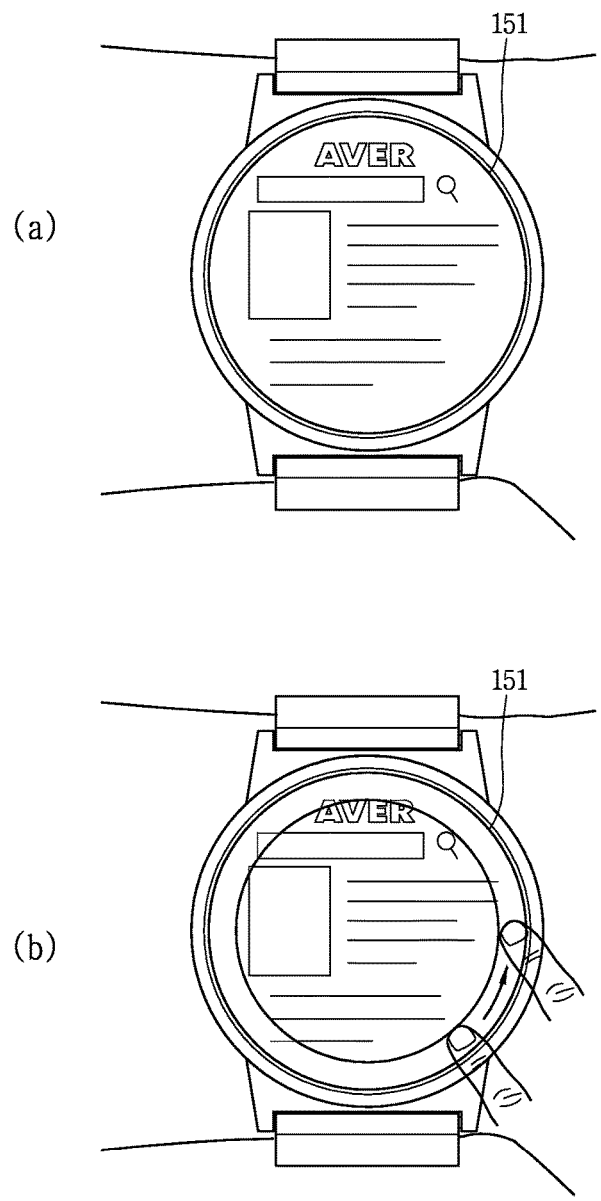
Figure 9B:
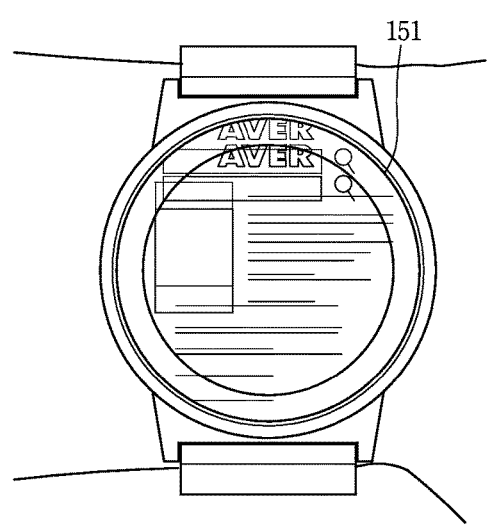

For example, in a case in which a control command is set to be received or control command is set to be displayed along the circumferential region of the mobile terminal, the controller 180 may display information in the circumferential region and drive the mobile terminal in response to a touch applied to the circumferential region. For example, in a state in which information is displayed on the display unit 151 as illustrated in (a) of FIG. 9A, when a pre-set type of touch is applied to the circumferential region of the mobile terminal as illustrated in (b) of FIG. 9A, a function associated with the pre-set type of touch may be executed as illustrated in FIG. 9B.

Here, the function associated with the pre-set type of touch may be, for example, a scroll function, and such functions may differ depending on various variables such as an operation being currently performed in the mobile terminal, a driving state, a type of output information, a type of an application being executed, and the like.

Meanwhile, as discussed above, displaying control information or receiving a control command by utilizing the circumferential region of the mobile terminal does not damage information displayed on the display unit 151 at the maximum level, enhancing user convenience in the watch type mobile terminal in which a display space is restricted.

Hereinafter, a method for displaying information in a watch type mobile terminal in consideration of relative positions of the user and the watch type mobile terminal in order to enhance user convenience, will be described in detail with reference to the accompanying drawings. FIGS. 10A, 10B, 11A, 11B, 11C, and 11D are conceptual views illustrating a method for changing a display state of screen information according to a position of a mobile terminal according to an exemplary embodiment of the present disclosure.

In the mobile terminal according to an exemplary embodiment of the present disclosure, a display direction of information may be determined in consideration of relative positions of the mobile terminal and the user. Namely, based on position information of the mobile terminal sensed through the sensing unit 140, the controller 180 may determine a display direction of screen information displayed in the mobile terminal.

Figure 10A:
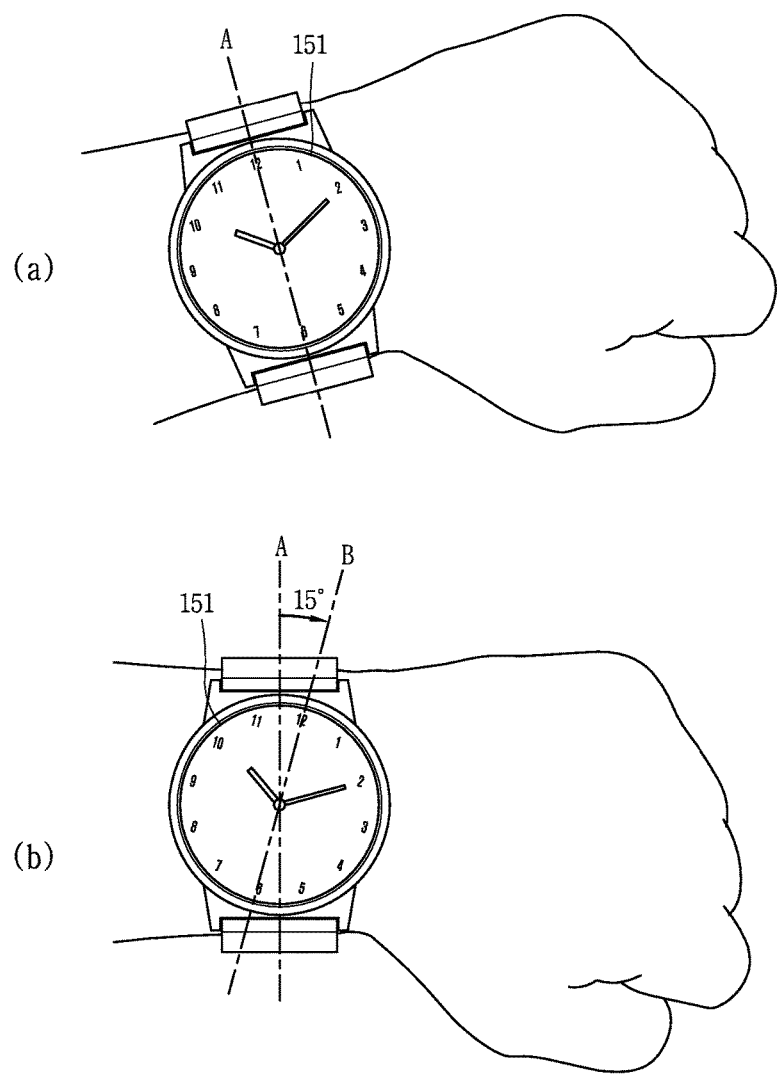
FIGS. 10A, 10B, 11A, 11B, 11C, and 11D are conceptual views illustrating a method for changing a display state of screen information according to a position of a mobile terminal according to an exemplary embodiment of the present disclosure.

For example, as illustrated in (a) of FIG. 10A, when a direction of the user's eyes and a position in which the mobile terminal is worn correspond to a virtual first reference axis A, the controller 180 may display screen information in a direction perpendicular to the virtual reference axis A. Also, as illustrated in (b) of FIG. 10A, when a direction of the user's eyes corresponds to a virtual second reference axis B, the controller 180 may display screen information in a direction perpendicular to the virtual second reference axis B. Namely, the controller 180 may determine a direction of information displayed on the display unit 151 such that the information displayed on the display unit 151 corresponds to the direction of the user's eyes.

Also, in response to a change in position information of the mobile terminal, the controller 180 may control the display unit 151 such that a display direction of screen information displayed on the display unit 151 is changed. For example, the controller 180 may display screen information in a portrait form or in a landscape form according to a direction in which the wrist faces or a direction of the user's eyes.

Also, the mobile terminal 100 according to another exemplary embodiment of the present disclosure may determine a display region in which screen information is to be displayed on the display unit 151 in consideration of the direction in which the wrist faces or the user's eyes. Accordingly, in consideration of the user's eyes, the mobile terminal 100 may display screen information in a portion that the user's eyes face in the display unit 151. As a result, user convenience can be enhanced.

For example, in a case in which event information, notification information, and the like, exist, the controller 180 may preferentially display such information in a region that can be relatively easily recognized by the user. For example, an information display region 1010 that can be relatively easily recognized by the user may be an upper portion based on the direction of the user's eyes as illustrated in (a) of FIG. 10B.

In addition, the controller 180 may select a display region in which information is to be displayed in the display unit 151. In detail, the controller 180 may select a position, a size, and a shape of the information display region. Accordingly, a portion having good visibility for the user in the range in which the user's eyes face may be designated as the information display region 101.

Figure 10B:
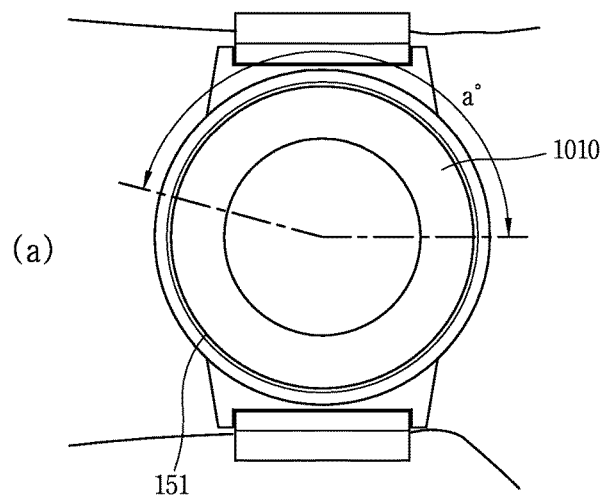
Figure 10B:
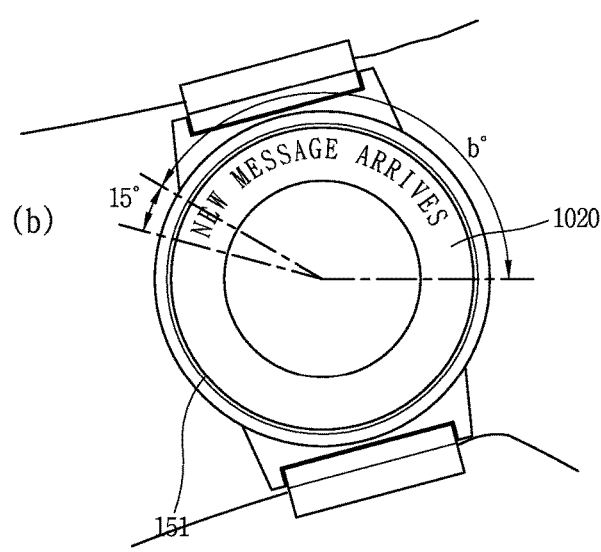

Meanwhile, as illustrated in (b) of FIG. 10B, in a case in which a movement of the wrist is sensed or in a case in which the direction of the user's eyes is changed, the controller 180 may change information display region 1020 in which screen information is to be displayed in the display unit 151.

For example, as illustrated, in a case in which the wrist slopes at about 15 degrees according to a movement of the wrist, the controller 180 may rotate the information by 15 degrees in the opposite direction of the direction in which the wrist slopes in response to the movement of the wrist, in order to display information. Meanwhile, as illustrated, in the state in which information is displayed on the display unit 151, as well as in the state in which event information is output, the controller 180 may apply the examples as described above in the same manner.

In this manner, when a movement of the wrist is sensed and the direction in which the wrist faces is changed, the controller 180 may change a display direction of screen information displayed on the display unit 151 based on the direction in which the wrist newly sensed through the sensing unit 140 faces.

In this manner, the sensing unit senses that the body of the mobile terminal rotates based on a virtual plane parallel to the display unit 151, and the controller 180 controls the display unit 151 to maintain an output form of the screen information displayed on the display unit 151 in the direction of the user's eyes in spite of the rotation of the terminal body. Here, the screen information displayed on the display unit 151 may be moved in the opposite direction of the rotation direction of the terminal body.

Meanwhile, although not shown, when an amount of information to be displayed in the information display region is so large that it cannot be displayed in the information display region 1020 at a time, the controller 180 may control the display unit 151 to sequentially change information displayed in the information display region 1020. In such a case, when the user views the information display region 1020, the user may feel that the information displayed in the information display region 1020 flows. Also, in a case in which an amount of information to be displayed in the information display region 1020 is so large that it cannot be displayed in the information display region 1020 at a time, the controller 180 may change information displayed in the information display region 1020 in response to a pre-set type touch applied to the information display region 1020. Namely, here, the pre-set type of touch may be a drag or slide touch, or the like. In this manner, when the pre-set type of touch is applied, the controller 180 may output information not currently displayed on the display unit 151, among information to be displayed, to the display unit 151.

Figure 11A:
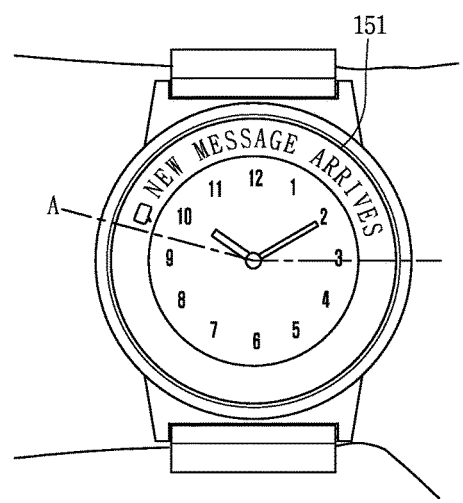

Hereinafter, in the case in which the information display region in which screen information is to be displayed on the display unit 151 is determined in consideration of the direction in which the user's wrist faces or the user's eyes as discussed above, a method for displaying information in such an information display region will be described in detail. For example, as illustrated in FIG. 11A, in a case in which an information display region is a region having a predetermined size from a virtual start point A, the controller 180 may display event information, or the like, based on the virtual start point A. As illustrated, such information may be displayed in a circumferential region of the display unit 151, having an advantages in that event information can be displayed, while preserving the information being displayed on the display unit 151 at the maximum level.

Meanwhile, various types of information may be displayed in the circumferential region. As illustrated, when an event occurs, the event information may be temporarily displayed and disappear. Also, even in a case that an event does not occur, information related to a widget may be displayed in the circumferential region. For example, the controller 180 may position a widget in the circumferential region. Thus, the user may utilize the widget through the circumferential region. The circumferential region may be divided into a plurality of regions and a plurality of widgets may be displayed or only one widget may be displayed in one circumferential region. How widgets are to be disposed in the circumferential region may be based on a user selection. Also, types of widgets displayed in the circumferential region may vary depending on user preference.

Figure 11B:
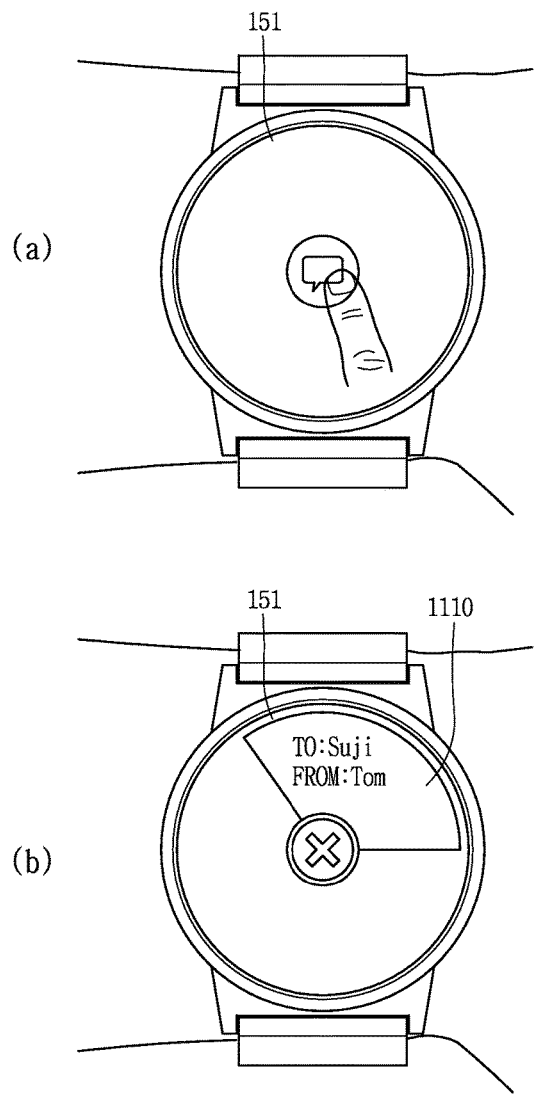

Also, as illustrated in (a) and (b) of FIG. 11B, in a case in which event information, notification information, or the like, exists in a pre-set particular region 1110, the controller 180 may preferentially display such information. The particular region 1110 may be a region determined based on position information of the mobile terminal and a region in which the user can relatively easily recognize information displayed on the display unit. Also, the position of the region may be changed cooperatively according to a change in a position of the mobile terminal.

Figure 11C:
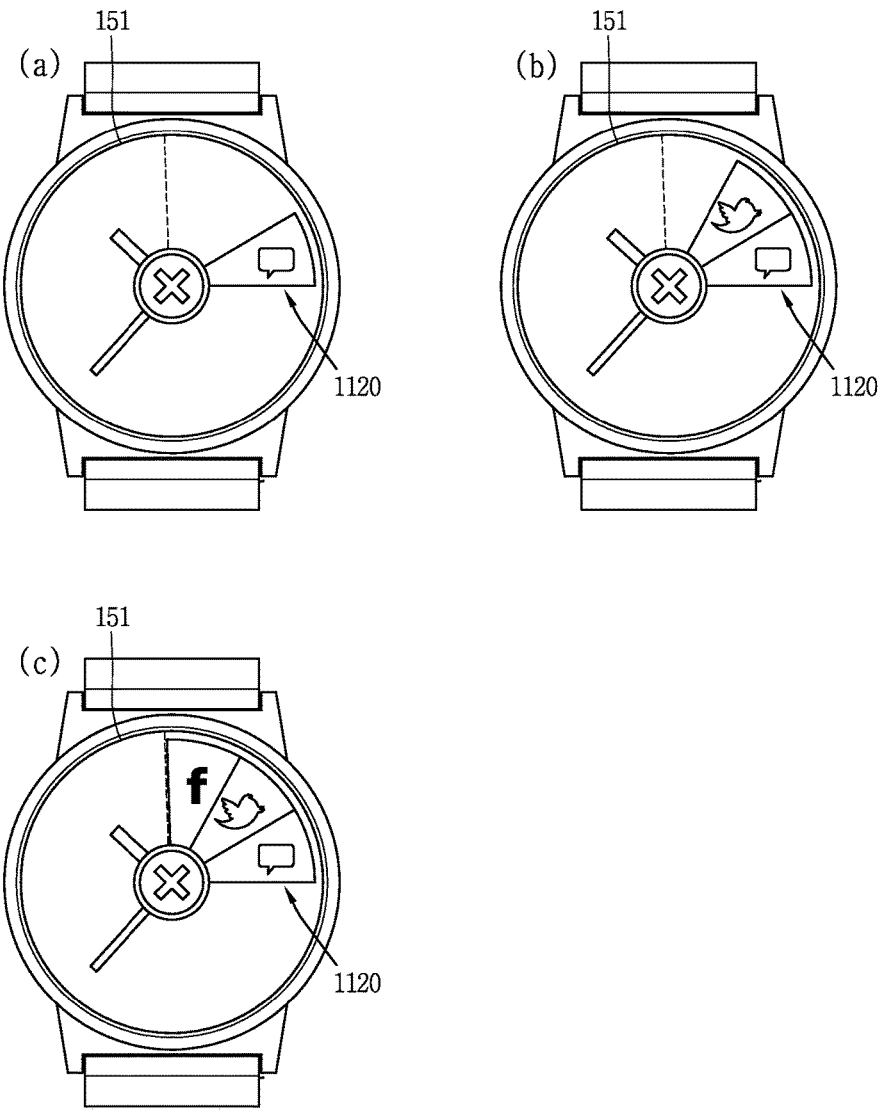

Also, in a case in which a plurality of events or notification information items are provided, as illustrated in (a), (b), and (c) of FIG. 11C, the plurality of events or notification information items may be sequentially displayed in an information display region 1120 based on order in which the event has occurred, or sequentially displayed in the information display region 1120 based on a user selection.

Meanwhile, when events occur, the controller 180 may display information regarding the number of the events in one region of the display unit 151 such that the user may recognize the number of the generated events. For example, as illustrated in (a) of FIG. 11D, the controller 180 may display the number of events generated in a particular application in one region 1130. In a case in which two message reception events has occurred in a message function application, number "2" may be displayed in the region 1130.

Figure 11D:
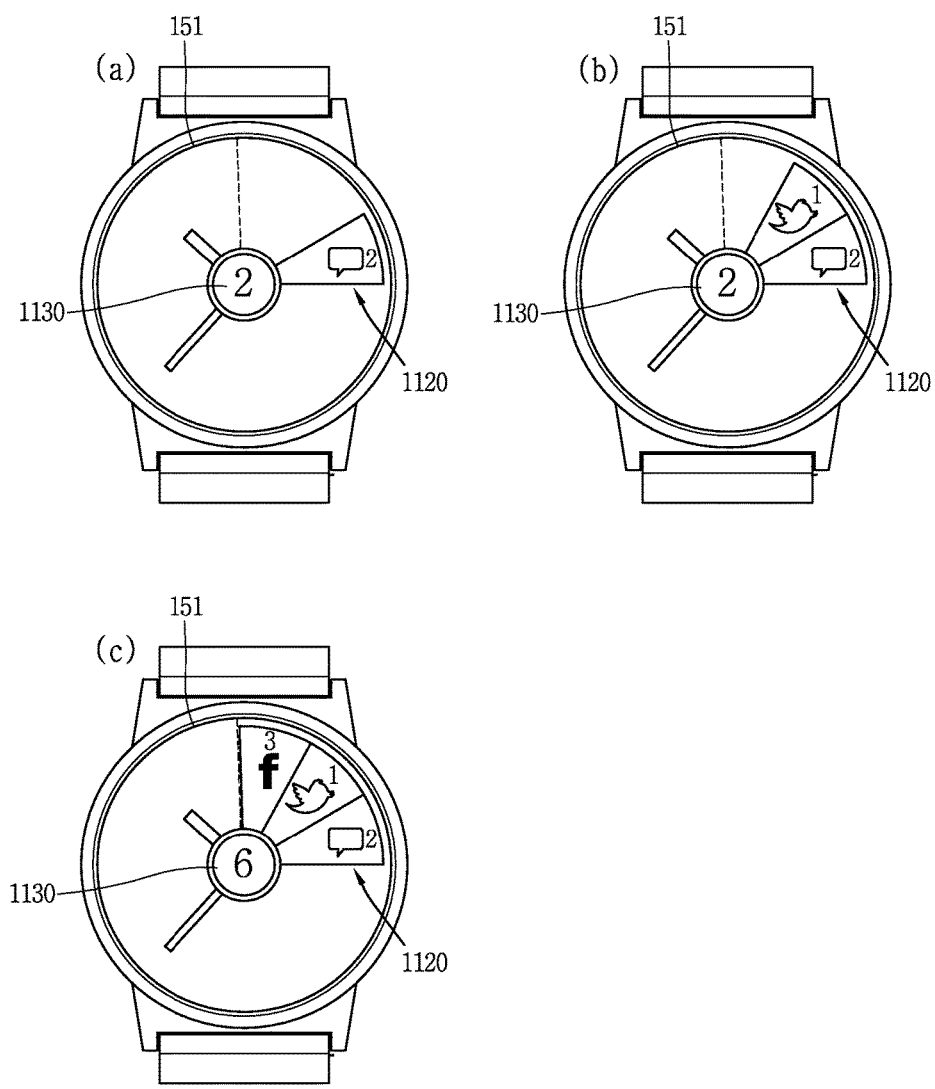

Also, in another example, as illustrated in (b) of FIG. 11D, the controller 180 may display the number of applications where events has occurred in the region 1130. Namely, when events has occurred in a message function application and an SNS function application, the controller 180 may display the number "2" in the region 1130 in order to inform that events have occurred in two applications. Namely, in this case, the number of applications where events have occurred, rather than the number of events generated in the corresponding applications may be displayed in the region 1130.

In another example, as illustrated in (c) of FIG. 11D, the controller 180 may display a total number of generated events in the region 1130, regardless of termination of applications. Namely, as illustrated, when one, two, and three events have occurred in three different applications, respectively, the controller 180 may display number information corresponding to 6, a total number of the generated events in the region 1130 of the display unit 151. Here, the position of the region 1130 may be in any region existing on the display unit 151.

As discussed above, in the watch type mobile terminal and the control method thereof according to the exemplary embodiment of the present disclosure, since event information is displayed in a region in which the user can relatively easily recognize information displayed on the display unit 151, user convenience can be enhanced.

Also, in the watch type mobile terminal according to an exemplary embodiment of the present disclosure, a position in which the mobile terminal is worn may be sensed, and a display position of information displayed on the display unit may be determined. Namely, in the watch type mobile terminal according to an exemplary embodiment of the present disclosure, screen information may be controlled such that the user may more conveniently use information displayed on the display unit in consideration of the position in which the mobile terminal is worn.

In the above, the method of determining a region for displaying information or a position of a control region for receiving a control command through a user's touch or allocating a display region or a control region in the watch type mobile terminal based on a user's position, a position in which the watch type mobile terminal is worn, and the like, such that the user may more conveniently use the display unit in the watch type mobile terminal has been described. Hereinafter, a method for providing various functions by utilizing collected situational information in the watch type mobile terminal having the characteristics as described above will be described in detail with reference to the accompanying drawings. The exemplary embodiments described hereinafter may be practiced by the watch type mobile terminal described above, and the exemplary embodiments may be combined to be implemented.

Figure 12:
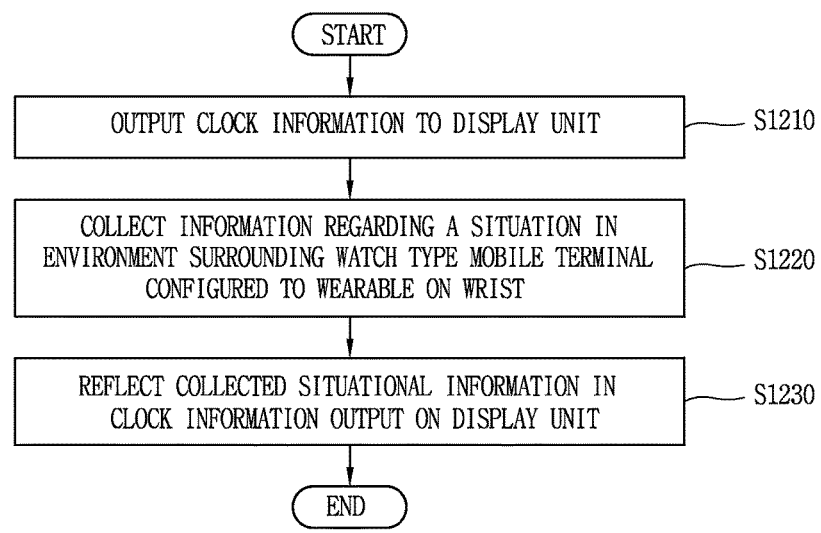
FIG. 12 is a flow chart illustrating an example of a method for displaying clock information in a mobile terminal according to an exemplary embodiment of the present disclosure.

FIG. 12 is a flow chart illustrating an example of a method for displaying clock information in the mobile terminal 100 according to an exemplary embodiment of the present disclosure, and FIGS. 13A through 13D are conceptual views illustrating a control method according to the flow chart illustrated in FIG. 12.

Hereinafter, a case in which the mobile terminal 100 is configured as a watch type mobile terminal that can be worn on the user's wrist will be described as an example. However, the present disclosure is not limited to the watch type mobile terminal 100. Namely, any mobile terminal 100 may be applied to the present disclosure regardless of type. Hereinafter in describing the present disclosure, terms of the mobile terminal 100 and the watch type mobile terminal 100 may be used together.

The watch type mobile terminal 100 includes a terminal body, a display unit 151, a situational information unit 182, and a controller 180. Descriptions of components excluding the situational information unit 182 will be replaced with the descriptions of FIGS. 1 through 3.

The situational information unit 182 may collect surrounding situational information based on the terminal body, and in order to collect situational information, the wireless communication unit 110, the sensing unit 140, and the like, may be used. The situational information collected by the situational information unit 182 may include time information related to the current time, position information of the terminal body, movement information, communication information, traffic information, weather information, temperature information, humidity information, brightness information, sound information, air volume information, wind speed information, smell information, and the like, around the terminal body. The situational information may be collected, starting at a point in time at which the display unit 151 is activated (ON) or may be collected even when the mobile terminal 100 is in a standby mode.

Meanwhile, referring to FIG. 12, clock information is output to the display unit 151 of the watch type mobile terminal 100 configured to be worn on the user's wrist in step S1210.

Figure 13A:
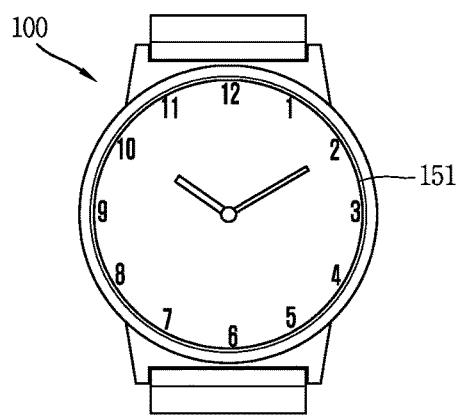
FIGS. 13A through 13D are conceptual views illustrating a control method according to the flow chart illustrated in FIG. 12.

As illustrated in FIG. 13A, making the most of the characteristics of the watch type mobile terminal 100, clock information may be displayed on the display unit 151. Whether to display clock information may be determined based on a user selection. Namely, in a case in which the display unit 151 is in an activated state and screen information corresponding to a particular application or screen information based on a user request is not displayed on the display unit 151, clock information may be displayed on the display unit 151. Even when screen information corresponding to a particular application or screen information based on a user request is displayed on the display unit 151, the clock information may be output to overlap with the screen information on the display unit 151.

Meanwhile, the step of outputting clock information to the display unit 151 may be performed according to a user manipulation or according to sensing by the sensing unit 140.

In an example of the former case, clock information may be output to the display unit 151 in response to a pre-set touch input applied to the display unit 151. The pre-set touch input may be a multi-tap touch input including a first tap applied to the display unit 151 and a second tap applied to the display unit 151 within a pre-set period of time.

Outputting of the clock information may be performed as the display unit 151 (the mobile terminal 100 is in a standby state) in a deactivated state (OFF) is activated, or may be separately performed regardless of whether the display unit 151 is in an activated state. For example, in a state in which other screen information is displayed on the display unit 151, when the pre-set touch input is applied, the state of the display unit 151 may be switched to the state in which the clock information is displayed.

Meanwhile, in an example of the latter case, clock information may be output to the display unit 151 according to whether the display unit 151 faces the user or according to sensing result regarding whether the user views the display unit 151.

In order to sense whether the display unit 151 faces the user, the sensing unit 140 may use a movement recognition sensor (not shown). The movement recognition sensor may include at least one among a terrestrial magnetism sensor, a gyro sensor, and an acceleration sensor.

The terrestrial magnetism sensor is a sensor detecting a direction and a magnitude of a terrestrial magnetism and generating an electrical signal by using the detected direction and magnitude of the terrestrial magnetism. The gyro sensor is a sensor detecting a rotational speed of the terminal body and generating an electrical signal by using the detected rotational speed of the terminal body. The acceleration sensor is a sensor measuring a direction of gravitational acceleration, detecting a change in acceleration in any one direction, and generating an electrical signal by using the measured direction of the gravitational acceleration and the detected change in acceleration in any one direction.

Thus, the sensing unit 140 may sense whether the terminal body disposed on the wrist is rotated. Namely, the sensing unit 140 may detect displacement according to the rotation of the wrist, namely, a rotational direction and a rotational angle, and generate an electrical signal by using the detected rotational direction and rotational angle. The controller 180 may detect a direction in which the display unit 151 installed in the terminal body faces by using the rotational direction and the rotational angle detected by the sensing unit 140.

In order to sense whether the user views the display unit 151, the sensing unit 140 may use an eye searching unit (not shown). The eye searching unit may search the user's eyes by using at least one among the camera sensor 121 (please refer to FIG. 1) and an infrared sensor (not shown). The camera sensor 121 may be provided as a plurality of camera sensors.

In detail, an infrared ray emitted from the infrared sensor may be reflected from the retina of the user's eyes within a predetermined viewing range with respect to the display unit 151. The reflected infrared ray may be input to the eye searching unit. Thereafter, the eye searching unit may search the user's vision by using the received infrared ray or a user image obtained by the camera sensor 121. Accordingly, the sensing unit 1400 may sense whether the user is viewing the display unit 151 and, further, which portion of the display unit 151 the user is viewing.

The controller 180 determines whether to output clock information to the display unit 151 according to the sensing result obtained through the sensing unit. In this case, each of the sensing results regarding whether the display unit 151 is disposed to face the user or regarding whether the user is viewing the display unit 151 may be used together in the determination.

When clock information is output to the display unit 151, the situational information 182 collects situational information in environment surrounding the terminal body in step S1220. Here, the situational information may be at least one among information sensed through various sensors and information received through the wireless communication unit 110.

Meanwhile, before the clock information is output to the display unit 151 and further, even when the display unit 151 is in a deactivated state (the mobile terminal 100 is in a standby state), the situational information unit 182 may collect situational information in environment surrounding the terminal body in advance. In this case, when the clock information is output to the display unit 151, the situational information unit 182 may collect situational information in environment surrounding the terminal body after the outputting of the clock information, and combine the collected situational information with the previously collected situational information or update the situational information.

When the situational information in environment surrounding the terminal body is collected through the situational information unit 182, the controller 180 reflects the collected situational information in the clock information output to the display unit 151 in step S1230.

Figure 13B:
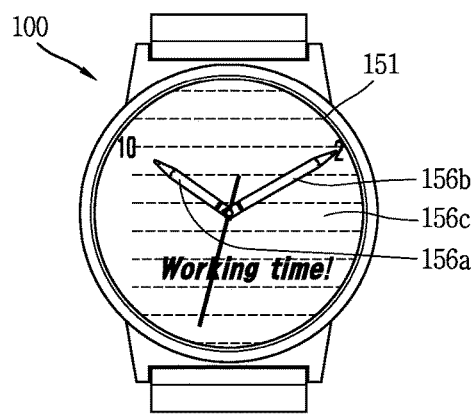

FIG. 13B illustrates an example in which clock information reflecting situational information is output to the display unit 151. When the user is at work in an office, the situational information unit 182 collects the current time information, position information of the terminal body, communication information obtained by the wireless communication unit 110 by performing communication with a communication network in the office, and the like. Based on the collected situational information, when it is determined that the user is at the office, the controller 180 reflects situational information related to work in the clock information.

FIG. 13A illustrates an example in which general clock information without reflecting situational information is output. In contrast, the clock information reflecting situational information as illustrated in FIG. 13B is different from the general clock information.

The clock information may include an hour hand image 156*a*, a minute hand image 156*b*, and a background image 156*c*. A form (shape and color) of at least one of the hour hand image 156*a*, the minute hand image 156*b*, and the background image 156*c* may be determined based on the collected situational information. In FIG. 13B, the hour hand image 156*a* and the minute hand image 156*b* have a shape of a writing implement and the background image 156*c* includes a phrase "working time" generated therein based on the collected situational information.

Meanwhile, the clock information reflecting situational information may be implemented in various forms. For example, the clock information may be changed into clock information corresponding to various situation modes based on the collected situational information. In FIG. 13B, the clock information is in a state changed to correspond to a work mode based on the situational information related to work.

Hereinafter, an example in which clock information is changed according to clock information corresponding to various situation modes and situational information will be described with reference to FIGS. 13C and 13D.

Figure 13C:
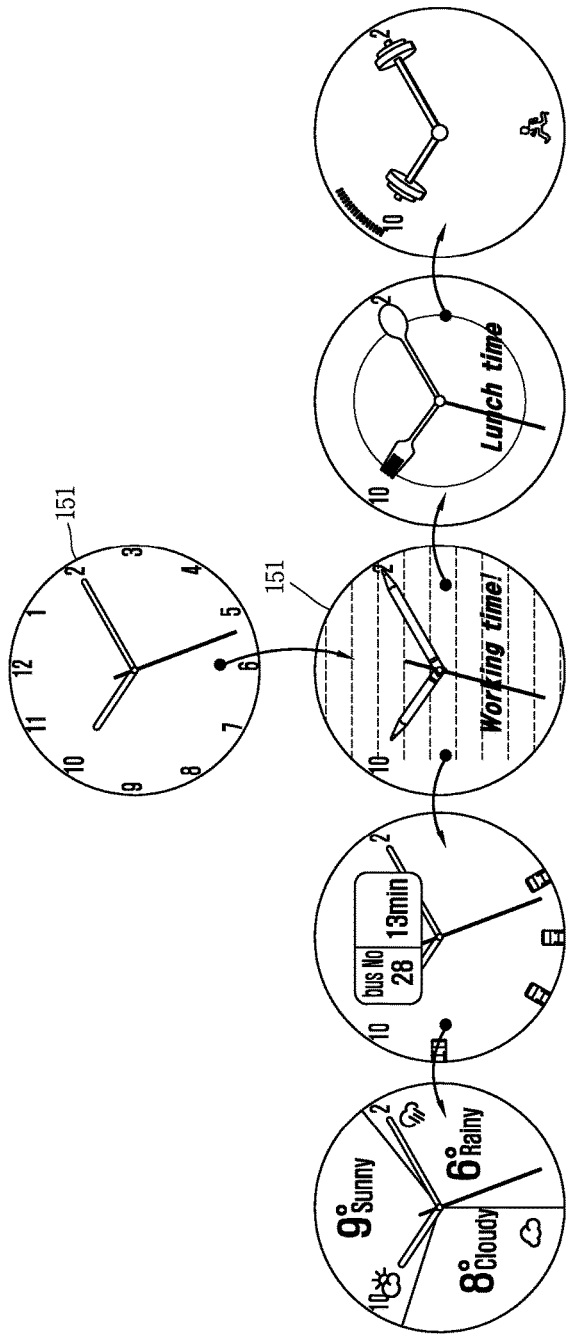

Referring to FIG. 13C, general clock information and clock information reflecting collected situational information may be displayed on the display unit 151. In the latter case, different clock information may be output according to situational information collected for clock information. For example, mode information regarding a plurality of situation modes classified based on the collected situational information is stored in the memory 160, and the controller 180 may control the display unit 151 such that clock information corresponds to a situation mode related to current situational information in environment surrounding the terminal body among the plurality of situation modes.

Meanwhile, in order for the user to select useful clock information, the controller 180 may display a plurality of clock information based on collected situational information. In addition, the controller 180 may determine priority of each of the plurality of clock information by reflecting behavior patterns of the user, and display clock information according to the order.

In the drawing, a plurality of situation modes including a weather mode, a traffic mode, a work mode, a meal mode, and an exercise mode classified based on collected situational information. Information displayed on the display unit 151 in each situation mode and control methods thereof may be variously configured.

Meanwhile, such clock information may be configured to be interchanged according to various methods. As illustrated, interchange between general clock information and clock information reflecting collected situational information may be performed according to a user manipulation or sensing by the sensing unit 140. The user manipulation may be a touch input (for example, a flicking touch, a long press touch, a multi-tap touch, a proximity touch, and the like) applied to the display unit 151. Sensing by the sensing unit 140 may be sensing whether the user scans clock information from one side to the other side by using the eye searching unit described above.

Meanwhile, interchange between information items each reflecting collected situational information may also be performed in the same manner as that described above.

Figure 13D:
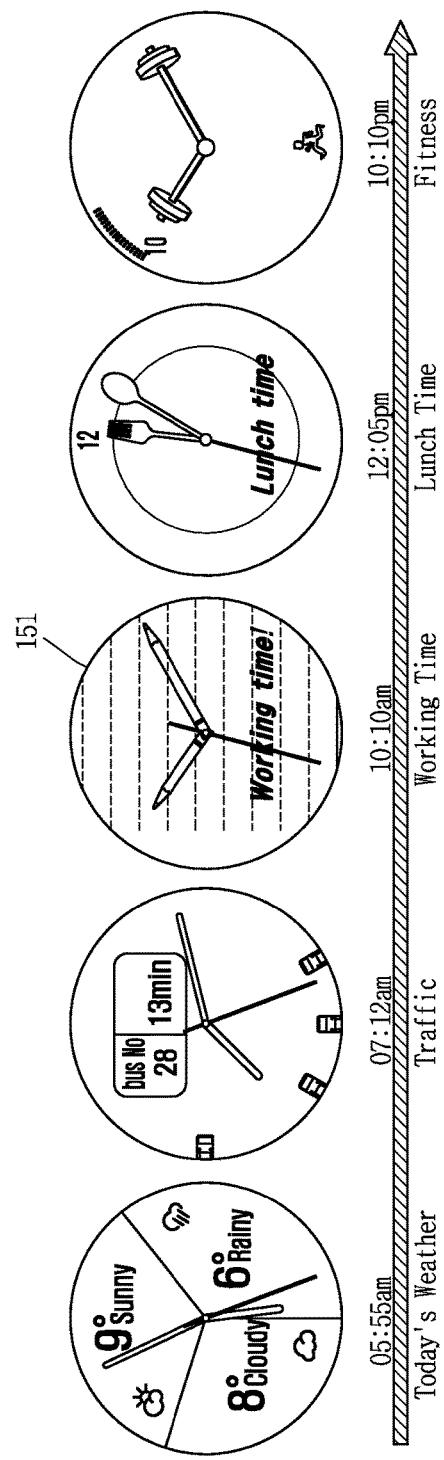

FIG. 13D illustrates outputting clock information corresponding to any one of a plurality of situation modes based on collected situational information. In detail, FIG. 13D illustrates that, when the user wakes up, situational information related to weather is reflected in the clock information (weather mode), when the user goes to work, situational information related to traffic information is reflected in the clock information (traffic mode), when the user is at work, situational information related to work is reflected in the clock information (work mode), when the user is at the table, situational information related to meal is reflected in the clock information (meal mode), and when the user is exercising, situational information related to exercise is reflected in the clock information (exercise mode).

Meanwhile, when the collected situational information is updated, the controller 180 may reflect the updated situational information in the clock information output on the display unit 151. For example, while the user is waiting for a bus to go to work, an estimated time of arrival of a bus is continuously updated and reflected in the clock information.

Also, while the situational information related to traffic information is being reflected in the clock information, when the user reaches the office, situational information related to work may be reflected in the clock information, and this may also be an example of reflecting updated information in the clock information.

When a situation mode related to the updated situational information is different from a situation mode related to current situational information in environment surrounding the terminal body, the controller 180 may change the clock information to correspond to the situation mode related to the updated situational information, and when a situation mode related to the updated situational information is the same as a situation mode related to current situational information in environment surrounding the terminal body, the controller 180 may maintain the clock information. However, in a case in which detailed situational information (for example, an estimated time of arrival of a bus) in the traffic mode is continuously updated, so it needs to be reflected in the clock information, the related detailed situational information may be reflected in the clock information.

In this manner, based on the situational information obtained through the situational information unit 182, the controller 180 may determine which of the clock information is useful for the user. Also, based on the determination result, the controller 180 may provide customized clock information to the user.

Hereinafter, a method for outputting situational information in response to a touch input applied to clock information will be described with reference to FIGS. 14A and 14B.

When a pre-set touch input is applied to clock information, at east a portion of collected situational information may be output to the display unit 151.

Figure 14A:
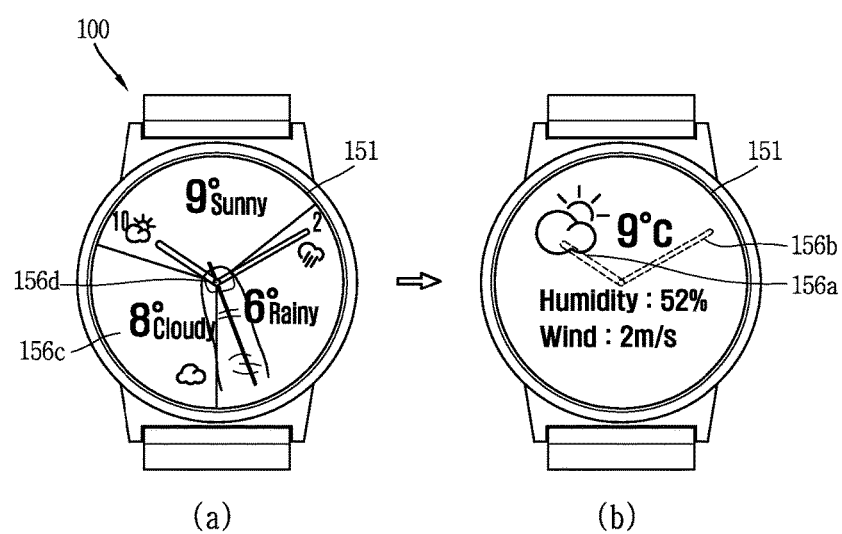
FIGS. 14A and 14B are conceptual views illustrating a method for outputting situational information corresponding to a touch input applied to clock information in a mobile terminal according to an exemplary embodiment of the present disclosure.

For example, as illustrated in FIG. 14A, in a state in which situational information related to weather on that day is reflected in the background image 156c of clock information, when a touch input is applied to a portion corresponding to a rotational shaft 156d of the hour hand image 156a and the minute hand image 156b for a predetermined period of time, screen information related to detailed weather at the current time may be output.

Figure 14B:
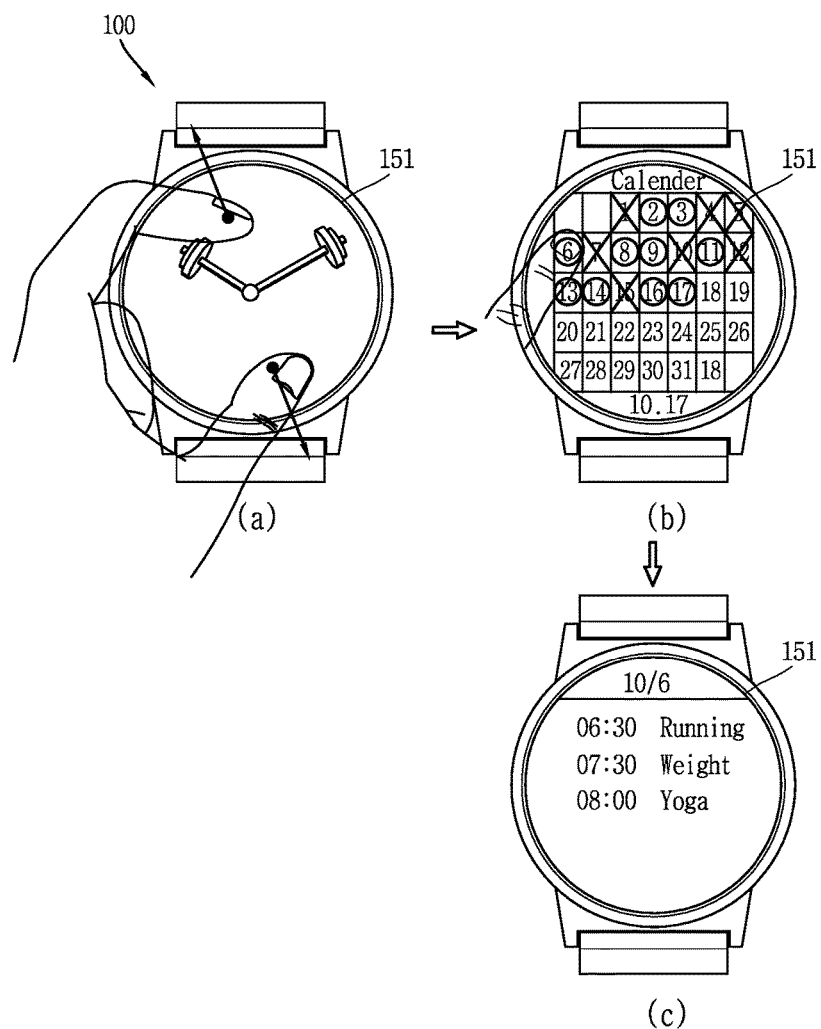

In another example, as illustrated in FIG. 14B, when a zoom-out (or zoom-in) touch is applied to the clock information output on the display unit in the exercise mode, calendar information allowing for checking an exercise date may be output, and when a touch is applied to a particular date, detailed exercise contents information of the corresponding date may be output. In this case, the situational information unit 182 may retrieve past situational information stored in the memory 160.

In the foregoing examples, screen information related to at least a portion of the collected situational information may be output to overlap with the hour hand image 156a and the minute hand image 156b on the display unit 151.

Hereinafter, a method for setting time information to perform a particular function by using clock information in the mobile terminal 100 will be described with reference to FIGS. 15A and 15C.

When a pre-set touch input is applied to the clock information, the controller 180 may output at least one among a virtual hour hand image 157a and a virtual minute hand image 157b for setting time information related to a particular function to the display unit 151. For example, when a pre-set touch input is applied to the hour hand image 156a and the minute hand image 156b, the corresponding virtual hour hand or minute hand images 157a and 157b may be output, or when a pre-set touch input is applied to the portion corresponding to the rotational shaft of the hour hand image 156a and the minute hand image 156b, the virtual hour hand and minute hand images 157a and 157b may be output.

Meanwhile, a particular function includes every function that can be executed in the mobile terminal 100. For example, notification, music play, text transmission, and the like, may correspond to particular functions. Time information may mean a time at which a particular function is executed, and the time information is set by the user. A method for setting time information by the user will be described hereinbelow.

The virtual hour hand and minute hand images 157a and 157b may be movable (rotatable based on the rotational axis) by a drag touch. By using time information represented by at least one of the virtual hour hand and minute hand image 157a and 157b moved by the drag touch, when the current time corresponds to a pre-set time related to the time information, the controller 180 executes a particular function.

Figure 15A:
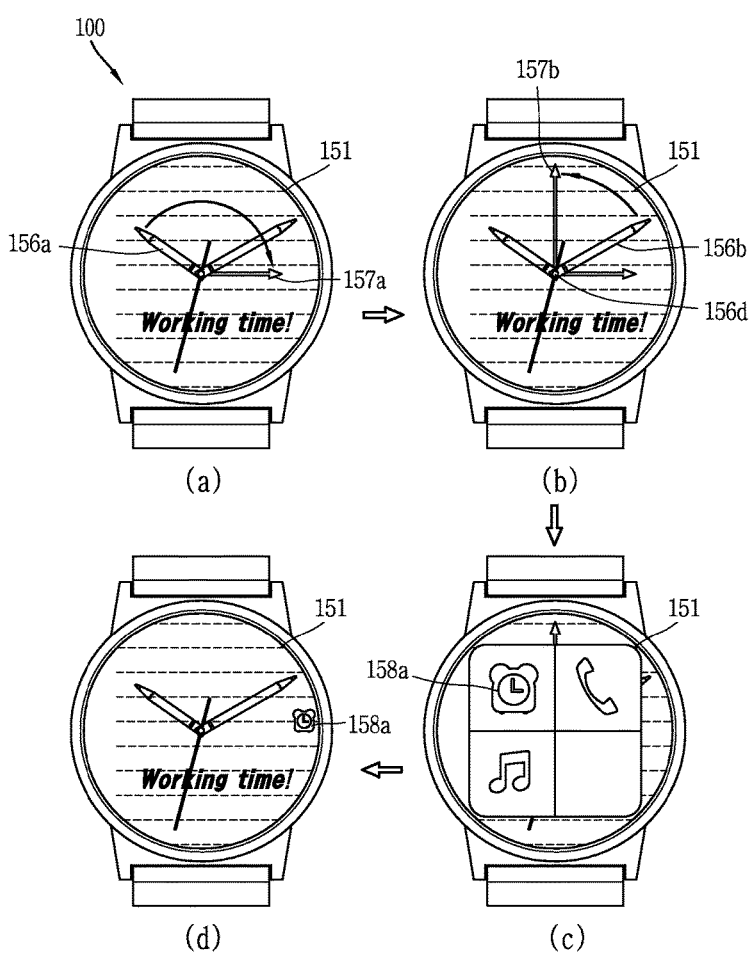
FIGS. 15A through 15C are conceptual views illustrating a method for setting time information to perform a particular function using clock information in a mobile terminal according to an exemplary embodiment of the present disclosure.

For example, as illustrated in FIG. 15A, when ah touch input is applied to each of the hour hand image 156a and the minute hand image 156b for a predetermined period of time, the virtual hour hand image 157a and the virtual minute hand image 157b are output. A time at which the user wants to execute a particular function may be set through a drag touch applied to the virtual hour hand image 157a and the virtual minute hand image 157b.

Setting of the time information may be completed by a pre-set touch input applied to a particular portion. For example, after the virtual hour hand image 157a and the virtual minute hand image 157b are adjusted to a time desired to be set by the user, when a touch input is applied to the virtual hour hand image 157a and the virtual minute hand image 157b, setting of time information may be completed. In this drawing, time information to execute a particular function is set to 3 o'clock.

When setting of the time information is completed, a plurality of icons 158a respectively corresponding to a plurality of functions selectable to designate a particular function may be output. In this case, the controller 180 may output at least a portion of the plurality icons 158a differently for each of the collected situational information. For example, since useful functions are different for each situation mode, at least a portion of the plurality of icons 158a may be output differently for each situation mode.

When any one of the plurality of icons 158a is selected an setting of a particular function is completed, the virtual hour hand 157a and the virtual minute hand 157b disappear and an icon 158a selected at the corresponding set time may be output. In this drawing, it is illustrated an alarm function is set at 3 o'clock.

Thereafter, the controller 180 may designate a function selected at the pre-set time related to the time information, as a particular function and execute the same. When the particular function is executed, screen information related to the execution of the corresponding function may be output to the display unit 151 and notification information indicating that a pre-set time has arrived may be output to the display unit 151 or through the audio output unit 153.

Meanwhile, unlike the case in which the particular function is selected by the user, the particular function may be automatically designated as a notification function and notification contents corresponding to the pre-set time may be configured to be selected. In this case, when the setting of time information is completed, a plurality of icons 158a or text for designating the notification contents corresponding to the set time may be output.

Figure 15B:
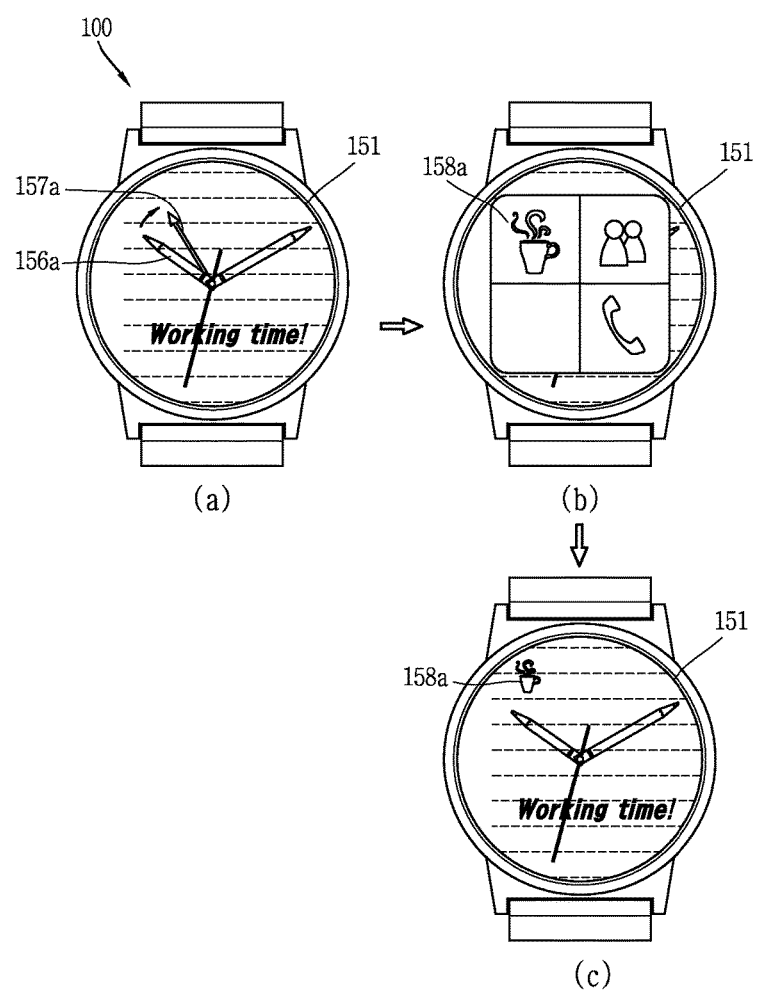

For example, as illustrated in FIG. 15B, when the hour hand image 156a is touched in the work mode, the virtual hour hand image 157a is output, and the virtual hour hand image 157a may be shifted to one hour after to set time information. In this manner, when a time is intended to be set in units of one hour, time information may be set only by setting the virtual hour hand image 157a. Based on this scheme, a time may be set within a range of one hour by using only the virtual minute hand image 157b.

When setting of time information is completed, a plurality of icons 158a for designating notification contents corresponding to each set time may be output. In this drawing, an icon 158a having a shape of coffee cup is selected to take a break and have a cup of coffee after one hour, so the icon 158a is illustrated at the corresponding time.

Figure 15C:
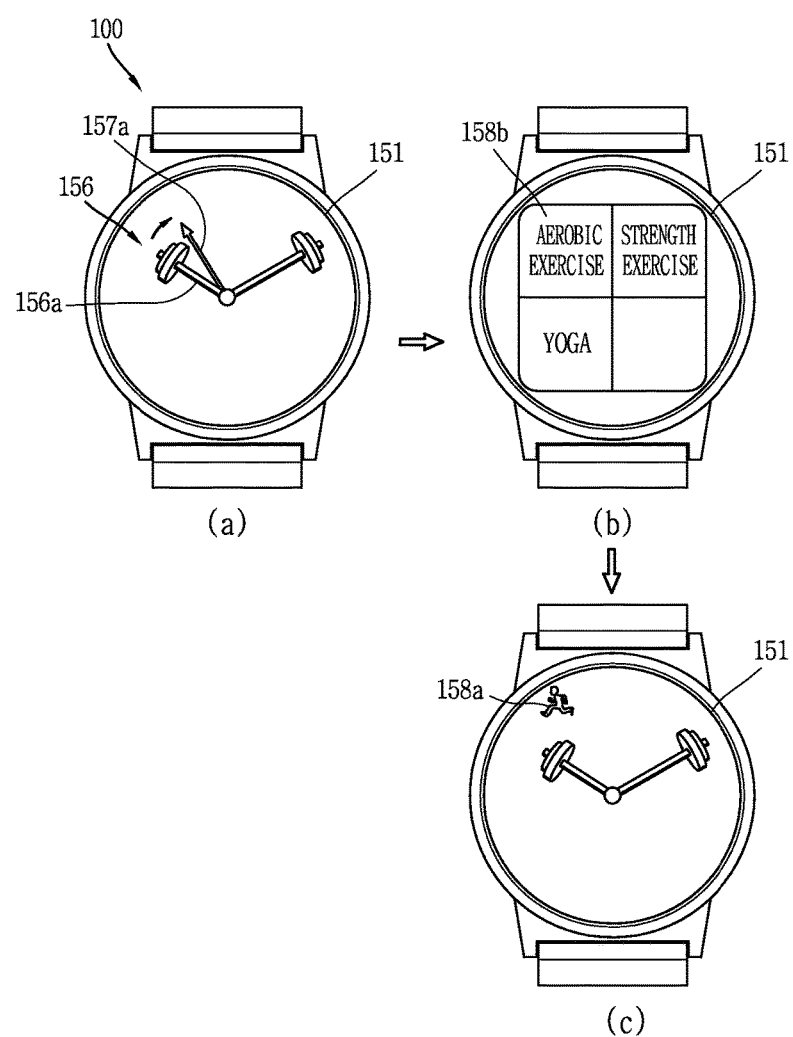

In another example, as illustrated in FIG. 15C, when setting of time information in the exercise mode is completed, a plurality of text items 158b for selecting notification contents corresponding to each set time. In this manner, the list selectable according to collected situational information or situation modes corresponding thereto may be output differently as icons or text 158b.

Meanwhile, as described above, the clock information includes the hour hand image 156a, the minute hand image 156b, and the background image indicating the current time. At least one of the hour hand image 156a, the minute hand image 156b, and the background image 156c may be changed in position and form according to the passage of time.

For example, the background image 156c may have a brighter color during the daytime and may be change to have a dark color during the nighttime.

Another relevant example will be described in relation to set time information described above.

Figure 16:
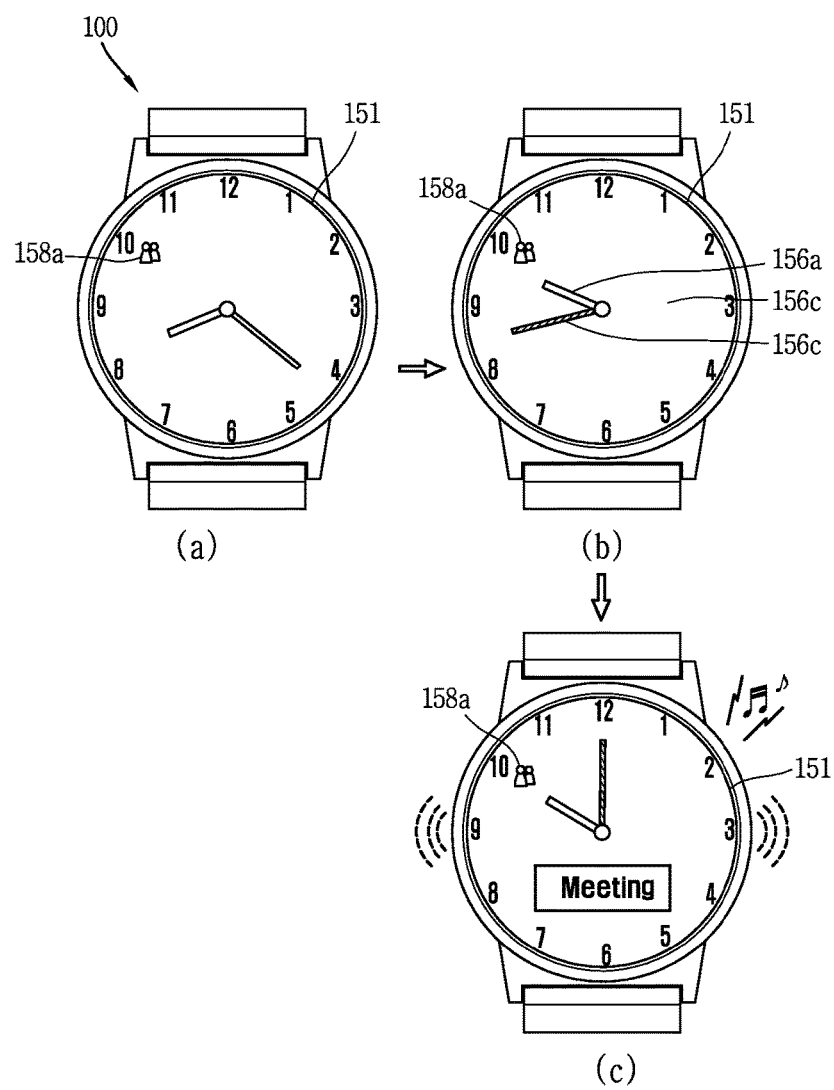
FIG. 16 is a conceptual view illustrating a method for changing clock information in relation to time information set in a mobile terminal according to an exemplary embodiment of the present disclosure.

FIG. 16 is a conceptual view illustrating a method for changing clock information in relation to time information set in the mobile terminal 100 according to an exemplary embodiment of the present disclosure.

As illustrated in FIG. 16, when the current time nears a set time related to time information, the controller 180 may change clock information to inform the user that the set time nears. In detail, in a state in which a notification function for indicating that there is a meeting at 10 o'clock (a graphic object 158a related to the meeting is displayed in a portion where the hour hand is positioned at 10 o'clock), when the current time nears 10 o'clock, the color of the minute hand image 156b may be configured to be changed.

The clock information may be variously changed. For example, it may be configured such that, when the current time nears the set time, the background image 156 gradually becomes brighter or flickers. Thus, the user may recognize the fact that the set meeting time nears.

Hereinafter, how collected situational information can be reflected in a clock mode and used will be described by taking various situation modes as an example. The examples described hereinafter are not specified only for the illustrated situation modes but may also be applied to other situation modes in the same or similar manner.

Figure 17A:
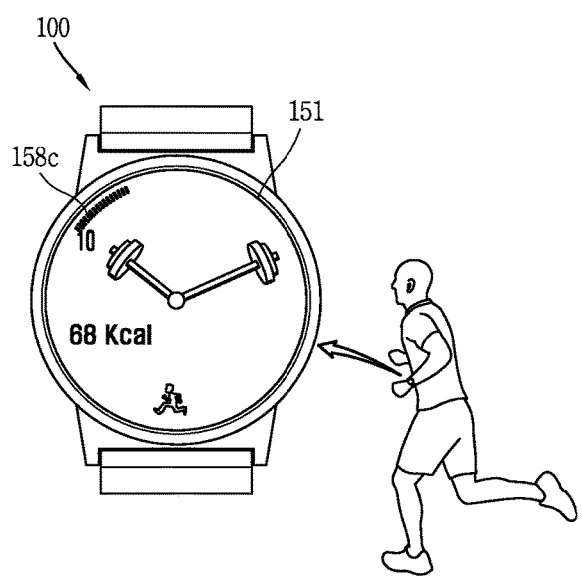
FIGS. 17A and 17B are conceptual views illustrating a method for providing information related to an exercise for a user by using collected situational information in a mobile terminal according to an exemplary embodiment of the present disclosure.
Figure 17B:
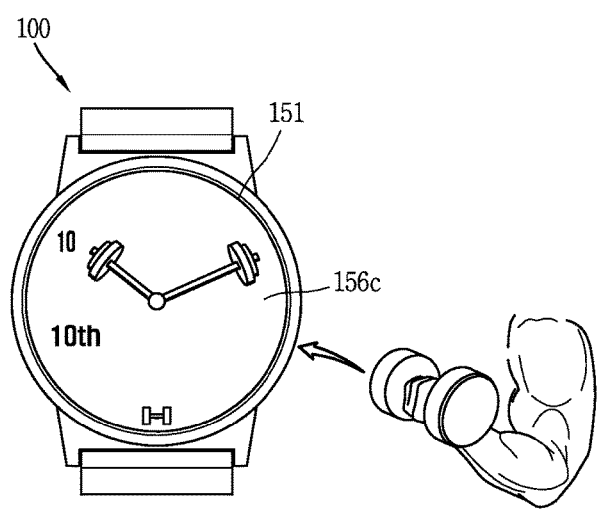

FIGS. 17A and 17B are conceptual views illustrating a method for providing information related to an exercise for a user by using collected situational information in the mobile terminal 100 according to an exemplary embodiment of the present disclosure.

Referring to FIG. 17A, the situational information unit 182 may collect information regarding a movement of the terminal body. When the movement of the terminal body exceeds a reference range, the controller 180 may determine that the user who wears the terminal body on his or her wrist is exercising and output clock information related to exercise based on the determination result.

For example, when the user wears the watch type mobile terminal 100 on his or her wrist and runs at a speed higher than a particular speed during a pre-set period of time, the situational information unit 182 collects information regarding a movement of the terminal body by using a gyro sensor, an acceleration sensor, a GPS, and the like. Based on the fact that the movement of the terminal body corresponds to a movement of a pattern appearing during jogging, rather than to a movement of a pattern appearing in a daily life, the situational information unit 182 changes the clock information to correspond to the exercise mode.

In addition, based on situational information updated through the situational information unit 182, the controller 180 recognizes that the user continues to jog and displays a jogging time in an edge region of the display unit 151. In this drawing, it is illustrated that a graphic object 158c related to a jogging time is displayed based on the unit of one hour indicated by the hour hand image. Meanwhile, the controller 180 may output the user's weight stored in the memory 160 and consumed calorie calculated with a jogging speed, a distance, and the like, measured by using a gyro sensor, an acceleration sensor, a GPS, and the like, to the display unit 151. The information regarding the jogging time and the consume calorie may also be included in situational information.

Also, referring to FIG. 17B, when a movement of the terminal body is repeated to have a particular pattern, the controller 180 may reflect the repeated number of movements corresponding to the pattern in clock information.

For example, in a case in which the user repeatedly does exercise of lifting up dumbbell with his or her hand that wears the watch type mobile terminal 100, the situational information unit 182 collects situational information regarding the number of times of repeating the pattern of lifting up and down the dumbbell by using various sensors, and the controller 180 may output the number of times to the background image 156c based on the collected situational information.

Meanwhile, based on the movement corresponding to the pattern, the controller 180 may recognize even what kind of exercise the user is doing. For example, even when the user does strength exercise by using the dumbbell, situational information related to a pattern of a movement collected by using a gyro sensor, an acceleration sensor, and the like, appears to differ depending on forms of strength exercise Thus, the controller 180 may recognize what kind of exercise the user is doing based on the collected situational information and reflect the collected situational information in the clock information.

Figure 18:
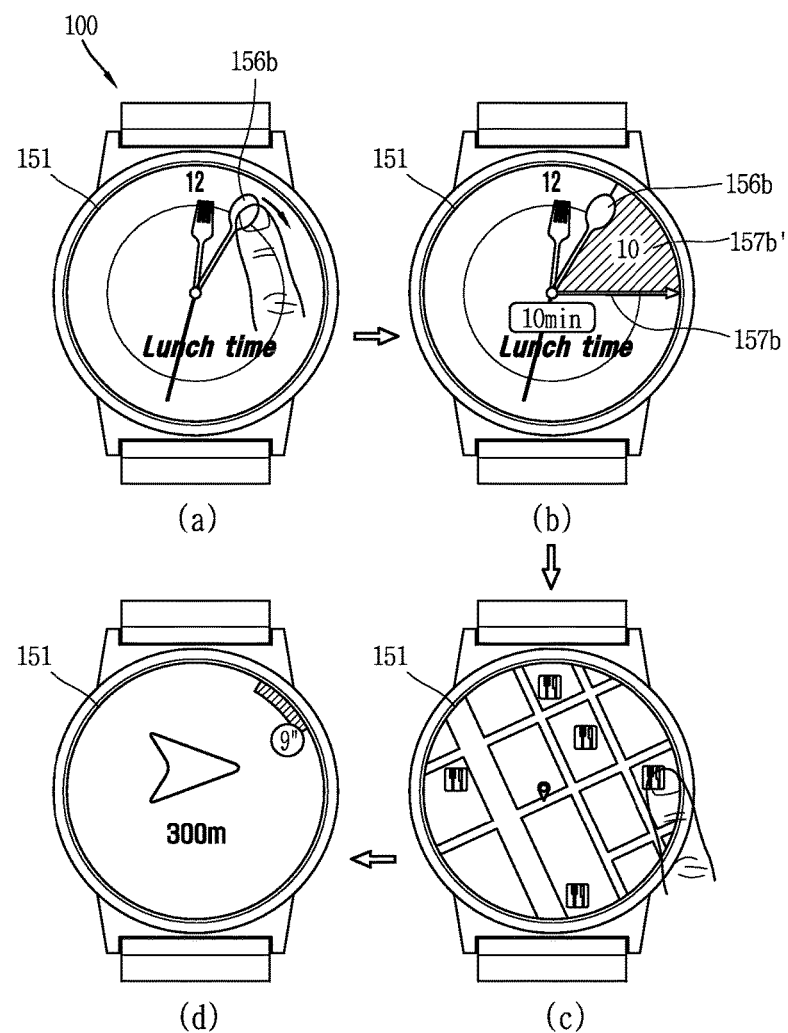
FIG. 18 is a conceptual view illustrating a method for providing information regarding a place around the user by using collected information for the user in a mobile terminal according to an exemplary embodiment of the present disclosure.

FIG. 18 is a conceptual view illustrating a method for providing information regarding a place around the user by using collected information for the user in the mobile terminal 100 according to an exemplary embodiment of the present disclosure. In this drawing, an example of a method for searching for a restaurant nearby at which the user may arrive within a predetermined time in the meal mode.

As described above, the user may set time information by using at least one of the virtual hour hand image and the virtual minute hand image. Referring to (a) and (b) of FIG. 18, when a pre-set type touch input is applied to the minute hand image 156b, the virtual minute hand image 157b is output. The virtual minute hand image 157b may shift to a time to be set by a drag touch.

In this case, screen information including a relative time between the minute hand image 156b and the virtual minute hand image 157b may be displayed in a region 157b' formed therebetween. Thus, the user may recognize, in which minutes after, a time is set by intuition.

Setting of the time information may be completed by a pre-set touch input applied to a particular portion of clock information. In this drawing, in order to search for a restaurant within a range that the user can arrive within 10 minutes, the virtual minute hand image 157b is shifted to 10 minutes after.

Meanwhile, the situational information unit 182 collects situational information in environment surrounding the terminal body including position information of the terminal body. As illustrated in (c) of FIG. 18, after setting of the time information is completed, when the user who wears the terminal body has moved by a time corresponding to the set time information from the current position of the terminal body, the controller 180 outputs place information related to a place within a range that the user can arrive.

In this case, the controller 180 calculates a distance range based on an average pace of the user and the set time related to the time information stored in the memory 160, and controls the situational information unit 182 to collect place information within the calculated distance range. Meanwhile, the controller 180 determines a type of place information to be searched by the user based on the collected information. Namely, since the clock information corresponding to the meal mode is currently output, the controller 180 processes the place information as information related to a restaurant.

Thereafter, as illustrated in (d) of FIG. 18, when any one of restaurants output on the display unit 151 is selected, the situational information unit 182 collects information regarding a path to the selected restaurant by using a GPS, a gyro sensor, and the like. The controller 180 outputs position information guiding an optimal route based on the collected information regarding the path, to the display unit 151.

Figure 19A:
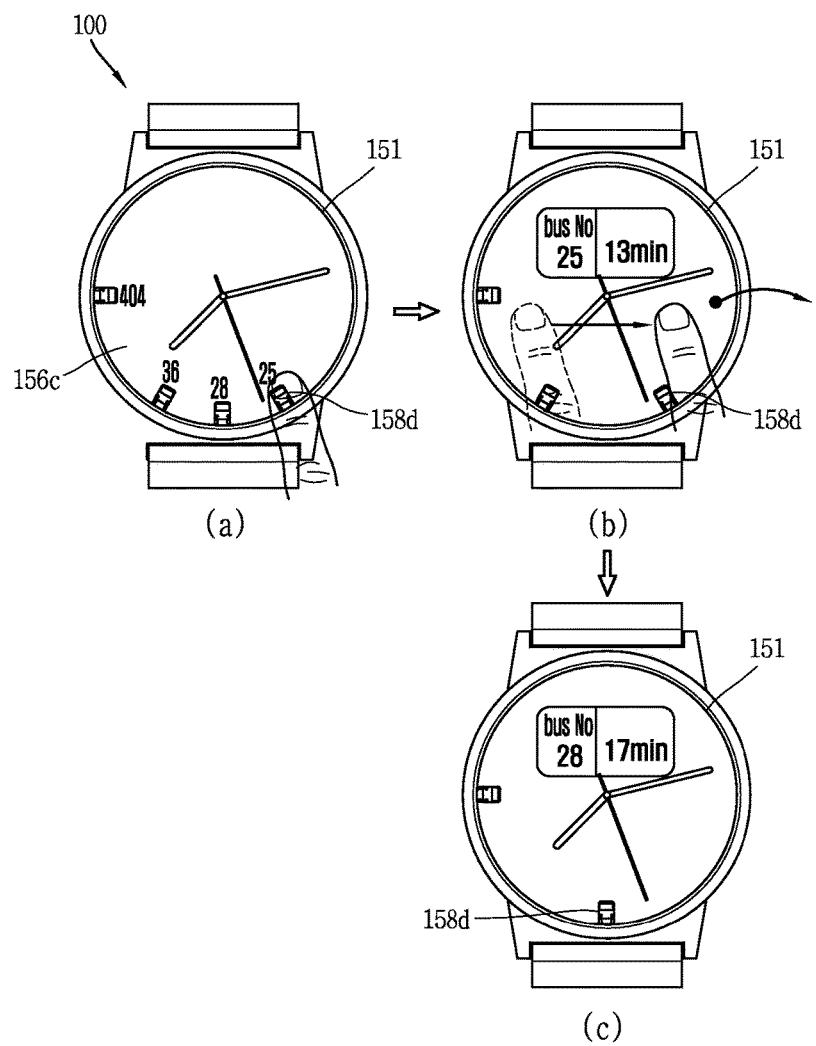
FIGS. 19A and 19B are conceptual views illustrating relative position information between a terminal body and an object spaced apart from the terminal body by using collected situational information in a mobile terminal according to an exemplary embodiment of the present disclosure.
Figure 19B:
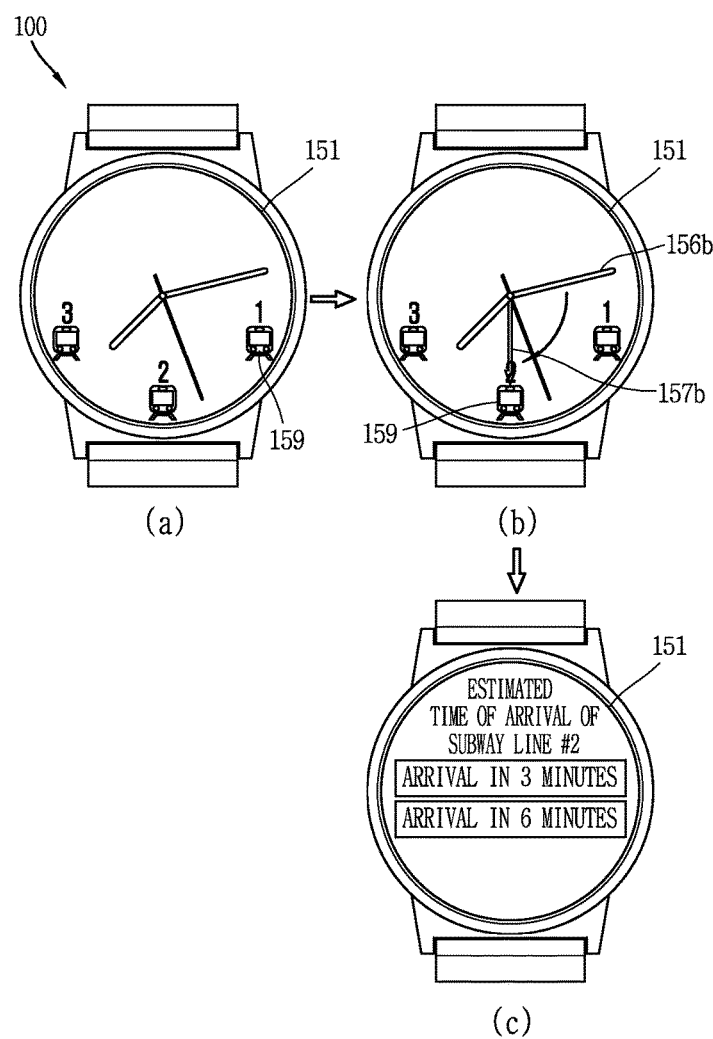

FIGS. 19A and 19B are conceptual views illustrating relative position information between a terminal body and an object spaced apart from the terminal body by using collected situational information in the mobile terminal 100 according to an exemplary embodiment of the present disclosure.

Situational information collected by the situational information unit 182 includes position information of the terminal body and position information of an object spaced apart from the terminal body. In FIGS. 19A and 19B, a public transportation such as buses, subways, and the like, are illustrated in an object.

The controller 180 controls the display unit 151 to reflect the relative position information of the object with respect to the terminal body in clock information by using the collected situational information. The relative position information of the object with respect to the terminal body may include information converted to a time concept.

Referring to FIG. 19A, the controller 180 searches for a bus stop nearby by using position information of the user, and reflects position information regarding a bus that passes by the searched bus stop. Meanwhile, the position information regarding the bus may include information regarding an estimated time at which a bus may arrive at the bus stop. By using the information, the controller 180 may display an estimated time of arrival of the bus based on 1 minute unit indicated by the minute hand image 156b.

Meanwhile, when a pre-set touch input is applied to the clock information, the controller 180 may control the display unit 151 to output at least a portion of the collected situational information. For example, in a state in which situational information related to an estimate time of arrival of every bus that passes by the bus stops is reflected in the clock information, when a touch input is applied to a graphic object 158d denoting a particular bus, only information regarding an estimated time of arrival of the selected bus may be output to the display unit 151.

In a state in which a portion of collected situational information is reflected in the clock information, when a pre-set touch input is applied to the clock information, the controller 180 may reflect other portion of the collected situational information in the clock information. As illustrated, when a flicking touch is applied to the clock information, information regarding an estimated time of arrival of other bus may be output on the display unit 151.

Selecting of at least a portion of the collected situational information may be made by applying a touch input to the graphic object 158d output on the background image 156c as illustrated in FIG. 19A and by shifting the virtual hour hand image or the virtual minute hand image 157b to the graphic object 158d output on the background image 156c as illustrated in FIG. 19B.

Figure 20A:
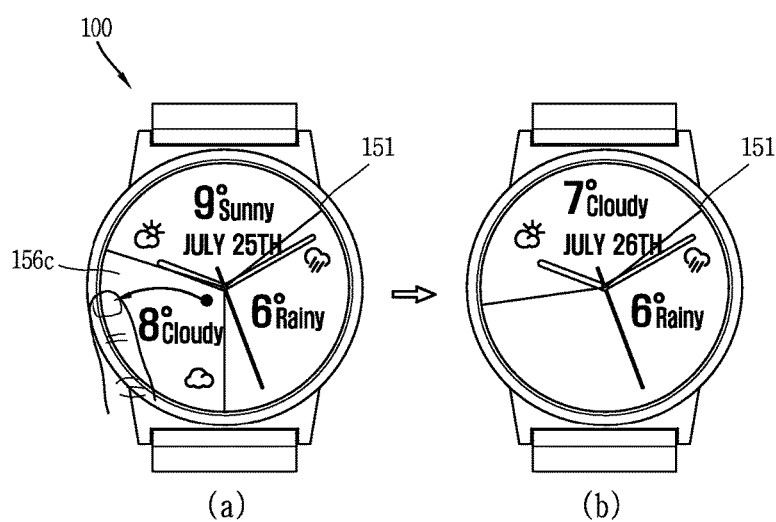
FIGS. 20A and 20B are conceptual views illustrating a method for reflecting collected situational information in clock information in response to a pre-set gesture in a mobile terminal according to an exemplary embodiment of the present disclosure.
Figure 20B:
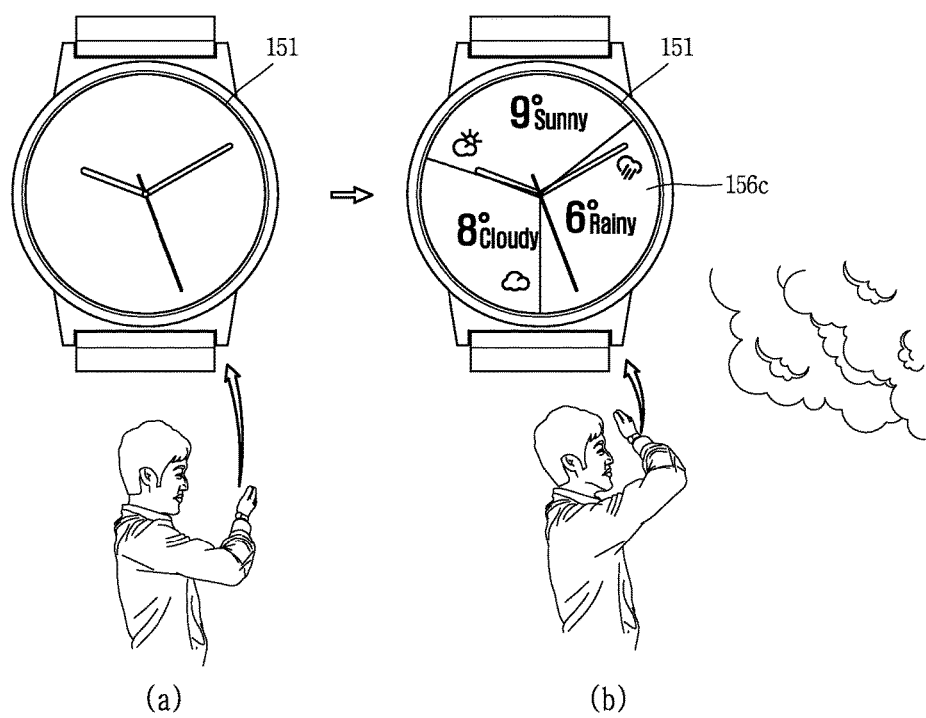

FIGS. 20A and 20B are conceptual views illustrating a method for reflecting collected situational information in clock information in response to a pre-set gesture in a mobile terminal according to an exemplary embodiment of the present disclosure.

Referring to FIG. 20A, situational information collected through the situational information unit 182 may include weather information of an area where the terminal body is positioned, and the weather information may include weekly weather, as well as weather of a corresponding day. The controller 180 may reflect the weather information included in the collected situational information in the clock information. For example, situational information related to weather on that day may be reflected in the background image 156c of the clock information.

Meanwhile, in the state in which the situational information related to weather on that day is reflected in the background image 156c, when a pre-set touch input (for example, a flicking touch) is applied to the clock information, the controller 180 may reflect situational information related to weather of next day in the background image 156c.

Meanwhile, such situational information may be reflected in the clock information in response to a pre-set gesture. For example, the situational information unit 182 collects information regarding a movement of the terminal body, and when the movement of the terminal body corresponds to a pre-set gesture maintained for a particular period of time, the controller 180 may reflect the collected situational information related to weather in the clock information.

FIG. 20B illustrates that, in a state in which general clock information or clock information reflecting collected situational information is output, when the user lifts the clock up toward the sky to check weather, situational information related to weather is reflected in the background image 156c.

Namely, the situational information unit 182 collects situational information regarding a movement of the terminal body by using a gyro sensor, an acceleration sensor, and the like, and the controller 180 determines whether the user makes a gesture of checking weather based on the collected situational information. When it is determined that the user makes a pre-set gesture, the controller 180 reflects situational information related to weather in the background image 156c, and when it is determined that the user's gesture is not a pre-set gesture, the controller 180 maintains the currently output clock information.

Figure 21:
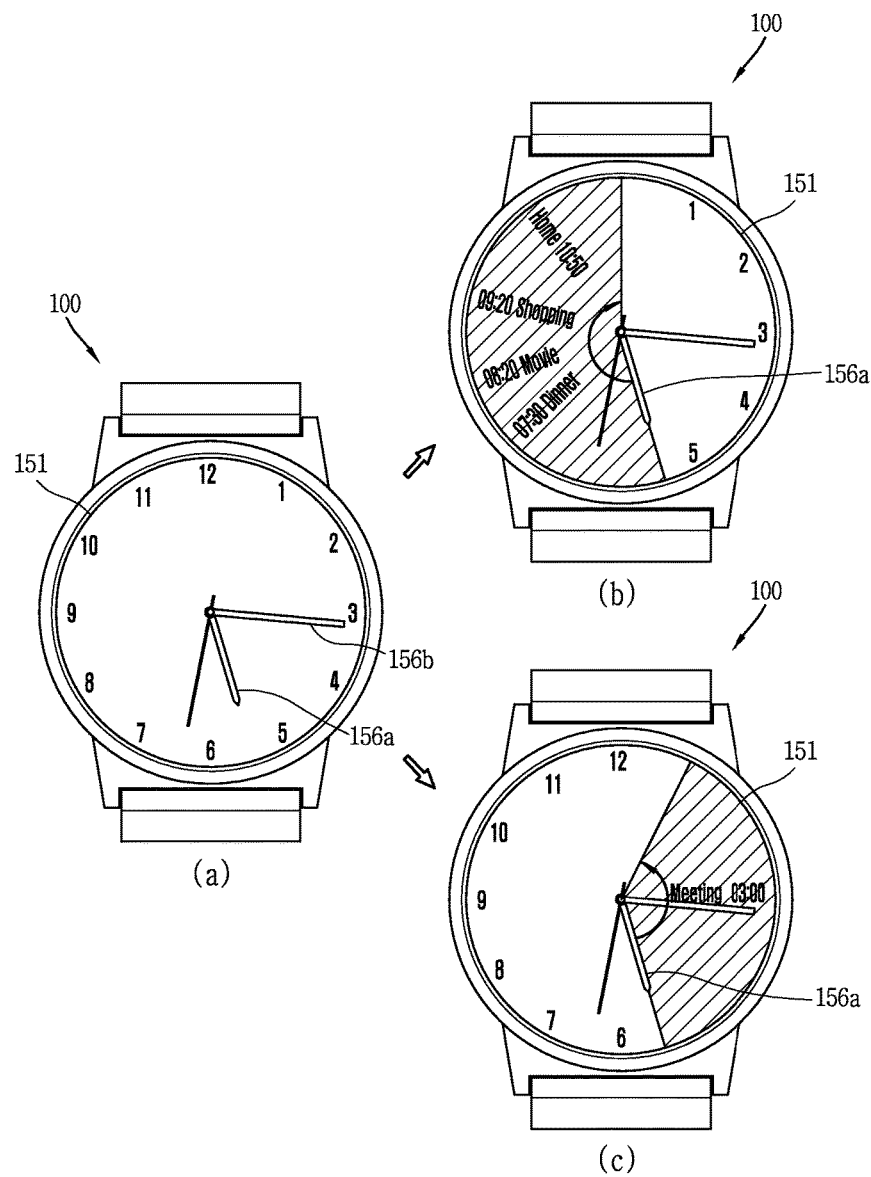
FIG. 21 is a conceptual view illustrating an example of outputting schedule information in response to a touch input applied to clock information in a mobile terminal according to an exemplary embodiment of the present disclosure.

FIG. 21 is a conceptual view illustrating an example of outputting schedule information in response to a touch input applied to clock information in the mobile terminal 100 according to an exemplary embodiment of the present disclosure.

In an exemplary embodiment of the present disclosure, in a state in which clock information is output on the display unit 151, the controller 180 may output schedule information based on a touch applied to the display unit 151.

Schedule information stored in the memory 160 may include schedules classified based on time, and the controller 180 may determine which of the schedules stored in the memory 160 is to be output by utilizing a touch applied to the hour hand image 156a and the minute hand image 156b included in clock information. For example, whether to output schedule information corresponding to a future schedule based on the current time or whether to output schedule information corresponding to a past schedule based on the current time may be determined based on a touch applied to the hour hand image 156a and the minute hand image 156b.

In a state in which general clock information or clock information reflecting collected situational information is output on the display unit 151 as illustrated in (a) of FIG. 21, when a pre-set touch input is applied to the hour hand image 156a and the minute hand image 156b as illustrated in (b) or (c) of FIG. 21, at least a portion of the schedule information may be output to the display unit 151.

The pre-set touch input may be a touch input which starts from any one point of the hour hand image 156a or the minute hand image 156b, continues, and ends at another point. Such a touch input may be referred to as a drag touch.

Based on at least one of a progress direction and a length of the drag touch (for example, a distance between the one point and another point), the controller 180 may determine schedule information to be output to the display unit 151. The progress direction and length may include a rotational direction and a rotational degree, respectively.

For example, as illustrated in (b) of FIG. 21, in a case in which a drag touch is applied to the hour hand image 156a in a clockwise direction, schedule information corresponding to a future schedule based on the current time may be sequentially output to the display unit 151. Such schedule information may be output different depending on a length of the drag touch applied to the hour hand image 156a. For example, as the drag touch applied to the hour hand image 156a is longer, more schedule information corresponding to a future schedule may be output to the display unit 151.

Conversely, as illustrated in (c) of FIG. 21, in a case in which a drag touch is applied to the hour hand image 156a in a counterclockwise direction, schedule information corresponding to a past schedule based on the current time may be sequentially output to the display unit 151.

Also, depending on from which of the hour hand image 156a and the minute hand image 156b a drag touch starts, the controller 180 may output different schedule information. For example, when a drag touch is applied to the minute hand image 156b, the controller 180 may output detailed schedule information compared with a case in which a drag touch is applied to the hour hand image 156a.

Meanwhile, although not shown, the schedule information may be output in relation to clock information. For example, schedules classified based on time may be displayed in positions matched to each of corresponding time.

Meanwhile, schedule information may be output to overlap with the clock information. For example, when schedule information is output to a particular region of the display unit 151, clock information which has been output in the particular region may be displayed dimly. Accordingly, a visual effect as if the schedule information floats on the clock information can be provided.

Figure 22:
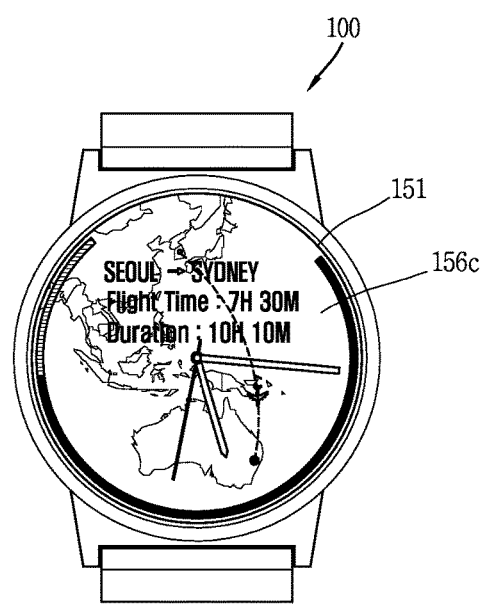
FIG. 22 is a conceptual view illustrating an example in which clock information is changed according to collected situational information in a mobile terminal according to an exemplary embodiment of the present disclosure.

FIG. 22 is a conceptual view illustrating an example in which clock information is changed according to collected situational information in the mobile terminal 100 according to an exemplary embodiment of the present disclosure.

In an exemplary embodiment of the present disclosure, the situational information unit 182 may collect situational information in environment surrounding the terminal body by using the wireless communication unit 110. The situational information unit 182 may collect information received by the wireless communication unit 110 through communication with a wireless communication unit of other electronic device, deliver the collected information to the controller 180, and the controller 180 may change clock information based on the collected situational information. In addition, the controller 180 may change a mode of the mobile terminal 100 based on the collected situational information.

For example, as illustrated in FIG. 22, when the user who wears the mobile terminal 100 boards an airplane, the wireless communication unit 110 may perform communication with a wireless communication unit of the airplane. The situational information unit 182 may collect relative position information of the terminal body with respect to the airplane, flight information of the airplane, and the like, through the communication.

Based on the relative position information, the controller 180 may sense that the user is on board the airplane, and change the mobile terminal 100 into an airplane mode in which functions of some modules of the wireless communication unit 110 are limited. In addition, the controller 180 may change the background image 156c into an image related to the airplane mode. The image may include flight information of the airplane received through the communication, time information of an arrival area, weather information, and the like.

Accordingly, the mode of the mobile terminal 100 may be changed without a user manipulation, and information related to the changed mode may be reflected in the clock information. This may also be applied to an example in which the mobile terminal 100 is changed from a bell sound mode to a mute mode or a vibration mode in a concert hall, as well as to the foregoing example in which the mobile terminal 100 is automatically changed to the airplane mode when the user boards the airplane.

Figure 23:
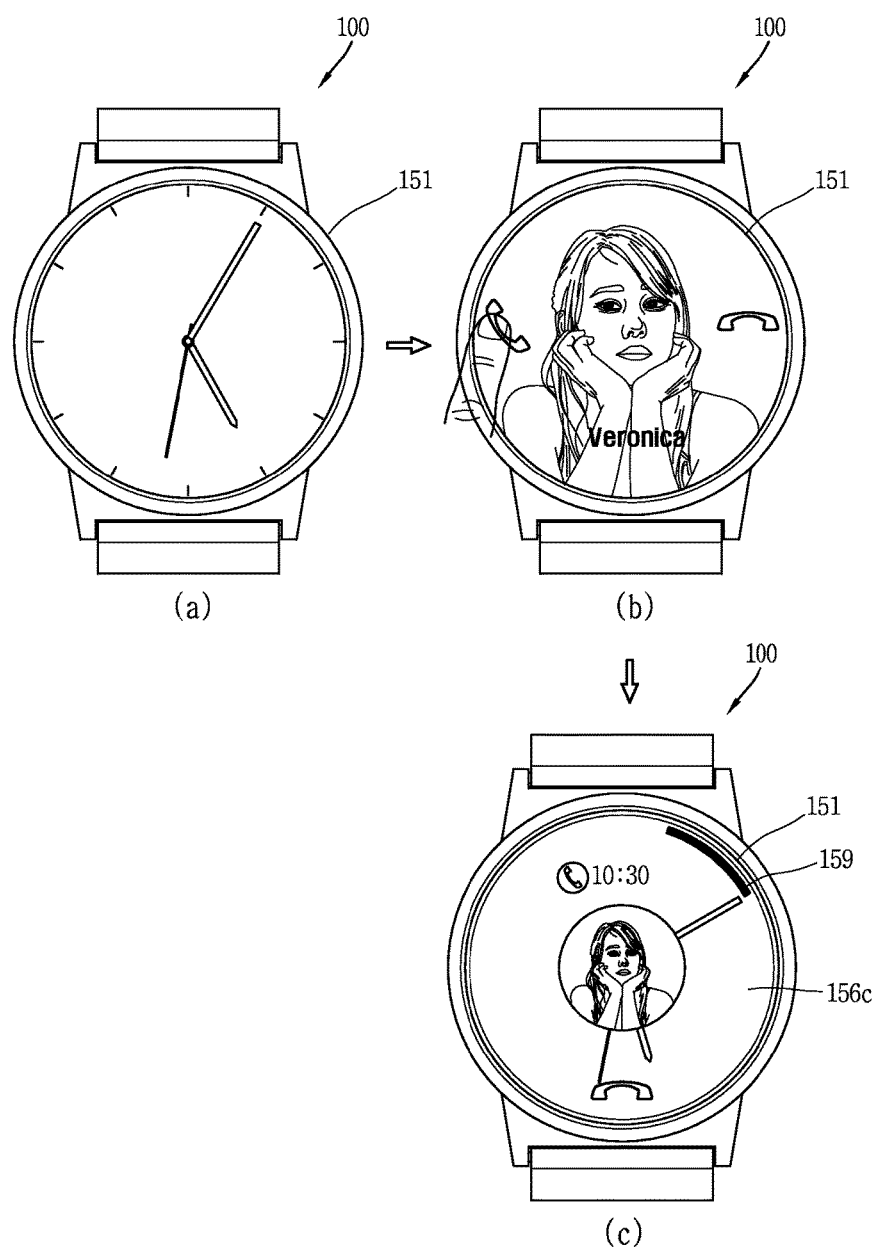
FIG. 23 is a conceptual view illustrating a method for displaying a call time in relation to clock information in a mobile terminal according to an exemplary embodiment of the present disclosure.

FIG. 23 is a conceptual view illustrating a method for displaying a call time in relation to clock information in the mobile terminal 100 according to an exemplary embodiment of the present disclosure.

In an exemplary embodiment of the present disclosure, when an event occurs, notification information of the generated event is output to the display unit 151. The event includes a call signal reception, a message reception, and the like. While the notification information is being output on the display unit in response to the generated event, previously output clock information may disappear or may be output dimly as a background image.

For example, as illustrated in FIG. 23, when a call is received, the controller 180 may extract caller information corresponding to a phone number from a phone book stored in the memory 160, and output at least a portion of the caller information to the display unit 151. Meanwhile, in this drawing, it is illustrated that previously output clock information disappears, while the notification information related to the call reception is being output.

In a state in which the notification information of the event is output on the display unit 151, when the terminal body moves in response to a touch input applied to the display unit 151 or pre-set gesture, a function related to the event may be executed. Meanwhile, when the function related to the event is executed, the clock information may be output again or may be output clearly and information related to the executed function may be reflected in the clock information.

For example, as illustrated, a touch input is applied to a call connection icon output on the display unit 151 so call communication is being performed with a caller, the clock information may be output again to the display unit 151. In this case, information related to the call (for example, call time information, caller information, and the like) may be reflected in the background image 156c, and partial information reflected in the background image 156c may be output in relation to the clock information.

For example, a graphic object 159 related to a call time may be output to the edge region of the display unit 151, in relation to the clock information. In detail, a call time may be displayed such that the graphic object 159 extending from a point indicated by the minute hand image 156b at a point in time at which the call started to a point indicated by the minute hand image 156b at the current point in time is output.

Figure 24:
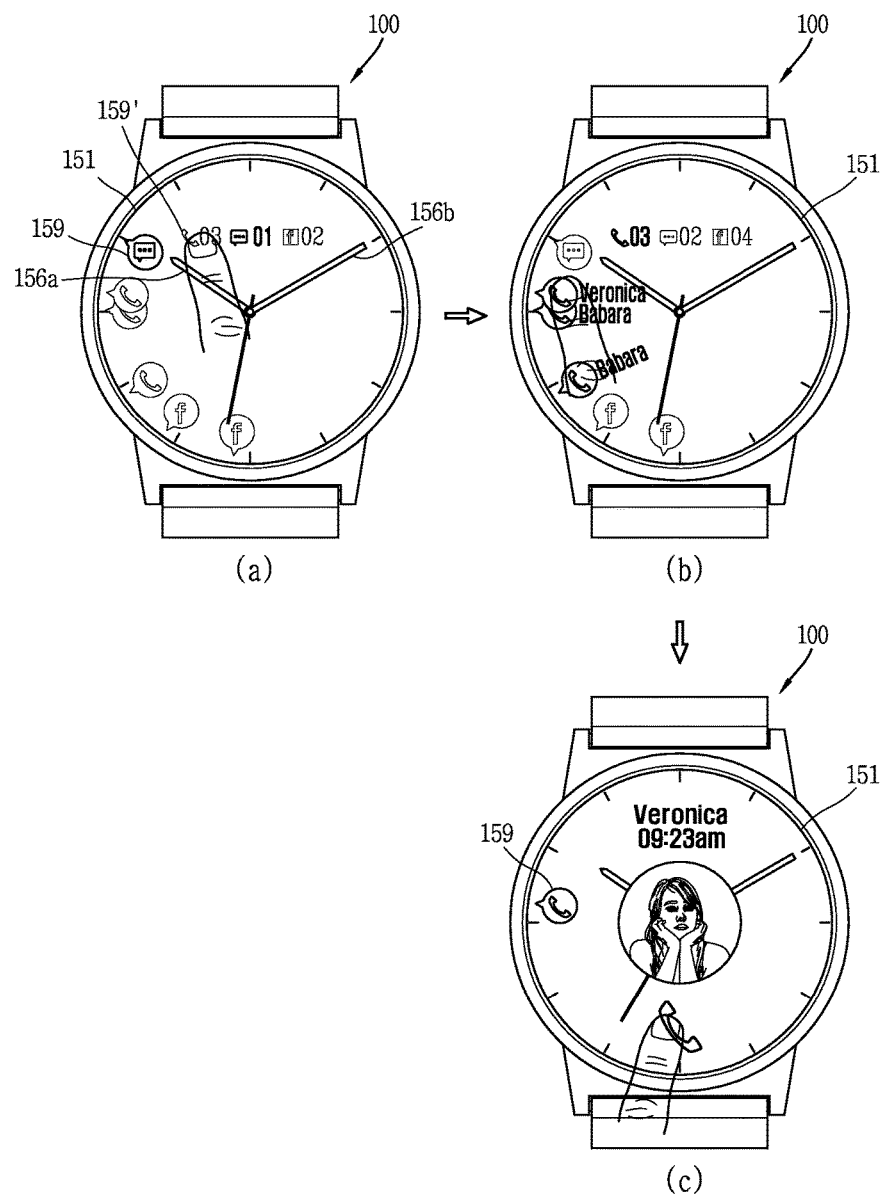
FIG. 24 is a conceptual view illustrating a method of displaying different types of events as occur and a control method thereof in a mobile terminal according to an exemplary embodiment of the present disclosure.

FIG. 24 is a conceptual view illustrating a method of displaying different types of events as occur and a control method thereof in the mobile terminal 100 according to an exemplary embodiment of the present disclosure.

In an exemplary embodiment of the present disclosure, when an event occurs, the controller 180 may output a graphic object 159 related to the generated event to the display unit 151, in relation to the clock information. For example, the graphic object 159 related to the generated event may be output to a point corresponding to a point in time at which the event occurs in the edge region of the display unit 151.

For example, the graphic object 159 related to the event may be output to a point indicated by the hour hand image 156a at a point in time at which the event occurs in the edge region. Accordingly, the user may recognize when the event has occurred by intuition. Meanwhile, in a case in which a plurality of events occur at mutually adjacent time, the graphic object 159 related to the recently generated event may be output to cover at least a portion of the previously generated graphic object 159.

Also, in a case in which different types of events occur, the controller 180 may output graphic objects 159 related to the types of the events to the display unit 151. For example, in a case in which events of an absent call, a message reception, and an SNS notification occur, the controller 180 may output a graphic object 159 related to any one type of event to the display unit 151. In this case, the graphic object 159 related to any other type of event may be displayed dimly as a background image.

Types of events to be output to the display unit 151 may be changed by a pre-set touch input applied to the display unit 151. For example, in a state in which the graphic object 159 related to a message reception is output, when a touch input is applied to an icon 159' corresponding to an absent call category or a flicking touch, or the like, is applied to the display unit 151, a graphic object 159 related to the absent call may be output to the display unit 151.

Meanwhile, when a touch input is applied to any one of the graphic objects 159 related to events, the controller 180 may execute a function related to the corresponding event. For example, when a touch input is applied to any one of the graphic objects 159 related to an absent call, the controller 180 may make a call to a caller of the corresponding absent call and output information related to the call to the display unit 151.

Figure 25A:
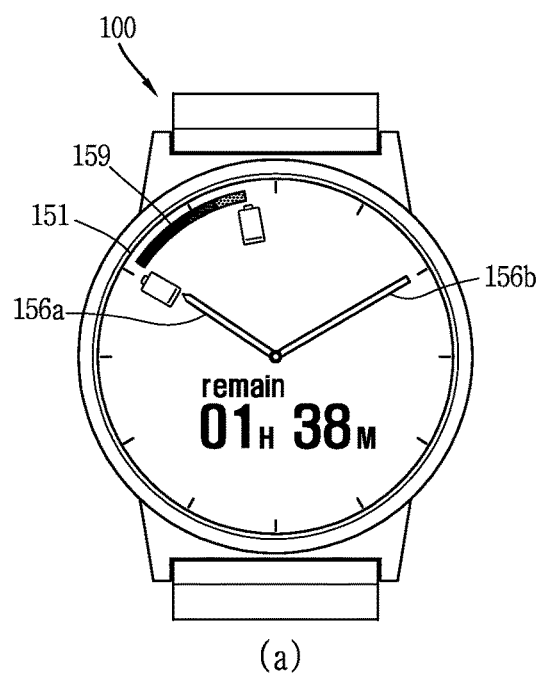
FIGS. 25A and 25B are conceptual views illustrating a method for displaying a remaining battery capacity in relation to clock information in a mobile terminal according to an exemplary embodiment of the present disclosure.
Figure 25B:
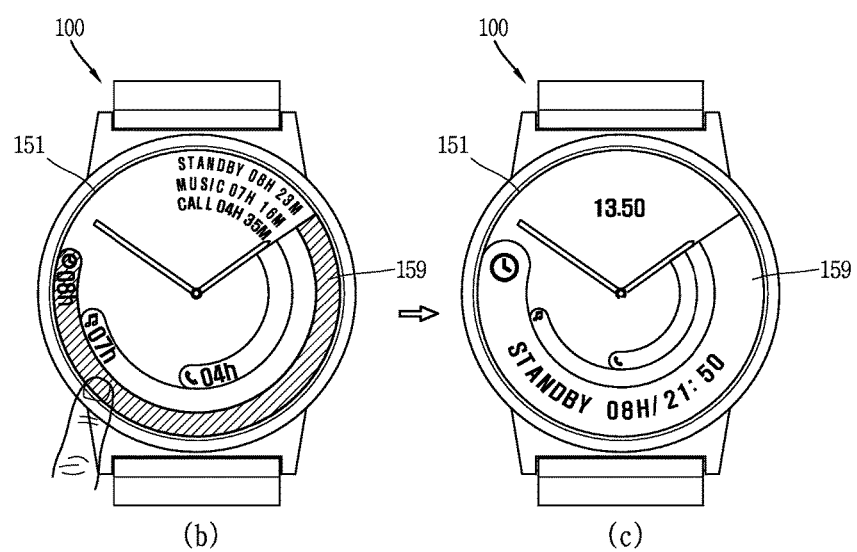

FIGS. 25A and 25B are conceptual views illustrating a method for displaying a remaining battery capacity in relation to clock information in the mobile terminal 100 according to an exemplary embodiment of the present disclosure.

In an exemplary embodiment of the present disclosure, the controller 180 may display a remaining battery capacity as a duration of the battery. In terms of the characteristics of the mobile terminal 100 that the wireless communication unit 110 is driven even in a standby state and a degree of battery consumption varies according to communication states of the wireless communication unit 110, the controller 180 may determine a duration of the battery based on a communication state of the wireless communication unit 110 collected by the situational information unit 182.

Also, the controller 180 may display the determined duration of the battery in relation to clock information. For example, as illustrated in FIG. 25A, the controller 180 may display information related to a remaining battery capacity such that a graphic object 159 extending from a point indicated by the hour hand image 156a at the current point in time to a point indicated by the hour hand image 156a at a point in time at which discharging of the battery is anticipated is output. When a communication state of the wireless communication unit 110 is changed, a duration of the battery may be changed, and this may be reflected by changing a length of the graphic object 159 displayed on the display unit 151.

Meanwhile, as illustrated in FIG. 25B, durations of the battery may be classified based on a case of a standby state and a case of execution of a particular function (music play, call, etc.) and displayed in relation to clock information.

In this case, when a touch input is applied to the graphic object 159 related to any one of the foregoing cases, detailed information of remaining battery capacity of a corresponding case may be output to the display unit 151.

Figure 26:
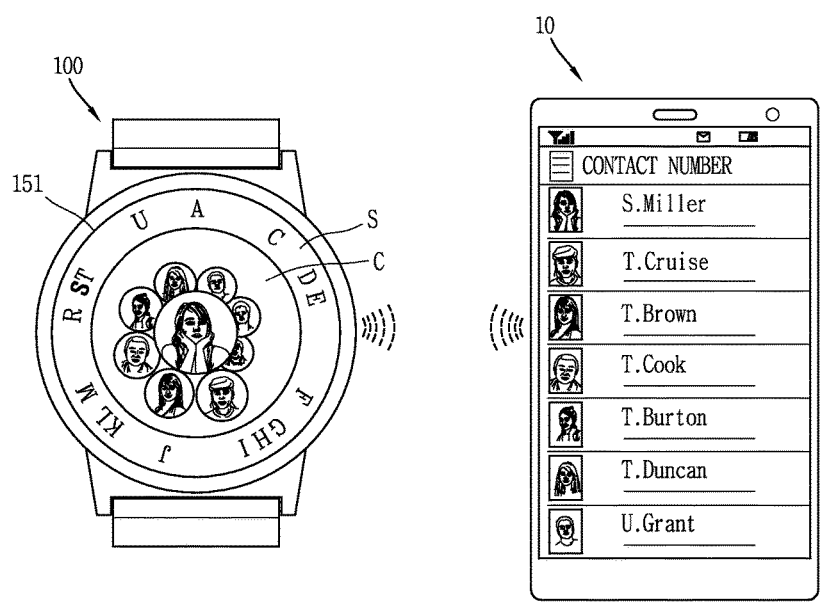
FIG. 26 is a conceptual view illustrating a method for displaying information received from other electronic device by using an edge region of a display unit in a mobile terminal according to an exemplary embodiment of the present disclosure.

FIG. 26 is a conceptual view illustrating a method for displaying information received from other electronic device by using an edge region of a display unit in a mobile terminal according to an exemplary embodiment of the present disclosure.

In an exemplary embodiment, the wireless communication unit 110 receives information through communication with a wireless communication unit of other electronic device 10, and the controller 180 may re-arrange the received information by using the edge region of the display unit 151.

For example, the wireless communication unit 110 may receive stored contact numbers from other authenticated electronic device 10. The controller 180 may re-arrange the contact numbers in the edge region of the display unit 151 based on a pre-set reference.

For example, as illustrated in FIG. 26, the controller 180 may group the received contact numbers having the same first letter of names and display the grouped contact numbers in the edge region S, and information related to a contact number of a particular person may be displayed in a central region C surrounded by the edge region S. Information related to a contact number of a particular person in next order may be output dimly as a background image.

In a case in which a drag touch continued from one point to another point in the edge region (S) is applied, the controller 180 may shift one group to the another group. As a result, particular contact numbers belonging to the other changed group may be displayed in the central region C.

This control method may be advantageously used in outputting information and controlling the information when the display unit 151 has a shape close to a circle such as in the watch type mobile terminal 100.

Figure 27:
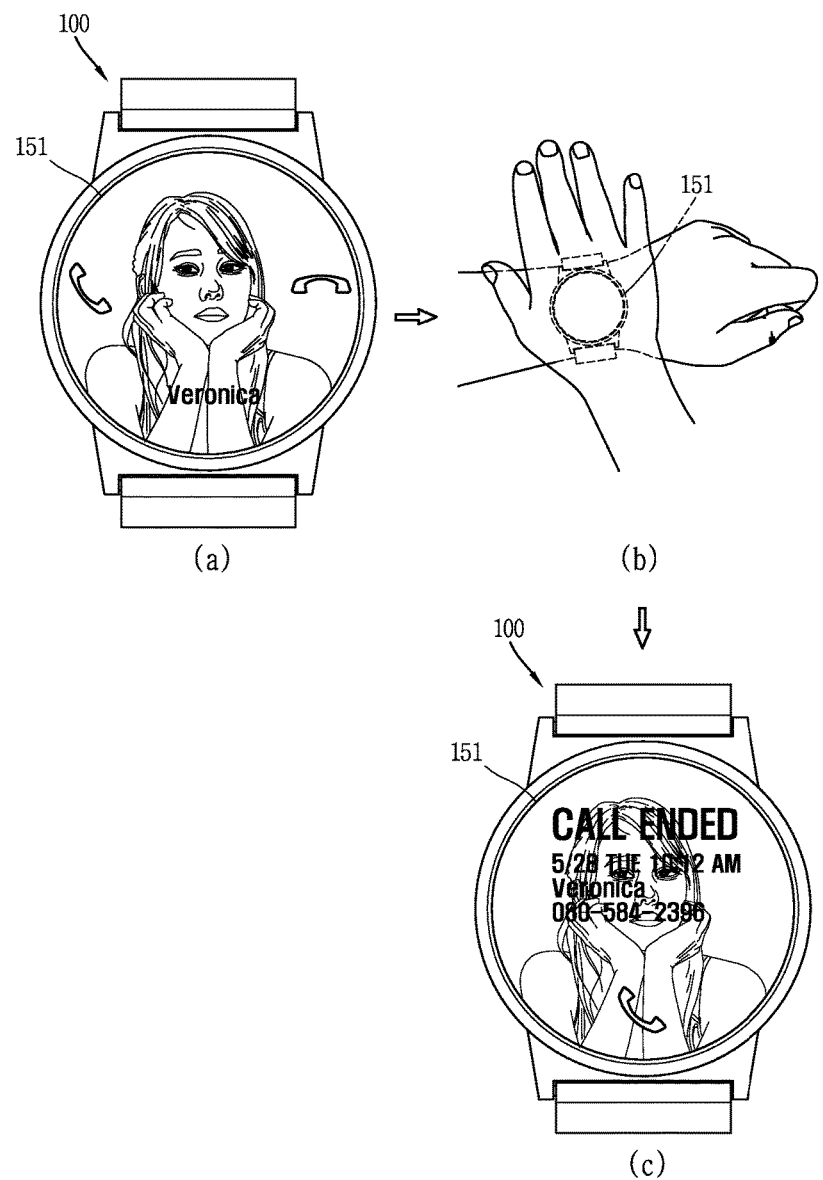
FIG. 27 is a conceptual view illustrating an example in which a mobile terminal according to an exemplary embodiment of the present disclosure is controlled in response to a pre-set gesture.

FIG. 27 is a conceptual view illustrating an example in which the mobile terminal 100 according to an exemplary embodiment of the present disclosure is controlled in response to a pre-set gesture.

As described above, when an event occurs, notification information of the generated event is output to the display unit 151. While the notification information is being output on the display unit 151, when the user makes a pre-set gesture, the controller 180 may sense the gesture and control the mobile terminal 100. In order to sense the gesture, the controller 180 may use situational information collected by the situational information unit 182.

The pre-set gesture is a motion made by the user with respect to the terminal body, and due to the user's motion, the terminal body may be rotated or intensity of illumination of the display unit 151 may be changed. In order to sense such a movement or change, the situational information unit 182 may use the sensing unit 140.

Based on the sensing result, the controller 180 generates a control signal related to the generated event. The control signal may include termination of outputting of notification information, a response with respect to an event, automatic termination, or the like.

For example, as illustrated in (a) of FIG. 27, when a call signal is received through the wireless communication unit 110, notification information indicating the received call is output to the display unit 151. The situational information unit 182 collects situational information in environment surrounding the terminal body, to sense a movement of the terminal body or a change in the terminal body generated when the user makes a pre-set gesture. For example, the situational information unit 182 may collect situational information related to brightness of the surroundings of the display unit 151 by using an illumination sensor provided to be adjacent to the display unit 151.

While the notification information is being output, when the user covers the display unit 151 with his or her palm as illustrated in (b) of FIG. 27, brightness of the surroundings of the display unit 151 is changed. The controller 180 may generate a control signal related to the received call by using the change in brightness of the surroundings of the display unit 151 collected by the situational information unit 182. For example, as illustrated in (c) of FIG. 27, the controller 180 may stop outputting the notification information and cut off receiving of the call signal.

According to this control method, the user may control the mobile terminal 100 by simply making a gesture. For example, in a case in which the user has difficulty in answering a call, the user may make a simple gesture of covering the display unit 151 with his or her palm to cut off call connection.

Figure 28:
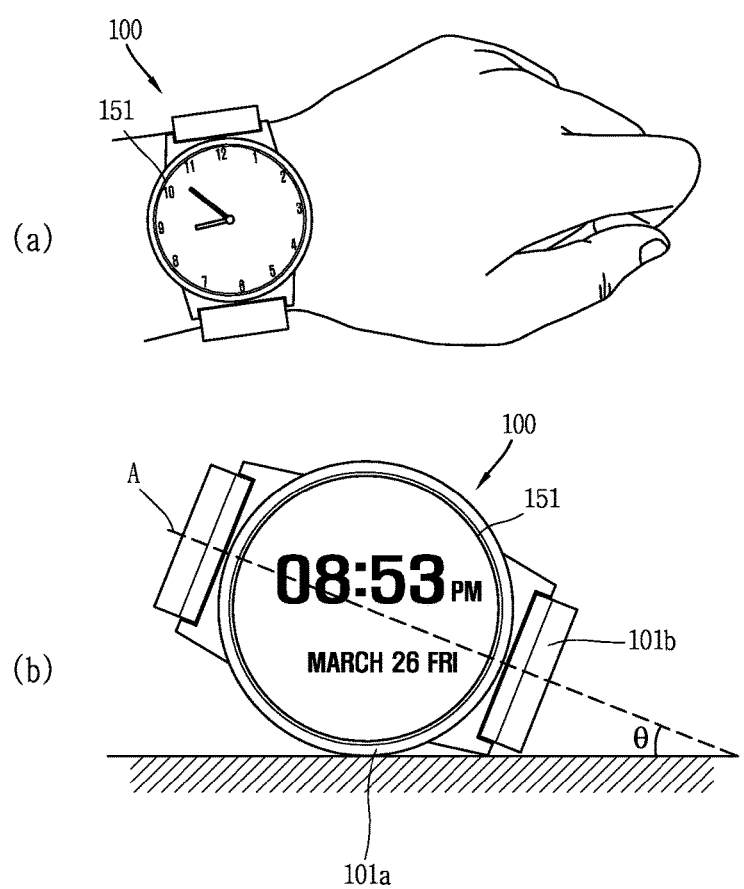
FIG. 28 is a conceptual view illustrating examples in which clock information is displayed according to orientation of a terminal body in a mobile terminal according to an exemplary embodiment of the present disclosure.

FIG. 28 is a conceptual view illustrating examples in which clock information is displayed according to orientation of a terminal body in the mobile terminal 100 according to an exemplary embodiment of the present disclosure.

In an exemplary embodiment of the present disclosure, the controller detects orientation of a terminal body 101a by using the sensing unit 140, and control clock information output to the display unit 151 based on the detected orientation. The orientation may be a degree to which a reference axis A of the terminal body 101a tilts with respect to the ground.

In a general usage state in which the user wears the mobile terminal 100 on his or her wrist, the orientation is changed constantly. Meanwhile, when the user places the mobile terminal 100 on a table, a shelf, or the like, the orientation may be uniformly maintained. For example, the terminal body 101a and a band 101b on one side are supported by a bottom surface, so that the display unit 151 may be disposed perpendicular to the bottom surface. In this case, the reference axis A of the terminal body 101a may be maintained at a particular angle with respect to the bottom surface.

By using the orientation of the terminal body 101a and a time duration in which the orientation lasts, and the like, the controller 180 may determine in which of states including the two foregoing states, the mobile terminal is in, and controls clock information output to the display unit 151 based on the determination result. Meanwhile, orientation information in a particular state may be stored in the memory 160, and the controller 180 may determine in which state the mobile terminal 100 is in by using the orientation information stored in the memory 160. In addition, the controller 180 may control a mode of the mobile terminal 100 based on the determination result.

For example, when it is determined that the user is in a general usage state in which the user wears the mobile terminal 100 on his or her wrist as illustrated in (a) of FIG. 28, the controller 180 may output first clock information, and when it is determined that the mobile terminal 100 is placed on the bottom surface as illustrated in (b) of FIG. 28, the controller 180 may output second clock information. The first clock information may be clock information that can be output in a standby mode, a driving mode, and the like, and the second clock information may be clock information output in a sleep mode.

Meanwhile, by using a tilt angle of the reference axis A of the terminal body 101a with respect to the ground, the controller 180 may control an output direction of the second information. For example, when it is determined that the mobile terminal 100 is in the general usage state as illustrated in (a) of FIG. 28, the controller 180 may output the first clock information regardless of tilt angle of the reference axis A. Meanwhile, when it is determined that the mobile terminal 100 is in the state as illustrated in (b) of FIG. 28, the controller 180 may calculate the angle (θ) between the reference axis A and the ground, and rotate the second clock information in a direction parallel to the ground and output the second clock information. Accordingly, the mobile terminal 100 placed in the state (a) of FIG. 28 may serve as a table clock allowing the user to easily check the second clock information.

As described above, the watch type mobile terminal 100 according to an exemplary embodiment of the present disclosure can collect situational information in environment surrounding the terminal body, and reflect the collected situational information in clock information output on the display unit 151. Namely, the watch type mobile terminal 100 according to an exemplary embodiment of the present disclosure provides clock information tailored according to situational information in environment surrounding the terminal body, enhancing user convenience.

The mobile terminal according to the embodiments of the present disclosure described above is not limited to the configurations and methods described above, but the entirety or a portion of the embodiments can be selectively combined to be configured into various modifications.

The foregoing embodiments and advantages are merely exemplary and are not to be considered as limiting the present disclosure. The present teachings can be readily applied to other types of apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

As the present features may be embodied in several forms without departing from the characteristics thereof, it should also be understood that the above-described embodiments are not limited by any of the details of the foregoing description, unless otherwise specified, but rather should be considered broadly within its scope as defined in the appended claims, and therefore all changes and modifications that fall within the metes and bounds of the claims, or equivalents of such metes and bounds are therefore intended to be embraced by the appended claims.

What is claimed is:

1. A watch type mobile terminal, comprising:
  a terminal body shaped to be wearable by a user;
  a display located on the terminal body and configured to display clock information, wherein the clock information comprises an hour hand image, a minute hand image, and a background image representing current time;
  an information processing unit configured to obtain current situation information associated with the mobile terminal; and
  a controller configured to:
    determine a shape or form of the hour hand image and the minute hand image to be displayed such that a current mode corresponding to the current situation information is represented via the hour hand image and the minute hand image having the determined shape or form;
    cause the display to change the shape or form of the hour hand image and the minute hand image based on the current situation information such that a different hour hand image and a different minute hand image are displayed according to a change of the current situation information, a first hour hand image and a first minute hand image displayed when a first situation mode corresponds to the current situation information, and a second hour hand image and a second minute hand image displayed when a second situation mode corresponds to the current situation information,
    wherein each of the first situation mode and the second situation mode, which is different from the first situation mode, is one of a weather mode, a traffic mode, a meal mode, a work mode, or an exercise mode; and
    execute one of a plurality of functions based on the current mode in response to a touch input received via the display, the touch input received while the hour hand image and the minute image are displayed on the display,
  wherein:
    an exercise related function is executed and screen information related to the exercise related function is displayed on the display when the hour hand image and the minute hand image correspond to the exercise mode; and
    a weather related function is executed and screen information related to the weather related function is displayed on the display when the hour hand image and the minute hand image correspond to the weather mode.

2. The watch type mobile terminal of claim 1, wherein the controller is further configured to cause the display to change a shape or form of the background image according to the current mode corresponding the current situation information.

3. The watch type mobile terminal of claim 1, further comprising:
  a memory configured to store mode information comprising a plurality of situation modes classified based on various information associated with the mobile terminal,
  wherein the plurality of situation modes comprise the weather mode, the traffic mode, the meal mode, the work mode, and the exercise mode, and
  wherein the controller is further configured to cause the display to display the updated clock information such that the current situation information corresponds to the first situation mode among the plurality of situation modes that is currently associated with the terminal body.

4. The watch type mobile terminal of claim 3, wherein the controller is further configured to:
  cause the information processing unit to obtain updated information when the current situation information is updated;
  cause the display to further update the updated clock information to correspond to the second situation mode if the second situation mode related to the updated information is different from the first situation mode; and
  cause the display to continue displaying the updated clock information if a third situation mode related to the updated situational information is same as the first situation mode.

5. The watch type mobile terminal of claim 1, wherein:
  at least one of the hour hand image or the minute hand image is movable by a drag touch;
  the controller is further configured to set time in response to the drag touch applied to the at least one of the hour hand image or the minute hand image; and
  the controller is further configured to execute a particular function that is associated with the set time when the set time corresponds to current time.

6. The watch type mobile terminal of claim 5, wherein the controller is further configured to:
  cause the display to display a plurality of selectable icons corresponding to a plurality of functions when the time is set;
  designate one of the plurality of functions as the particular function in response to selection of one of the plurality of selectable icons; and
  execute the particular function corresponding to the designated one of the plurality of functions.

7. The watch type mobile terminal of claim 5, wherein the controller is further configured to cause the display to display the clock information differently when current time is within a predetermined time period from the set time in order to inform that the set time is approaching.

8. The watch type mobile terminal of claim 5, wherein:
the obtained current situation information comprises position information of the terminal body; and
the controller is further configured to cause the display to display place information based on the position information and the set time.

9. The watch type mobile terminal of claim 1, wherein:
the information processing unit is further configured to obtain information regarding movement of the terminal body;
the controller is further configured to determine that the user wearing the mobile terminal is exercising when the movement of the terminal body is within a reference range; and
the controller is further configured to cause the display to display clock information related to the determination.

10. The watch type mobile terminal of claim 9, wherein the controller is further configured to cause the display to display a number of times the movement of the terminal body is repeated along with the clock information related to the determination.

11. The watch type mobile terminal of claim 1, wherein:
the current situation information comprises position information of the terminal body and position information of an object that is present within a reference distance from the terminal body; and
the controller is further configured to cause the display to display information in the clock information, the information reflecting relative position information of the object with respect to the terminal body.

12. The watch type mobile terminal of claim 1, wherein:
the information processing unit is further configured to obtain information regarding movement of the terminal body;
the controller is further configured to cause the information processing unit to obtain specific information when the information regarding the movement of the terminal body corresponds to a specific gesture for obtaining the specific information; and
cause the display to display the clock information such that the obtained specific information is reflected in the displayed clock information.

* * * * *